(12) United States Patent
Ricci et al.

(10) Patent No.: US 10,793,653 B2
(45) Date of Patent: Oct. 6, 2020

(54) PROCESS FOR PREPARING CONJUGATED DIENE (CO)POLYMERS IN THE PRESENCE OF A CATALYTIC SYSTEM COMPRISING A PYRIDYL IRON (III) COMPLEX

(71) Applicant: Versalis S.p.A., San Donato Milanese (MI) (IT)

(72) Inventors: Giovanni Ricci, Parma (IT); Guido Pampaloni, Pontedera (IT); Anna Sommazzi, Novara (IT); Massimo Guelfi, Pietrasanta (IT); Francesco Masi, Sant' Angelo Lodigiano (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 16/343,716

(22) PCT Filed: Oct. 20, 2017

(86) PCT No.: PCT/IB2017/056525
§ 371 (c)(1),
(2) Date: Apr. 19, 2019

(87) PCT Pub. No.: WO2018/073795
PCT Pub. Date: Apr. 26, 2018

(65) Prior Publication Data
US 2019/0270832 A1    Sep. 5, 2019

(30) Foreign Application Priority Data
Oct. 20, 2016   (IT) .................. 102016000105714

(51) Int. Cl.
*C08F 36/06*    (2006.01)
*C07F 15/02*    (2006.01)
(Continued)

(52) U.S. Cl.
CPC ............ *C08F 36/06* (2013.01); *C07F 15/025* (2013.01); *C08F 4/7006* (2013.01); *C08F 36/08* (2013.01);
(Continued)

(58) Field of Classification Search
CPC ......... C08F 36/06; C08F 36/08; C07F 15/025
See application file for complete search history.

(56) References Cited

U.S. PATENT DOCUMENTS 6,160,063 A    12/2000   Luo
6,180,734 B1    1/2001   Luo
(Continued)

FOREIGN PATENT DOCUMENTS

JP    4513569 B2 *   7/2010   ........... C07D 307/33
JP    4513569 B2      7/2010
(Continued)

OTHER PUBLICATIONS

Machine translation of JP 4513569. (Year: 2010).*
(Continued)

*Primary Examiner* — Catherine S Branch
(74) *Attorney, Agent, or Firm* — Praedcere Law

(57) ABSTRACT

A process for preparing conjugated diene (co)polymers comprising polymerizing at least one conjugated diene in the presence of a catalytic system comprising: (a) at least one pyridyl iron (III) complex having general formula (I) or (II): wherein: —$R_1$, $R_2$, $R_3$ and $R_4$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups; —$R_5$ represents a hydrogen atom, or is selected from linear or branched, optionally halogenated $C_1$-$C_{20}$, preferably $C_1$-$C_{15}$, alkyl (Continued)

groups, optionally substituted cycloalkyl groups, optionally substituted aryl groups; —X, identical or different, represent a halogen atom such as, for example, chlorine, bromine, iodine; or are selected from linear or branched $C_1$-$C_{20}$, preferably $C_1$-$C_{15}$, alkyl groups, —$OCOR_6$ groups or —$OR_6$ groups wherein $R_6$ is selected from linear or branched $C_1$-$C_{20}$, preferably $C_1$-$C_{15}$, alkyl groups. —n is 3; (b) at least one co-catalyst selected from organo-aluminum derivatives, preferably from: ($b_1$) aluminum compounds having general formula (III): Al($R_7$)($R_8$)($R_9$) (III) wherein $R_7$ represents a hydrogen atom, or is selected from linear or branched $C_1$-$C_{20}$ alkyl groups, cycloalkyl groups, aryl groups, alkylaryl groups, arylalkyl groups, alkoxy groups; $R_8$ and $R_9$, identical or different, are selected from linear or branched $C_1$-$C_{20}$ alkyl groups, cycloalkyl groups, aryl groups, alkylaryl groups, arylalkyl groups; ($b_2$) aluminoxanes having general formula (IV): ($R_{10}$)$_2$—Al—O—[-AI($R_{11}$)—O-]$_m$-AI-($R_{12}$)$_2$ (IV), wherein $R_{10}$, $R_{11}$ and $R_{12}$, identical or different, represent a hydrogen atom, or a halogen atom such as chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and m is an integer ranging from 0 to 1000; ($b_3$) partially hydrolyzed organo-aluminum derivatives; ($b_4$) haloaluminum alkyls having general formula (V) or (VI): Al($R_{13}$)$_p$ (X')$_{3-p}$ (V) Al$_2$($R_{13}$)$_q$(X')$_{3-q}$ (VI) wherein p is 1 or 2; q is an integer ranging from 1 to 5; $R_{13}$, identical or different, are selected from linear or branched $C_1$-$C_{20}$ alkyl groups; X' represents a chlorine or bromine atom, preferably chlorine; provided that said co-catalyst (b) is not selected from organo-boron derivatives.

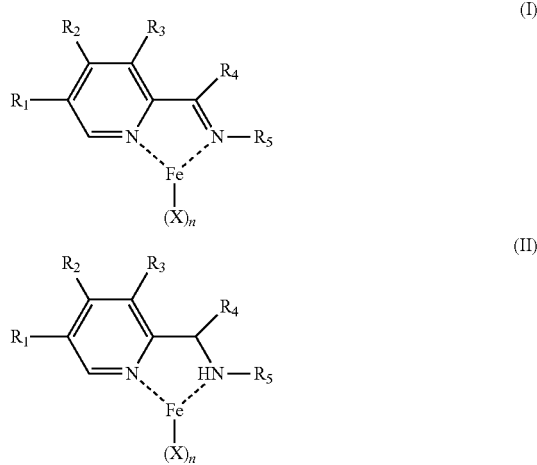

12 Claims, 62 Drawing Sheets

(51) Int. Cl.
C08F 36/08 (2006.01)
C08F 136/08 (2006.01)
C08F 136/06 (2006.01)
C08F 236/06 (2006.01)
C08F 4/70 (2006.01)
C08L 9/00 (2006.01)
C08F 236/08 (2006.01)

(52) U.S. Cl.
CPC .......... C08F 136/06 (2013.01); C08F 136/08 (2013.01); C08F 236/06 (2013.01); C08F 236/08 (2013.01); C08L 9/00 (2013.01)

(56) References Cited

U.S. PATENT DOCUMENTS

| 6,211,313 | B1 | 4/2001 | Luo |
| 6,277,779 | B1 | 8/2001 | Luo |
| 6,284,702 | B1 | 9/2001 | Luo |
| 6,388,030 | B2 | 5/2002 | Luo et al. |
| 6,479,601 | B1 | 11/2002 | Kerns et al. |
| 2001/0036899 | A1 | 11/2001 | Luo et al. |
| 2015/0329654 | A1 | 11/2015 | Masi et al. |
| 2016/0272742 | A1 | 9/2016 | Ritter et al. |

FOREIGN PATENT DOCUMENTS

| WO | WO 02/102861 A2 | 12/2002 |
| WO | WO 2011/061151 A2 | 5/2011 |
| WO | WO 2012/109343 A2 | 8/2012 |
| WO | WO 2016/042014 A1 | 3/2016 |
| WO | WO2016042014 A1 | 3/2016 |

OTHER PUBLICATIONS

International Search Report & Written Opinion for PCT/IB2017/056525, 4 pages.
Takeuchi et al., "New Industrial Polymers", "American Chemical Society Symposium Series" (1974), vol. 4, p. 15-25.
Halasa et al., "Kirk-Othmer Encyclopedia of Chemical Technology" (1989), 4th Ed., Kroschwitz J. I. Ed., John Wiley and Sons, New York, vol. 8, p. 1031-1045.
Tate et al., Encyclopedia of Polymer Science and Engineering (1989), 2nd Ed., Mark H. F. Ed., John Wiley and Sons, New York, vol. 2, p. 537-590.
Kerns et al., "Butadiene Polymers", in "Encyclopedia of Polymer Science and Technology" (2003), Mark H. F. Ed., Wiley, vol. 5, p. 317-356.
Porri et al., "Comprehensive Polymer Science" (1989), Eastmond G.C. et al. Eds., Pergamon Press, Oxford, UK, vol. 4, Part II, p. 53-108.
Thiele et al., "Macromolecular Science. Part C: Polymer Reviews" (2003), C43, p. 581-628.
Osakada et al., "Advanced Polymer Science" (2004), vol. 171, p. 137-194.
Friebe et al., "Advanced Polymer Science" (2006), vol. 204, p. 1-154.
Zhang et al., "Journal of Molecular Catalysis" (1982), vol. 17, Issue 1, p. 65-76.
Bazzini et al., "Macromolecular Rapid Communications" (2002), vol. 23(15), p. 922-927.
Bazzini et al., "Polymer Communication" (2004), vol. 45, p. 2871-2875.
Ricci et al., "Journal of Molecular Catalysis A: Chemical" (2003), vol. 204-205, p. 287-293.
Ricci et al., "Coordination Chemistry Reviews" (2010), vol. 254, Issues 5-6, p. 661-676.
Nakayama et al., "Macromolecules" (2003), vol. 36(21), p. 7953-7958.
Gong et al., "Polymer" (2009), vol. 50, p. 5980-5986.
Gong et al., "Polymer" (2009), vol. 50, p. 6259-6264.
Gong et al., "Inorganic Chimica Acta" (2011), vol. 373, Issue 1, p. 47-53.
Gong et al., "Journal of Organometallic Chemistry" (2012), vol. 702, p. 10-18.
Zhang et al., "Dalton Transactions" (2012), vol. 41, p. 9639-9645.

(56) References Cited

OTHER PUBLICATIONS

Raynaud et al., "Angewandte Chemie International Edition" (2012), vol. 51, p. 11805-11808.
Wang et al., "Polymer" (2013), vol. 54, p. 5174-5181.
Liu et al., "Journal of Molecular Catalysis A: Chemical" (2014), vol. 391, p. 25-35.
Gong et al., "Journal of Molecular Catalysis A: Chemical" (2015), vol. 406, p. 78-84.
Zheng et al., "Journal of Polymer Science Part A: Polymer Chemistry" (2015), vol. 53, Issue 10, p. 1182-1188.
Wu et al., "Journal of American Chemical Society" (2009), vol. 131(36), p. 12915-12917.
Laine et al., "European Journal of Inorganic Chemistry" (1999), vol. 6, p. 959-964.
Bianchini et al., "New Journal of Chemistry" (2002), vol. 26(4), p. 387-397.
Lai et al., "Tetrahedron" (2005), vol. 61(40), p. 9484-9489.
Ricci et al., "Advances in Organometallic Chemistry Research" (2007), Yamamoto K. Ed., Nova Science Publisher, Inc., USA, p. 1-36.
Ricci et al., "Coordination Chemistry Reviews" (2010), vol. 254, p. 661-676.
Ricci et al., "Ferrocenes: Compounds, Properties and Applications" (2011), Elisabeth S. Phillips Ed., Nova Science Publisher, Inc., USA, p. 273-313.
Ricci et al., "Chromium: Environmental, Medical and Material Studies" (2011), Margaret P. Salden Ed., Nova Science Publisher, Inc., USA, p. 121-1406.
Ricci et al., "Cobalt: Characteristics, Compounds, and Applications" (2011), Lucas J. Vidmar Ed., Nova Science Publisher, Inc., USA, p. 39-81.
Ricci et al., "Phosphorus: Properties, Health effects and Environment" (2012), Ming Yue Chen and Da-Xia Yang Eds., Nova Science Publisher, Inc., USA, p. 53-94.
Mochel, in "Journal of Polymer Science Part A-1: Polymer Chemistry" (1972), vol. 10, Issue 4, p. 1009-1018.
Sato et al. in "Journal of Polymer Science: Polymer Chemistry Edition" (1979), vol. 17, Issue 11, p. 3551-3558.
Russian Office Action issued by the Eurasian Patent Office dated Apr. 8, 2020, 4 pages (Translation in English provided).

* cited by examiner

PROCESS FOR PREPARING CONJUGATED DIENE (CO)POLYMERS IN THE PRESENCE OF A CATALYTIC SYSTEM COMPRISING A PYRIDYL IRON (III) COMPLEX

The present invention relates to a process for preparing conjugated diene (co)polymers. More in particular, the present invention relates to a process for preparing conjugated dienes comprising polymerizing at least one conjugated diene in the presence of a catalytic system comprising: (a) at least one pyridyl iron (III) complex; (b) at least one co-catalyst selected from organo-aluminum derivatives.

The present invention also relates to a catalytic system comprising: (a) at least one pyridyl iron (III) complex; (b) at least one co-catalyst selected from organo-aluminum derivatives. It is known that the stereospecific (co)polymerization of conjugated dienes is a very important process in the chemical industry in order to obtain products that are among the most widely used rubbers.

It is also known that among the different polymers that can be obtained from the stereospecific polymerization of 1,3-butadiene (i.e. 1,4-cis, 1,4-trans, 1,2 syndiotactic, 1,2 isotactic, 1,2 atactic, mixed 1,4-cis/1,2 structure having a variable 1,2 unit content), only 1,4-cis polybutadiene and 1,2 syndiotactic polybutadiene are industrially manufactured and commercialized. Further details relative to said polymers can be found, for example, in: Takeuchi Y. et al., "*New Industrial Polymers*", "*American Chemical Society Symposium Series*" (1974), Vol. 4, pg. 15-25; Halasa A. F. et al., "*Kirk-Othmer Encyclopedia of Chemical Technology*" (1989), $4^{th}$ Ed., Kroschwitz J. I. Ed., John Wiley and Sons, New York, Vol. 8, pg. 1031-1045; Tate D. et al., "*Encyclopedia of Polymer Science and Engineering* (1989), $2^{nd}$ Ed., Mark H. F. Ed., John Wiley and Sons, New York, Vol. 2, pg. 537-590; Kerns M. et al., "*Butadiene Polymers*", in "*Encyclopedia of Polymer Science and Technology*" (2003), Mark H. F. Ed., Wiley, Vol. 5, pg. 317-356.

Generally, 1,4-cis polybutadiene is prepared through polymerization processes that use different catalytic systems comprising catalysts based on titanium (Ti), cobalt (Co), nickel (Ni), neodymium (Nd). Catalytic systems comprising cobalt based catalysts have high catalytic activity and stereospecificity and can be considered the most versatile between those mentioned above since, when their formulation is changed, they are able to provide all the possible stereoisomers of polybutadiene mentioned above, as described, for example, in: Porri L. et al., "*Comprehensive Polymer Science*" (1989), Eastmond G. C. et al. Eds., Pergamon Press, Oxford, UK, Vol. 4, Part II, pg. 53-108; Thiele S. K. H. et al., "*Macromolecular Science. Part C: Polymer Reviews*" (2003), C43, pg. 581-628; Osakada, K. et al., "*Advanced Polymer Science*" (2004), Vol. 171, pg. 137-194; Friebe L. et al., "*Advanced Polymer Science*" (2006), Vol. 204, pg. 1-154.

Iron (Fe) based catalysts have also been studied which are useful in the (co)polymerization of conjugated dienes. One of the first studies in literature on catalytic systems comprising iron (Fe) based catalysts concerned the (co)polymerization of 1,3-butadiene and isoprene with catalytic systems comprising iron acetylacetonate [Fe(acac)$_3$], tri-iso-butyl-aluminum (TIBA) and 1,10-phenanthroline (phen) as described, for example, in Zhang Z. Y. et al., "*Journal of Molecular Catalysis*" (1982), Vol. 17, Issue 1, pg. 65-76. Said catalytic system is able to provide a binary polybutadiene with a mixed 1,4-cis/1,2 structure having an equal content of 1,4-cis and 1,2 units.

U.S. Pat. No. 6,160,063 describes a catalytic system obtained by combination or reaction of: a compound containing iron (for example, iron carboxylate, iron β-diketonate, iron alkoxide, iron arylalkoxide); an organic compound of magnesium; and a cyclic hydrogen phosphite. The aforementioned catalytic system is particularly useful for the polymerization of 1,3-butadiene for providing binary polybutadiene with a mixed 1,4-cis/1,2 structure.

U.S. Pat. No. 6,180,734 describes a catalytic system obtained by combination or reaction of: a compound containing iron (for example, iron carboxylate, iron β-diketonate, iron alkoxide, iron arylalkoxide); cyclic hydrogen phosphite; and an organic compound of aluminum. The aforementioned catalytic system is particularly useful for the polymerization of 1,3-butadiene for providing 1,2 syndiotactic polybutadiene.

U.S. Pat. No. 6,211,313 describes a catalytic system obtained by combination or reaction of: a compound containing iron (for example, iron carboxylate, iron β-diketonate, iron alkoxide, iron arylalkoxide); cyclic hydrogen phosphite; and an aluminoxane. The aforementioned catalytic system is particularly useful for the polymerization of 1,3-butadiene for providing 1,2 syndiotactic polybutadiene.

U.S. Pat. No. 6,277,779 describes a catalytic system obtained by combination or reaction of: a compound containing iron (for example, iron carboxylate, iron β-diketonate, iron alkoxide, iron arylalkoxide); a dihydrocarbyl hydrogen phosphite; and an organic compound of aluminum. The aforementioned catalytic system is particularly useful for the polymerization of 1,3-butadiene for providing 1,2 syndiotactic polybutadiene having a melting point that can range from 100° C. to 200° C., according to the components and the ratios between the different components present in said catalytic system.

U.S. Pat. Nos. 6,284,702 and 6,388,030 describe a catalytic system obtained by combination or reaction of: a compound containing iron (for example, iron carboxylate, iron β-diketonate, iron alkoxide, iron arylalkoxide); an organic compound of magnesium; and a dihydrocarbyl hydrogen phosphite. The aforementioned catalytic system is particularly useful for the polymerization of 1,3-butadiene for providing 1,2 syndiotactic polybutadiene having a melting point that can range from 100° C. to 190° C., according to the components and the ratios between the different components present in said catalytic system.

Catalytic systems comprising, for example, iron diethyl bis(2,2'-bipyridine) [FeEt$_2$(bipy)$_2$] and methylaluminoxane (MAO), or comprising various iron dichloride (FeCl$_2$) complexes with bidentate aromatic amines (e.g. N,N,N',N'-tetramethylethylenediamine (tmeda), N,N'-dimethylethylenediamine (dmeda), 2,2'-bipyridine (bipy), 1,10-phenanthroline (phen), and compounds of aluminum [for example, aluminum alkyls (AlR$_3$ wherein R is ethyl, iso-butyl), methylaluminoxane (MAO)], are extremely active in the (co)polymerization of conjugated dienes, as described, for example, in international patent application WO 02/102861; or in Bazzini C. et al., "*Macromolecular Rapid Communications*" (2002), Vol. 23(15), pg. 922-927; Bazzini C. et al., "*Polymer Communication*" (2004), Vol. 45, pg. 2871-2875; Ricci G. et al., "*Journal of Molecular Catalysis A: Chemical*" (2003), Vol. 204-205, pg. 287-293; Ricci G. et al., "*Coordination Chemistry Reviews*" (2010), Vol. 254, Issues 5-6, pg. 661-676. Such catalytic systems are able to provide polybutadienes with a prevalently 1,2 structure; in particular, the polybutadienes obtained at low temperatures have an approximately 90% 1,2 structure and a 50% syndiotactic pentads content, and the 1,2 unit and syndiotactic pentads content is reduced as the polymerization temperature increases. Furthermore, the polybutadienes obtained with the aforementioned catalytic systems have a very high weight-average molecular weight ($M_w$) and a rather restricted polydispersity index (PDI) corresponding to the ratio $M_w/M_n$ ($M_n$=number-average molecular weight) e.g., ranging from 1 to 2, indicating a "pseudo-living" nature of said catalytic systems which are indicated as "single site". A significant effect of the nature of the amine ligand on the catalytic activity of said catalytic systems has also been observed: in particular, the catalytic activity is reduced as the steric size of the ligand increases. Furthermore, the type of aluminum compound may also affect the catalytic activity: in fact, it has been observed that when methylaluminoxane (MAO) is used, there is an increase in the 1,2 unit content under the same polymerization conditions. Furthermore, the aforementioned catalytic systems were shown to be extremely active and selective not only in the polymerization of 1,3-butadiene but also in the (co)polymerization of other conjugated dienes, such as isoprene, 2,3-dimethyl-1,3-butadiene, 3-methyl-1,3-pentadiene, providing (co)polymers with different structures, such as 3,4 syndiotactic polyisoprene, cis-1,4poly(2,3-dimethyl-1,3-butadiene), E-1,2-syndiotactic poly(3-methyl-1,3-pentadiene).

Catalytic systems comprising iron terpyridine complexes [for example, $FeCl_3$(terpyridine)], in combination with suitable alkylating agents, are useful in the stereospecific polymerization of conjugated dienes: said catalytic systems show discrete catalytic activity and are able to provide polybutadienes with a trans-1,4 structure as described, for example, in Nakayama Y. et al., "*Macromolecules*" (2003), Vol. 36(21), pg. 7953-7958. Catalytic systems obtained through the combination of iron (III) carboxylates (for example, iron (III) 2-ethylhexanoate [Fe(2-EHA)$_3$]Fe(III) with aluminum tri-iso-butyl (Al$^i$Bu$_3$) in hexane, in the presence of phosphates (for example, triethylphosphate) are able to polymerize 1,3-butadiene to polybutadiene with a prevalently 1,2 structure and with a high degree of syndiotacticity as described, for example, in Gong D. et al., "*Polymer*" (2009), Vol. 50, pg. 5980-5986.

Catalytic systems comprising complexes obtained from iron (III) chloride (FeCl$_3$) or from iron(II) chloride tetrahydrate (FeCl$_2$.4H$_2$O) with substituted 2,6-bis[1-(iminophenyl)ethyl]pyridine or 2,6-bis(imino)pyridine, in the presence of methylaluminoxane (MAO), are able to provide polybutadienes with a high 1,4-trans structure (>90%), or with a 1,4-cis/1,4-trans mixed structure, as a function of the catalytic system used as described, for example, in Gong D. et al., "*Polymer*" (2009), Vol. 50, pg. 6259-6264; Gong D. et al., "*Inorganic Chimica Acta*" (2011), Vol. 373, Issue 1, pg. 47-53. Catalytic systems comprising complexes obtained from iron (III) chloride (FeCl$_3$) or from iron(II) chloride tetrahydrate (FeCl$_2$.4H$_2$O) with substituted 2,6-bis[1-(2-benzimidazolyl)]pyridine or 2,6-bis(pyrazolyl)pyridine, in the presence of modified methylaluminoxane (MMAO) or diethylaluminum chloride (AlEt$_2$Cl), are able to provide polybutadienes with a different structure, i.e. 1,4-trans or 1,4-cis, as a function of the catalytic system used as described, for example, in Gong D. et al., "*Journal of Organometallic Chemistry*" (2012), Vol. 702, pg. 10-18.

Pincered bis-imine complexes of iron (II) [Fe(II) in combination with aluminum alkyl [for example, tri-methylaluminum (AlMe$_3$) are able to provide polybutadienes with an essentially 1,4-cis structure (≥70%) as described, for example, in Zhang J. et al., "*Dalton Transactions*" (2012), Vol. 41, pg. 9639-9645.

Catalytic systems comprising imine-pyridine complexes of iron (II), aluminum alkyls (for example, AlR$_3$ wherein R is ethyl, iso-butyl), and boron salts, are able to polymerize isoprene to polyisoprene with a high 1,4-trans structure as described, for example, in Raynaud J. et al., "*Angewandte Chemie International Edition*" (2012), Vol. 51, pg. 11805-11808; or in international patent application WO 2012/109343.

Catalytic systems comprising iron (II) complexes with substituted 2-pyrazole-1,10-phenanthroline and aluminum alkyls (for example, AlR$_3$ wherein R is ethyl, iso-butyl, octyl), are characterized by a high and selective catalytic activity and are able to provide polybutadienes with a high 1,4-trans structure as described, for example, in Wang B. et al., "*Polymer*" (2013), Vol. 54, pg. 5174-5181.

Catalytic systems comprising iron (II) complexes with 2-(N-arylcarboxyimidoylchloride)quinoline and aluminum alkyls [for example, AlR$_3$ wherein R is ethyl, iso-butyl; or methylaluminoxane (MAO)], are characterized by low catalytic activity and are able to provide polybutadienes with a high 1,4-cis structure as described, for example, in Liu H. et al., "*Journal of Molecular Catalysis A: Chemical*" (2014), Vol. 391, pg. 25-35.

Catalytic systems comprising iron (II) complexes with 2,6-bis(dimethyl-2-oxazoline-2-yl)pyridine and aluminum alkyls [e.g. AlR$_3$ wherein R is ethyl, iso-butyl; or methylaluminoxane (MAO)], are able to provide polybutadienes with a mixed 1,4-cis/1,4-trans structure as described, for example, in Gong D. et al., "*Journal of Molecular Catalysis A: Chemical*" (2015), Vol. 406, pg. 78-84.

Finally, polybutadienes with "soft/hard" stereoblocks, with a mixed 1,4-cis/1,2 structure were obtained using the catalytic system 2-ethylhexanoate of iron/tri-iso-butylaluminum/diethyl phosphate [Fe(2-EHA)$_3$/Al$^i$Bu)$_3$/DEP], appropriately varying the aluminum/iron (Al/Fe) ratio as described, for example, in Zheng W. et al., "*Journal of Polymer Science Part A: Polymer Chemistry*" (2015), Vol. 53, Issue 10, pg. 1182-1188. Since (co)polymers of conjugated dienes, in particular polybutadiene and polyisoprene, can be advantageously used in various sectors such as, for example, in the automotive sector for producing tires, in particular for tire treads, the study of new catalytic systems able to provide said (co)polymers is still of great interest.

The Applicant has faced the problem of finding a new pyridyl iron (III) complex that can be used in a catalytic system able to provide conjugated diene (co)polymers, such as linear or branched polybutadiene, or linear or branched polyisoprene with a mixed structure.

The Applicant has now found a new pyridyl iron (III) complex having general formula (I) or (II) defined below, that can be used in a catalytic system able to provide conjugated diene (co)polymers, such as linear or branched polybutadiene, or linear or branched polyisoprene with a mixed structure. Said catalytic system allows the microstructure of conjugated diene (co)polymers to be modulated, i.e. the 1,4-cis, 1,4-trans and 1,2 unit content in the polybutadiene and the 1,4-cis, 1,4-trans and 3,4 unit content in the polyisoprene, according to the different end uses (e.g., use for manufacturing tires). Furthermore, the use of iron(III) compounds for the purpose of preparing said pyridyl iron (III) complex is advantageous from an economic point of view.

Therefore, the present invention relates to a process for preparing conjugated diene (co)polymers comprising-polymerizing at least one conjugated diene in the presence of a catalytic system comprising:

(a) at least one pyridyl iron (III) complex having general formula (I) or (II):

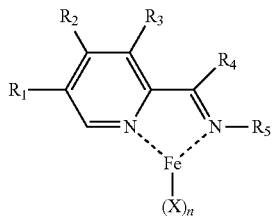

(I)

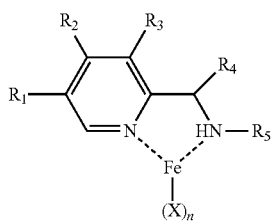

(II)

wherein:
- $R_1$, $R_2$, $R_3$ and $R_4$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups;
- $R_5$ represents a hydrogen atom, or is selected from linear or branched, optionally halogenated $C_1$-$C_{20}$, preferably $C_1$-$C_{15}$, alkyl groups, optionally substituted cycloalkyl groups, optionally substituted aryl groups;
- X, identical or different, represent a halogen atom such as chlorine, bromine, iodine; or are selected from linear or branched $C_1$-$C_{20}$, preferably $C_1$-$C_{15}$, alkyl groups, —$OCOR_6$ groups or —$OR_6$ groups wherein $R_6$ is selected from linear or branched $C_1$-$C_{20}$, preferably $C_1$-$C_{15}$, alkyl groups.
- n is 3;

(b) at least one co-catalyst selected from organo-aluminum derivatives, preferably from:
($b_1$) aluminum compounds having general formula (III):

wherein $R_7$ represents a hydrogen atom, or is selected from linear or branched $C_1$-$C_{20}$ alkyl groups, cycloalkyl groups, aryl groups, alkylaryl groups, arylalkyl groups, alkoxy groups; $R_8$ and $R_9$, identical or different, are selected from linear or branched $C_1$-$C_{20}$ alkyl groups, cycloalkyl groups, aryl groups, alkylaryl groups, arylalkyl groups;

($b_2$) aluminoxanes having general formula (IV):

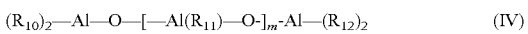

wherein $R_{10}$, $R_{11}$ and $R_{12}$, identical or different, represent a hydrogen atom, or a halogen atom such as, for example, chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and m is an integer ranging from 0 to 1000;

($b_3$) partially hydrolyzed organo-aluminum derivatives;

($b_4$) haloaluminum alkyls having general formula (V) or (VI):

wherein p is 1 or 2; q is an integer ranging from 1 to 5; $R_{13}$, identical or different, are selected from linear or branched $C_1$-$C_{20}$ alkyl groups; X' represents a chlorine or bromine atom, preferably chlorine;

provided that said co-catalyst (b) is not selected from organo-boron derivatives.

The present invention also relates to a catalytic system comprising:
(a) at least one pyridyl iron (III) complex having general formula (I) or (II):

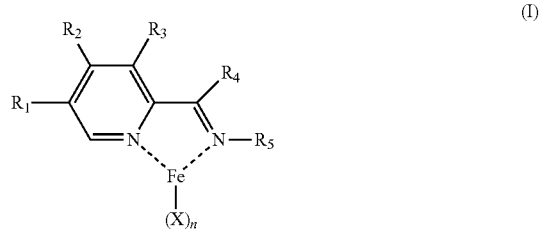

(I)

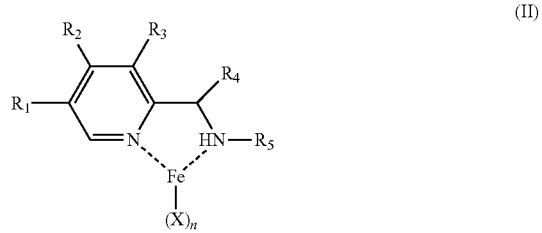

(II)

wherein:
- $R_1$, $R_2$, $R_3$ and $R_4$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups;
- $R_5$ represents a hydrogen atom, or is selected from linear or branched, optionally halogenated $C_1$-$C_{20}$, preferably $C_1$-$C_{15}$, alkyl groups, optionally substituted cycloalkyl groups, optionally substituted aryl groups;
- X, identical or different, represent a halogen atom such as chlorine, bromine, iodine; or are selected from linear or branched $C_1$-$C_{20}$, preferably $C_1$-$C_{15}$, alkyl groups, —$OCOR_6$ groups or —$OR_6$ groups wherein $R_6$ is selected from linear or branched $C_1$-$C_{20}$, preferably $C_1$-$C_{15}$, alkyl groups.
- n is 3;

(b) at least one co-catalyst selected from organo-aluminum derivatives, preferably from:
($b_1$) aluminum compounds having general formula (III):

wherein $R_7$ represents a hydrogen atom, or is selected from linear or branched $C_1$-$C_{20}$ alkyl groups, cycloalkyl groups, aryl groups, alkylaryl groups, arylalkyl groups, alkoxy groups; $R_8$ and $R_9$, identical or different, are selected from linear or branched $C_1$-$C_{20}$ alkyl groups, cycloalkyl groups, aryl groups, alkylaryl groups, arylalkyl groups;

($b_2$) aluminoxanes having general formula (IV):

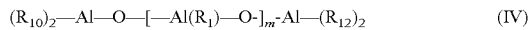

wherein $R_{10}$, $R_{11}$ and $R_{12}$, identical or different, represent a hydrogen atom, or a halogen atom such as, for example, chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and m is an integer ranging from 0 to 1000;

($b_3$) partially hydrolyzed organo-aluminum derivatives;

($b_4$) haloaluminum alkyls having general formula (V) or (VI):

wherein p is 1 or 2; q is an integer ranging from 1 to 5; $R_{13}$, identical or different, are selected from linear or branched $C_1$-$C_{20}$ alkyl groups; X' represents a chlorine or bromine atom, preferably chlorine;

provided that said co-catalyst (b) is not selected from organo-boron derivatives.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

For the purpose of the present description and of the following claims, the term "optionally halogenated $C_1$-$C_{20}$ alkyl groups" means alkyl groups having from 1 to 20 carbon atoms, linear or branched, saturated or unsaturated, wherein at least one of the hydrogen atoms is substituted with a halogen atom such as, for example, fluorine, chlorine, bromine, preferably fluorine, chlorine. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluoroctyl, perfluorodecyl.

For the purpose of the present description and of the following claims, the term "cycloalkyl groups" means cycloalkyl groups having from 3 to 30 carbon atoms. Said cycloalkyl groups can be optionally substituted with one or more groups, identical or different, selected from: halogen atoms; hydroxyl groups, $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethlylcyclopentyl, 2-cyclooctylethyl, methylcyclohexyl, methoxycyclohexyl, fluorocyclohexyl, phenylcyclohexyl.

For the purpose of the present description and of the following claims, the term "aryl groups" means carbocyclic aromatic groups. Said aryl groups can be optionally substituted with one or more groups, identical or different, selected from: halogen atoms, such as, fluorine, chlorine, bromine; hydroxyl groups, $C_1$-$C_{12}$ alkyl groups; $C_1$-$C_{12}$ alkoxy groups; cyano groups; amino groups; nitro groups. Specific examples of aryl groups are: phenyl, 2-methylphenyl, 4-methylphenyl, 2-tert-butylphenyl, 2,4,6-trimethylphenyl, 2-iso-propylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

For the purpose of the present description and of the following claims, the term "$C_1$-$C_{20}$ alkoxy groups" means groups comprising an oxygen atom to which a linear or branched $C_1$-$C_{20}$ alkyl group is bonded. Specific examples of $C_1$-$C_{20}$ alkoxy groups are: methoxy, ethoxy, n-propoxy, iso-propoxy, n-butoxy, iso-butoxy, t-butoxy, pentoxy, hexyloxy, heptyloxy, octyloxy, nonyloxy, decyloxy, dodecyloxy.

For the purpose of the present description and of the following claims, the term "alkylaryl groups" means aryl groups substituted with one or more groups, identical or different, selected from $C_1$-$C_{12}$ alkyl groups. Specific examples of alkylaryl groups are: 2-methylphenyl, 4-methylphenyl, 2,4,6-trimethylphenyl, 2,6-di-iso-propylphenyl.

For the purpose of the present description and of the following claims, the term "arylalkyl groups" means alkyl groups substituted with an aryl group. Specific examples of arylalkyl groups are: benzyl, phenylethyl, 6-naphthylhexyl.

In accordance with a preferred embodiment of the present invention, in said pyridyl iron (III) complex having general formula (I) or (II):

$R_1$, $R_2$, $R_3$ and $R_4$, identical or different, represent a hydrogen atom; or are selected from linear or branched $C_1$-$C_{20}$ alkyl groups; preferably $R_1$, $R_2$ and $R_3$ represent a hydrogen atom and $R_4$ represents a hydrogen atom or a methyl group;

$R_5$ is selected from aryl groups optionally substituted with linear or branched $C_1$-$C_{20}$ alkyl groups, preferably with one or more methyl, ethyl, tert-butyl or iso-propyl groups; preferably represents a phenyl group, a 2-methylphenyl group, a 2-ethylphenyl group, a 2-tert-butylphenyl group, a 2-iso-propylphenyl group, a 2,6-diethylphenyl group, a 2,6-di-iso-propylphenyl, or a 2,4,6-trimethylphenyl group; or is selected from optionally substituted cycloalkyl groups, preferably represents a cyclohexyl group;

X, mutually identical, are a halogen atom such as, for example, chlorine, bromine, iodine; preferably represent a chlorine atom;

n is 3.

The pyridyl iron (III) complex having general formula (I) or (II) can be considered, in accordance with the present invention, under any physical form such as, for example, the isolated and purified solid form, the form solvated with a suitable solvent, or the one supported on suitable organic or inorganic solids, preferably having a granular or powdered physical form.

The pyridyl iron (III) complex having general formula (I) or (II) is prepared starting from ligands known in the prior art.

Specific examples of ligands useful for the purpose of the present invention are those having the following formulae (L1)-(L8), (L1A)-(L8A):

(L1)
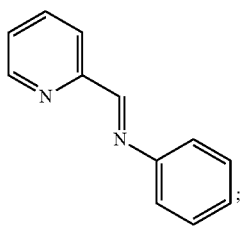
(L1A)
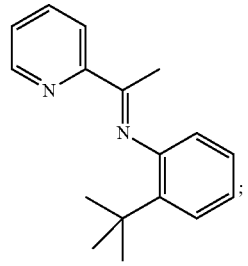
(L2)
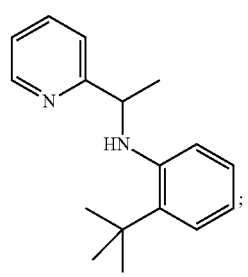
(L2A)
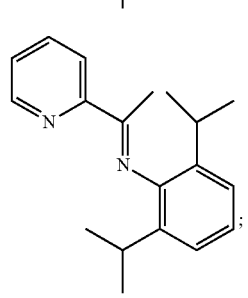
(L3)
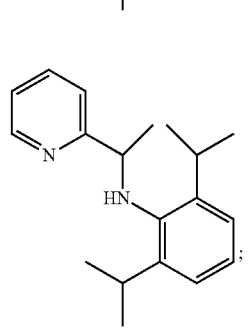
(L3A)
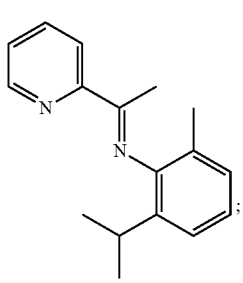
(L4)
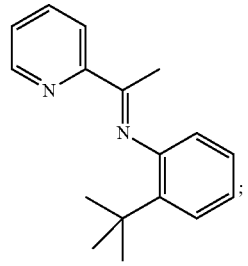
(L4A)
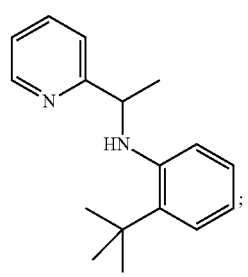
(L5)
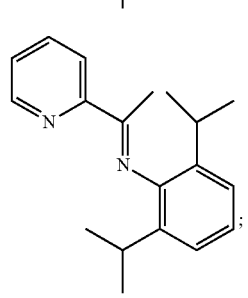
(L5A)
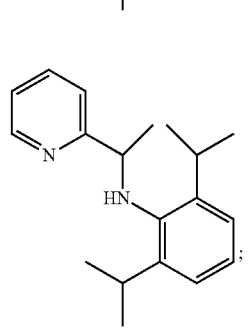
(L6)
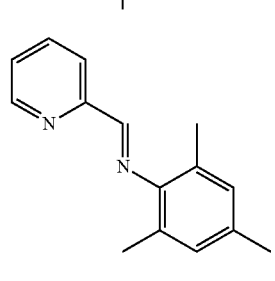
(L6A)
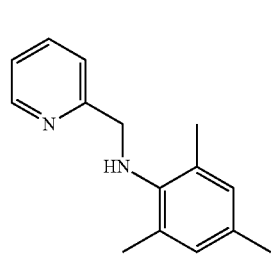

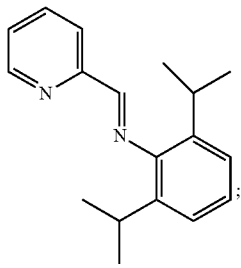

(L7)

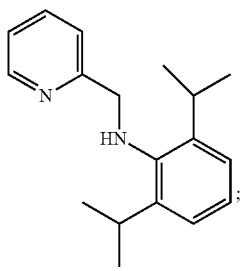

(L7A)

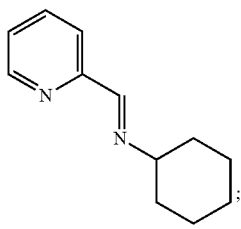

(L8)

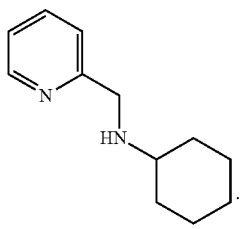

(L8A)

Said ligands having formulae (L1)-(L8), (L1A)-(L8A), can be prepared through processes known in the prior art. For example, said ligands having formulae (L1)-(L8), can be prepared through a process comprising: (1) condensation reactions between a suitable aniline or cyclohexylamine and 2-pyridinecarboxaldehyde or 2-acetylpyridine, with formation of the corresponding imine as described, for example, in: Wu J. et al., "*Journal of American Chemical Society*" (2009), Vol. 131(36), pg. 12915-12917; Laine V. T. et al., "*European Journal of Inorganic Chemistry*" (1999), Vol. 6, pg. 959-964; Bianchini C. et al., "*New Journal of Chemistry*" (2002), Vol. 26(4), pg. 387-397; Lai Yi-C. et al., "*Tetrahedron*" (2005), Vol. 61(40), pg. 9484-9489. Said ligands having formulae (L1)-(L8) can be reacted with at least one reducing agent (for example, sodium borohydride) to provide the ligands having formulae (L1A)-(L8A).

The pyridyl iron (III) complex having general formula (I) or (II) may be prepared according to processes known in the prior art. For example, said pyridyl iron (III) complex having general formula (I) or (II) can be prepared by reaction between iron compounds having general formula $Fe(X)_3$ wherein X is a halogen atom such as, for example, chlorine, bromine, iodine, preferably chlorine, as such or complexed with ethers [for example, diethylether, tetrahydrofuran (THF), dimethoxyethane], or with water, with suitable pyridine ligands such as the ligands having formulae (L1)-(L8) or (L1A)-(L8A) reported above, in molar ratio ligand (L)/iron (Fe) ranging from 1 to 2 operating, preferably, in the presence of at least one solvent which can be selected, for example, from: chlorinated solvents (for example, dichloromethane, ether solvents, [for example, tetrahydrofuran (THF)], alcoholic solvents (for example, butanol), hydrocarbon solvents (for example, toluene, hexane), or mixtures thereof, at a temperature ranging from room temperature to 110° C. The pyridyl iron (III) complex having general formula (I) or (II) thus obtained can be subsequently recovered by means of methods known in the prior art such as, for example, washing the solid product obtained with a suitable solvent (for example, heptane), followed by drying (for example, under vacuum). More details on the process for the preparation of said pyridyl iron (III) complex having general formula (I) or (II) can be found in the following examples.

For the purpose of the present description and of the following claims the expression "room temperature" means a temperature ranging from 20° C. to 25° C.

In accordance with a preferred embodiment of the present invention, said aluminum compounds having general formula (III) ($b_1$) can be selected, for example, from: diethylaluminum hydride, di-n-propylaluminum hydride, di-n-butylaluminum hydride, di-iso-butyl-aluminum hydride (DIBAH), diphenylaluminum hydride, di-p-tolylaluminum hydride, dibenzylaluminum hydride, diethylaluminum hydride, phenyl-n-propylaluminum hydride, p-tolylethylaluminum hydride, p-tolyl-n-propylaluminum hydride, p-tolyl-iso-propylaluminum hydride, benzylethylaluminum hydride, benzyl-n-propylaluminum hydride, benzyl-iso-propylaluminum hydride, diethylaluminum ethoxide, di-iso-butylaluminum ethoxide, dipropylaluminum ethoxide, trimethylaluminum, triethylaluminum (TEA), tri-n-propylaluminum, tri-iso-butylaluminum (TIBA), tri-n-butylaluminum, tripentylaluminum, trihexylaluminum, triciclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum, or mixtures thereof. Triethylaluminum (TEA), tri-n-propylaluminum, tri-iso-butylaluminum (TIBA), trihexylaluminum, di-iso-butylaluminum hydride (DIBAH), are particularly preferred.

As is known, aluminoxanes are compounds containing Al—O—Al bonds, with a variable O/Al ratio, obtainable according to processes known in the prior art such as, for example, by reaction, in controlled conditions, of an aluminum alkyl, or of an aluminum alkyl halogenide, with water, or with other compounds containing predetermined quantities of available water such as, for example, in the case of the reaction of aluminum trimethyl with aluminum sulfate hexahydrate, copper sulfate pentahydrate, or iron sulfate pentahydrate.

Said aluminoxanes and, in particular, methylaluminoxane (MAO), are compounds that can be obtained through known organo-metallic chemical processes such as, for example, by adding trimethyl aluminum to a suspension in aluminum sulfate hexahydrate.

In accordance with a preferred embodiment of the present invention, said aluminoxanes having general formula (IV) ($b_2$) can be selected, for example from: methylaluminoxane (MAO), ethylaluminoxane, n-butylaluminoxane, tetra-iso-butylaluminoxane (TIBAO), tert-butylaluminoxane, tetra-(2,4,4-trimethylpentyl)aluminooxane (TTMPAO), tetra-(2, 3-dimethylbutyl)aluminoxane (TDMBAO), tetra-(2,3,3-trimethylbutyl)aluminoxane (TTMBAO), or mixtures thereof. Methylaluminoxane (MAO) is particularly preferred. Further details on aluminoxanes having general formula (IV) can be found, for example, in international patent application WO 2011/061151.

In accordance with a preferred embodiment of the present invention, said partially hydrolyzed organo-aluminum derivatives ($b_3$) can be selected from aluminum compounds having general formula (III) added with at least one protonating compound, the aluminum compound having general formula (III) and the protonating compound being used in a molar ratio ranging from 0.001:1 to 0.2:1. Preferably, said protonating compound can be selected, for example, from: water; alcohols such as, for example, methanol, ethanol, iso-propyl alcohol, n-propyl alcohol, tert-butanol, iso-butyl alcohol, n-butyl alcohol; alcohols with higher molecular weight such as, for example, 1-decanol, 2-undecanol; carboxylic acids such as, for example, stearic acid; or mixtures thereof. Water is particularly preferred.

In accordance with a preferred embodiment of the present invention, said haloaluminum alkyls having general formula (V) or (VI) can be selected, for example, from: diethylchloroaluminum (AlEt$_2$Cl), dimethylaluminumchloride (AlMe$_2$Cl), ethylaluminumdichloride (AlEtCl$_2$), di-iso-butylaluminumchloride (Al(i-Bu)$_2$Cl), ethylaluminumsesquichloride (Al$_2$Et$_3$Cl$_3$), methylaluminumsesquichloride (Al$_2$Me$_3$Cl$_3$). Diethylchloroaluminum (AlEt$_2$Cl) is particularly preferred.

In general, the formation of the catalytic system comprising the pyridyl iron (III) complex having general formula (I) or (II) and the co-catalyst (b), is preferably carried out in an inert liquid medium, more preferably in a hydrocarbon solvent. The choice of the pyridyl iron (III) complex having general formula (I) or (II) and of the co-catalyst (b), as well as the particular methodology used, may vary according to the molecular structures and the desired result, according to what is similarly reported in the relevant literature accessible to an expert skilled in the art for other transition metal complexes with ligands of various nature, such as described, for example, in: Ricci G. et al., "*Advances in Organometallic Chemistry Research*" (2007), Yamamoto K. Ed., Nova Science Publisher, Inc., USA, pg. 1-36; Ricci G. et al., "*Coordination Chemistry Reviews*" (2010), Vol. 254, pg. 661-676; Ricci G. et al., "*Ferrocenes: Compounds, Properties and Applications*" (2011), Elisabeth S. Phillips Ed., Nova Science Publisher, Inc., USA, pg. 273-313; Ricci G. et al., "*Chromium: Environmental, Medical and Material Studies*" (2011), Margaret P. Salden Ed., Nova Science Publisher, Inc., USA, pg. 121-1406; Ricci G. et al., "*Cobalt: Characteristics, Compounds, and Applications*" (2011), Lucas J. Vidmar Ed., Nova Science Publisher, Inc., USA, pg. 39-81; Ricci G. et al., "*Phosphorus: Properties, Health effects and Environment*" (2012), Ming Yue Chen and Da-Xia Yang Eds., Nova Science Publisher, Inc., USA, pg. 53-94.

Preferably, when used for the formation of a catalytic (co)polymerization system in accordance with the present invention, the (co)catalysts (b) can be placed in contact with a pyridyl iron (III) complex having general formula (I) or (II), in proportions such that the molar ratio between the aluminum present in the (co)catalysts (b) and the iron present in the pyridyl iron (III) complex having general formula (I) or (II) is ranging from 1 to 10000, preferably ranging from 50 to 1000. The sequence with which the pyridyl iron (III) complex having general formula (I) or (II) and the (co)catalyst are placed in contact with each other is not particularly critical.

For the purpose of the present description and of the following claims, the terms "mole" and "molar ratio" are used both with reference to compounds consisting of molecules, and with reference to atoms and ions, omitting for the latter ones the terms gram atom or atomic ratio, even if they are scientifically more accurate.

For the purpose of the present invention, other additives or components may optionally be added to the aforementioned catalytic system so as to adapt it to satisfy specific practical requirements. The catalytic systems thus obtained can therefore be considered included within the scope of the present invention. Additives and/or components that can be added in the preparation and/or formulation of the catalytic system according to the present invention are, for example: inert solvents, such as, for example aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the (co)polymerization environment. On this point, said catalytic system can be prepared by making at least one pyridyl iron (III) complex having general formula (I) or (II) react with at least one co-catalyst (b), optionally in the presence of other additives or components selected from those cited above, in the presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples reported below.

Alternatively, said catalytic system can be prepared in situ, i.e. directly in the (co)polymerization environment. On that point, said catalytic system can be prepared by separately introducing the pyridyl iron (III) complex (a) having general formula (I) or (II), the co-catalyst (b) and the pre-selected conjugated diene(s) to be (co)polymerized, operating at the conditions wherein the (co)polymerization is carried out.

For the purpose of the present invention, the aforementioned catalytic systems can also be supported on inert solids, preferably comprising silicon and/or aluminum oxides, such as, for example, silica, alumina or silico-aluminates. For supporting said catalytic systems the known supporting techniques can be used, generally comprising contact, in a suitable inert liquid medium, between the support, optionally activated by heating to temperatures over 200° C., and one or both components (a) and (b) of the catalytic system according to the present invention. It is not necessary, for the purposes of the present invention, for both components to be supported, since only the pyridyl iron (III) complex (a) having general formula (I) or (II), or the co-catalyst (b) may be present on the support surface. In the latter case, the missing component on the surface is subsequently placed in contact with the supported component when the active catalyst is to be formed by polymerization. The scope of the present invention also includes the pyridyl iron (III) complex having general formula (I) or (II), and the catalytic systems based thereon, which are supported on a solid through the functionalization of the latter and the formation of a covalent bond between the solid and the pyridyl iron (III) complex having general formula (I) or (II).

The quantity of the pyridyl iron (III) complex (a) having general formula (I) or (II) and co-catalyst (b) which can be used in the process according to the present invention varies according to the (co)polymerization process to be carried out. Said quantity is however such as to obtain a molar ratio between the aluminum present in the co-catalyst (b) and the iron present in the pyridyl iron (III) complex having general formula (I) or (II), comprised between the values reported above.

Specific examples of conjugated dienes that can be used in the process according to the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. Preferred (co)polymerizable conjugated dienes are 1,3-butadiene, isoprene. The aforementioned (co)polymerizable conjugated dienes can be used alone, or mixed with two or more dienes. In this latter case, i.e. using a mixture of two or more dienes, a copolymer will be obtained.

Generally, the process according to the present invention can be carried out in the presence of a polymerization solvent, generally selected from inert organic solvents such as, for example: saturated aliphatic hydrocarbons such as, for example, butane, pentane, hexane, heptane, or mixtures thereof; saturated cycloaliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably, the (co)polymerization solvent is selected from saturated aliphatic hydrocarbons.

Alternatively, said process may be carried out using as a (co)polymerization solvent the same conjugated diene(s) that must be (co)polymerized, in accordance with the process known as "bulk process".

Generally, the concentration of the conjugated diene to be (co)polymerized in said (co)polymerization solvent is ranging from 5% by weight to 50% by weight, preferably ranging from 10% by weight to 20% by weight, with respect to the total weight of the mixture conjugated diene and inert organic solvent.

Generally, said process can be carried out at a temperature ranging from −70° C. to +100° C., preferably ranging from −20° C. to +80° C.

With regard to pressure, it is preferable to operate at the pressure of the components of the mixture to be (co)polymerized.

Said process can be carried out both continuously and in batches.

As mentioned above, the process according to the present invention allows conjugated diene (co)polymers to be obtained such as, for example, linear or branched polybutadiene or linear or branched polyisoprene with a mixed structure, i.e. polybutadiene with a variable 1,4-cis, 1,4-trans and 1,2 unit content, or polyisoprene with a variable 1,4-cis, 1,4-trans and 3,4 unit content which can have, therefore, different end uses (e.g., use in the automotive sector for producing tires).

For the purpose of understanding the present invention better and to put it into practice, below are some illustrative and non-limiting examples thereof.

EXAMPLES

Reagents and Materials

The list below shows the reagents and materials used in the following examples of the invention, any pre-treatments thereof and their manufacturer:

iron (III) chloride ($FeCl_3$) (Aldrich): purity 99.9%, used as such;
methylaluminoxane (MAO) (toluene solution 10% by weight) (Crompton): used as such;
aniline (Aldrich): distilled at reduced pressure and stored in an inert atmosphere;
hydrochloric acid in 37% aqueous solution (Aldrich): used as such;
o-toluidine (Aldrich): distilled at reduced pressure and stored in an inert atmosphere;
2-iso-propylaniline (Aldrich): distilled at reduced pressure and stored in an inert atmosphere;
2-tert-butylaniline (Aldrich): distilled at reduced pressure and stored in an inert atmosphere;
2,6-di-iso-propylaniline (Aldrich): distilled at reduced pressure and stored in an inert atmosphere;
ethyl ether (Aldrich): pure, ≥99%, distilled over sodium (Na) in an inert atmosphere;
2,4,6-tri-methylaniline (Aldrich): distilled at reduced pressure and stored in an inert atmosphere;
2-pyridinecarboxaldehyde (Aldrich): used as such;
2-acetylpyridine (Aldrich): used as such;
cyclohexylamine (Aldrich): used as such;
ethyl acetate (Aldrich): used as such;
hexane (Aldrich): pure, ≥99%, distilled over sodium (Na) in an inert atmosphere;
heptane (Aldrich): pure, ≥99%, distilled over sodium (Na) in an inert atmosphere;
methanol (Carlo Erba, RPE): used as such;
anhydrous methanol (Aldrich): purity 99.8%, used as such;
ethanol (Carlo Erba, RPE): used as such;
anhydrous ethanol (Aldrich): purity 99.8%, used as such;
pentane (Aldrich): purity 99.8%, used as such;
chloroform (Aldrich): pure, ≥99.9%, used as such;
sodium borohydride (Aldrich): purity 99%, used as such;
anhydrous sodium sulfate ($Na_2SO_4$) (Aldrich): pure, ≥99%, used as such;
magnesium sulfate (MgSO4) (Aldrich): pure, ≥99%, used as such;
toluene (Aldrich): pure, ≥99.5%, distilled over sodium (Na) in an inert atmosphere;
1,3-butadiene (Air Liquide): pure, ≥99.5%, evaporated from the container before each production, dried by passing it through a molecular sieve packed column and condensed inside the reactor that was pre-cooled to −20° C.;
isoprene (Aldrich): pure, ≥99%, refluxed over calcium hydride for 2 hours, then distilled "trap-to-trap" and stored in a nitrogen atmosphere at 4° C.;
formic acid (HCOOH) (Aldrich): purity ≥95%, used as such;
p-toluenesulfonic acid monohydrate ($CH_3C_6H_4SO_3H.H_2O$) (Aldrich): purity 98%, used as such;
hydrofluoric acid (HF) (40% aqueous solution) (Aldrich): used as such;
sulfuric acid ($H_2SO_4$) (96% aqueous solution) (Aldrich): used as such, or diluted with distilled water (1/5);
nitric acid ($HNO_3$) (70% aqueous solution) (Aldrich): used as such;
sodium carbonate ($Na_2CO_3$) (Aldrich): used as such;
silver nitrate ($AgNO_3$) (Aldrich): used as such;
deuterated tetrachloroethylene ($C_2D_2Cl_4$) (Acros): used as such;
hexamethyldisiloxane (HMDSO) (Acros): used as such;
deuterated chloroform ($CDCl_3$) (Acros): used as such;

deuterated dichloromethane (CD$_2$Cl$_2$) (Acros): used as such;

tetramethylsilane (TMS) (Acros): used as such.

The analysis and characterization methodologies reported below were used.

Elementary Analysis a) Determination of Fe

For the determination of the quantity by weight of iron (Fe) in the pyridyl iron complexes used for the purpose of the present invention, an exactly weighed aliquot, operating in dry-box under nitrogen flow, of about 30 mg-50 mg of sample, was placed in a 30 ml platinum crucible, together with a mixture of 1 ml of 40% hydrofluoric acid (HF), 0.25 ml of 96% sulfuric acid (H$_2$SO$_4$) and 1 ml of 70% nitric acid (HNO$_3$). The crucible was then heated on a hot plate increasing the temperature until white sulfur fumes appeared (about 200° C.). The mixture thus obtained was cooled to room temperature and 1 ml of 70% nitric acid (HNO$_3$) was added, then it was left again until fumes appeared. After repeating the sequence another two times, a clear, almost colorless, solution was obtained. 1 ml of nitric acid (HNO$_3$) and about 15 ml of water were then added cold, then heated to 80° C. for about 30 minutes. The sample thus prepared was diluted with MilliQ pure water until it weighed about 50 g, precisely weighed, to obtain a solution on which the instrumental analytical determination was carried out using a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before carrying out spectrophotometric measurement. All the samples were prepared in double quantities. The results were considered acceptable if the individual repeated test data did not have a relative deviation of more than 2% with respect to their mean value.

b) Determination of Chlorine

For said purpose, samples of the pyridyl iron complexes used for the purpose of the present invention, about 30 mg-50 mg, were precisely weighed in 100 ml glass beakers in dry-box under nitrogen flow. 2 g of sodium carbonate (Na$_2$CO$_3$) were added and, outside the dry-box, 50 ml of MilliQ water. It was brought to the boil on the hot plate, under magnetic stirring, for about 30 minutes. It was left to cool, then 1/5 diluted sulfuric acid (H$_2$SO$_4$) was added, until acid reaction and was then titrated with 0.1 N silver nitrate (AgNO$_3$) with a potentiometric titrator.

c) Determination of Carbon, Hydrogen and Nitrogen

The determination of carbon, hydrogen and nitrogen, in the pyridyl iron complexes used for the purpose of the present invention, as well as in the ligands used for the purpose of the present invention, was carried out through a Carlo Erba automatic analyzer Mod. 1106.

$^{13}$C-HMR and $^1$H-HMR Spectra

The $^{13}$C-HMR and $^1$H-HMR spectra were recorded using a nuclear magnetic resonance spectrometer mod. Bruker Avance 400, using deuterated tetrachloroethylene (C$_2$D$_2$Cl$_4$) at 103° C., and hexamethyldisiloxane (HDMSO) as internal standard, or using deuterated chloroform (CDCl$_3$), at 25° C., and tetramethylsilane (TMS) as internal standard. For this purpose, polymeric solutions were used with concentrations equal to 10% by weight with respect to the total weight of the polymeric solution.

The microstructure of the polymers [i.e. 1,4-cis (%) 1,4-trans (%) and 1.2(%) unit content for polybutadiene and 1,4-cis (%), 1,4-trans (%) and 3.4(%) unit content for polyisoprene] was determined through the analysis of the aforementioned spectra based on the contents of literature by Mochel, V. D., in "*Journal of Polymer Science Part A-1: Polymer Chemistry*" (1972), Vol. 10, Issue 4, pg. 1009-1018 for polybutadiene, and by Sato H. et al. in "*Journal of Polymer Science: Polymer Chemistry Edition*" (1979), Vol. 17, Issue 11, pg. 3551-3558, for polyisoprene.

FT-IR Spectra (Solid State—UATR)

The FT-IR spectra (solid state—UATR) were recorded using a Bruker IFS 48 spectrophotometer equipped with a Thermo Spectra-Tech horizontal ATR connection. The section wherein the samples to be analyzed are placed is a Fresnel ATR accessory (Shelton, Conn., USA) which uses crystals of zirconium selenide (ZrSe) with an angle of incidence of 45° in the horizontal direction.

The FT-IR spectra (solid state—UATR) of the pyridyl iron complexes used for the purpose of the present invention, were obtained by inserting samples of the pyridyl iron (III) complexes to be analyzed into said section.

I.R. Spectra

The I.R. spectra (FT-IR) were recorded through Thermo Nicolet Nexus 670 and Bruker IFS 48 spectrophotometers.

The I.R. spectra (FT-IR) of the ligands used for the purpose of the present invention, were obtained by dispersing the ligand to be analyzed in anhydrous potassium bromide (KBr) (KBr disks), or in nujol solution.

The I.R. spectra (FT-IR) of the polymers were obtained from polymeric films on potassium bromide (KBr) tablets, said films being obtained through the deposition of a solution in hot 1,2-dichlorobenzene of the polymer to be analyzed. The concentration of the polymeric solutions analyzed was equal to 10% by weight with respect to the total weight of the polymeric solution.

Determination of the Molecular Weight

The determination of the molecular weight (MW) of the polymers obtained was carried out through GPC ("Gel Permeation Chromatography"), using the Waters® Alliance® GPC/V 2000 System by Waters Corporation which uses two detection lines: Refractive Index (RI) and viscometer operating under the following conditions:

two PLgel Mixed-B columns;
solvent/eluent: o-dichlorobenzene (Aldrich);
flow rate: 0.8 ml/min;
temperature: 145° C.;
molecular mass calculation: Universal Calibration method.

The weight-average molecular weight ($M_w$) and the polidispersity index (PDI) are reported, corresponding to the ratio $M_w/M_n$ ($M_n$=number-average molecular weight).

Mass Spectra

The mass spectra of the ligands used for the purpose of the present invention were carried out with a Trace DSQ single quadrupole mass spectrometer (Thermo ISQ) in Electronic Ionization (EI) mode, operating under the following conditions:

scanning: from 35 amu to 600 amu (amu=atomic mass unit);
temperature of the source: 250° C.;
transfer line temperature: 300° C.;
capillary column: MDN-5S (Supelco) (length=30 m; diameter=0.25 mm; stationary phase thickness=0.25 µm);
carrier gas: helium (He) with constant flow equal to 1 ml/min.

X-Ray Diffraction (XRD) XR SPECTRUM

For that purpose, samples of the powdered polymers obtained (about 100 mg), were analyzed by means of X-ray diffraction (XRD) using a Bruker P4 diffractometer equipped with a HiStar 2D detector using Cu KR monochromatic radiation (λ) (1.54179 Å) of graphite and a sample-detector distance of 10 cm.

Example 1

Synthesis of Ligand Having Formula (L1)

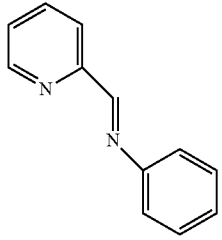

(L1)

In a 500 ml flask, 2-pyridinecarboxaldehyde (30 g, 280 mmoles) and some drops of formic acid were added to a solution of aniline (26.1 g, 280 mmoles) in methanol (250 ml): the mixture obtained was maintained, under stirring, at room temperature, for 48 hours. Subsequently, the solvent was removed through vacuum evaporation and the residue obtained was purified through elution on a silica gel chromatography column [eluent: mixture of heptane/ethyl acetate in ratio of 99/1 (v/v)], obtaining 38 g of a pale yellow solid (yield=74.5%) corresponding to the ligand having formula (L1).

Molecular weight (MW): 182.22.

Elementary analysis [found (calculated for $C_{12}H_{10}N_2$)]: C: 80.00% (79.10%); H: 5.83% (5.53%); N: 15.71% (15.37%).

$^1$H-NMR (CDCl$_3$, δ ppm) 8.70 (m, 1H, HPy), 8.41 (m, 1H, HPy), 8.80 (tds, 1H CH=N), 8.19 (d, 1H, HPy), 7.77 (dt, 1H, HPy), 7.23-7.42 (m, 1H, HPy; m, 5H, Ar).

Example 2

Synthesis of Ligand Having Formula (L1A)

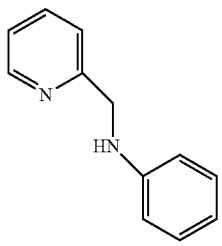

(L1A)

13 g (71.3 mmoles) of the ligand having formula (L1) obtained as described in Example 1 and 700 ml of anhydrous methanol were loaded into a 2 liter reactor, equipped with a magnetic stirrer: the whole was cooled to 0° C. with a water bath and ice and, subsequently, sodium borohydride (40 g, 1057 mmoles) was added, in small portions, under stirring. The mixture obtained was maintained, under stirring, at room temperature, all night. Subsequently, the solvent was removed through distillation at reduced pressure and the residue obtained was purified through elution on a silica gel chromatography column [eluent: mixture of heptane/ethyl acetate in ratio of 9/1 (v/v)], obtaining 9.12 g of a white crystalline solid (yield=69.5%) corresponding to the ligand having formula (L1A).

GC-MS: M$^+$=m/z 184; [M-C$_6$H$_6$]$^+$=m/z 106; [M-C$_7$H$_9$N]$^+$=m/z 77.

$^1$H-NMR (CDCl$_3$, δ ppm): 8.60 (dd, 1H, PyH), 7.64 (m, 1H, PyH), 7.35 (d, 1H, PyH), 7.22-7.17 (m, 1H, Py-2H, ArH), 6.75-6.69 (tm, 3H, ArH), 4.8 (s, 1H, NH), 4.48 (s, 2H, Py-CH$_2$N).

Example 3

Synthesis of Ligand Having Formula (L2)

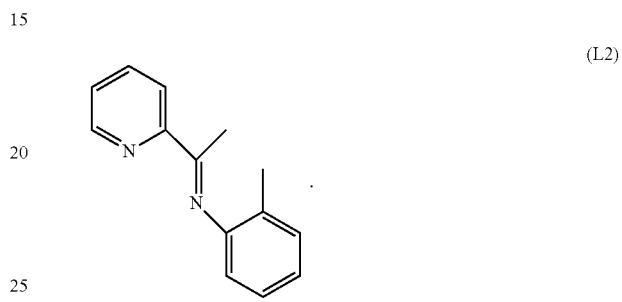

(L2)

In a 250 ml flask, 2-acetylpyridine (9.1 g, 75 mmoles) and some drops of formic acid were added to a solution of o-toluidine (8 g, 75 mmoles) in methanol (100 ml): the mixture obtained was maintained, under stirring, at room temperature, for 48 hours. Subsequently, the solvent was removed through vacuum evaporation and the residue obtained was purified through elution on a silica gel chromatography column [eluent: mixture of heptane/ethyl acetate in ratio of 99/1 (v/v)], obtaining 6.5 g of a light yellow oil (yield=40%) corresponding to the ligand having formula (L2).

Molecular weight (MW): 210.28.

Elementary analysis [found (calculated for $C_{14}H_{14}N_2$)]: C: 80.00% (79.97%); H: 6.77% (6.71%); N: 13.41% (13.32%).

$^1$H-NMR (CDC$_3$, δ ppm) 8.70 (m, 1H, HPy), 8.41 (m, 1H HPy), 8.80 (td, 1H, HPy), 7.39 (dt, 1H, HPy), 7.27-7.18 (m, 2H, Ph), 7.02 (m, 1H, Ph), 6.69 (d, 1H, Ph), 2.30 (s, 3H, N=C—CH$_3$), 2.10 (s, 3H, Ph-CH$_3$).

Example 4

Synthesis of Ligand Having Formula (L2A)

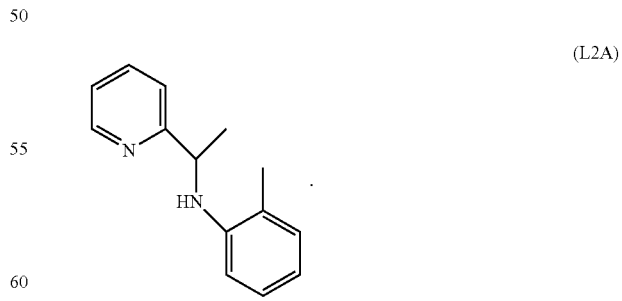

(L2A)

8 g (38 mmoles) of the ligand having formula (L2) obtained as described in Example 3 and 150 ml of anhydrous methanol were loaded into a 250 ml reactor, equipped with a magnetic stirrer: the whole was cooled to 0° C. with a water bath and ice and, subsequently, sodium borohydride (21.6 g, 571 mmoles) was added, in small portions, under stirring. The mixture obtained was maintained, under stirring, at room temperature, all night. Subsequently, the solvent was removed through distillation at reduced pressure and the residue obtained was purified through elution on a silica gel chromatography column [eluent: mixture of heptane/ethyl acetate in ratio of 9/1 (v/v)], obtaining a pale yellow oil: the whole was placed in the refrigerator, all night, obtaining 2.43 g of a white solid (yield=30%) corresponding to the ligand having formula (L2A).

Molecular weight (MW): 212.29.

GC-MS: $M^+$=m/z 212; $[M-CH_3]^+$=m/z 197; $[M-C_5H_4N]^+$=m/z 134; $[M-C_7H_8N]^+$=m/z 106.

Example 5

Synthesis of Ligand Having Formula (L3)

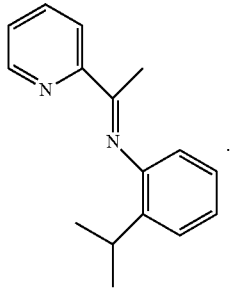

(L3)

In a 500 ml flask, 2-acetylpyridine (3.78 g; 31.1 mmoles) and p-toluenesulfonic acid monohydrate (0.15 g; 0.81 mmoles) were added to a solution of 2-iso-propylaniline (4.20 g; 31.1 mmoles) in toluene (20 ml): the mixture obtained was heated under reflux, for 2 hours. Subsequently, the solvent was removed through vacuum evaporation and the residue obtained was purified through vacuum distillation, obtaining 5.89 g of an orange oil (yield=79%) corresponding to the ligand having formula (L3).

FT-IR (nujol) (cm$^{-1}$): 1637 ($v_{C=N}$).

Molecular weight (MW): 238.

Elementary analysis [found (calculated for $C_{16}H_{18}N_2$)]: C: 80.17% (80.63%); H: 7.804% (7.61%); N: 11.91% (11.75%).

FT-IR (solid state, UATR) (cm$^{-1}$): 1637 ($v_{C=N}$).

$^1$H NMR (400 MHz, 20° C., CDCl$_3$): =8.71 (d, 1H), 8.37 (d, 1H), 7.81 (t, 1H), 7.38 (m, 2H), 7.22 (t, 1H), 7.15 (t, 1H), 6.67 (d, 1H), 3.05 (sept, 1H), 2.39 (s, 3H), 1.23 (d, 6H).

Example 6

Synthesis of Ligand Having Formula (L4)

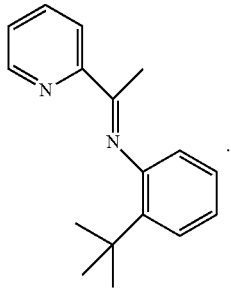

(L4)

In a 500 ml flask, 2-acetylpyridine (12.9 g, 106.5 mmoles) and some drops of formic acid were added to a solution of 2-tert-butylaniline (15.89 g, 106.5 mmoles) in methanol (300 ml): the mixture obtained was maintained, under stirring, at room temperature, for 48 hours. Subsequently, the solvent was removed by vacuum evaporation and the residue obtained was crystallized by methanol obtaining 20 g of a yellow crystalline powder (yield=75%) corresponding to the ligand having formula (L4).

Molecular weight (MW): 252.36.

Elementary analysis [found (calculated for $C_{17}H_{20}N_2$)]: C: 81.17% (80.91%); H: 8.14% (7.99%); N: 10.91% (11.10%).

FT-IR (nujol) (cm$^{-1}$): 1641 ($v_{C=N}$).

$^1$H NMR (400 MHz, 20° C., CDCl$_3$): δ=8.71 (d, 1H), 8.35 (d, 1H), 7.84 (t, 1H), 7.45 (d, 1H), 7.40 (t, 1H), 7.21 (t, 1H), 7.10 (t, 1H), 6.56 (d, 1H), 2.38 (s, 3H), 1.38 (s, 9H).

Example 7

Synthesis of Ligand Having Formula (L4A)

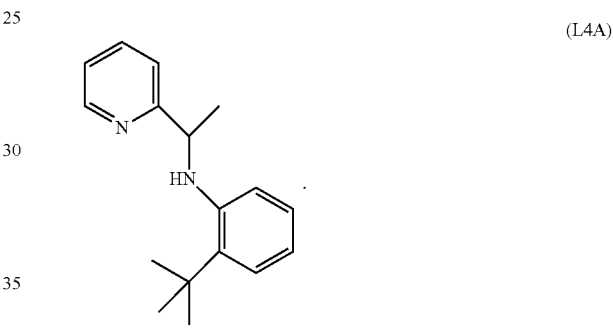

(L4A)

28 g (38 mmoles) of the ligand having formula (L4) obtained as described in Example 6 and 800 ml of anhydrous methanol were loaded into a 2 liter reactor, equipped with a magnetic stirrer: the whole was cooled to 0° C. with a water bath and ice and, subsequently, sodium borohydride (38 g, 1004 mmoles) was added, in small portions, under stirring. The mixture obtained was maintained, under stirring, at room temperature, all night, and then quenched with brine and extracted with ethyl acetate (3×100 ml). Subsequently the solvent was removed by distillation at reduced pressure and the residue obtained was purified through elution on a silica gel chromatography column [eluent: mixture of heptane/ethyl acetate in ratio of 9/1 (v/v)], and treated with cold ethyl ether, obtaining 11 g of a crystalline white solid (yield=39%) corresponding to the ligand having formula (L4A).

Molecular weight (MW): 254.

Elementary analysis [found (calculated for $C_{17}H_{22}N_2$)]: C: 80.00% (80.27%); H: 9.12% (8.72%); N: 11.31% (11.01%).

GC-MS: $M^+$=m/z 254; $[M-CH_3]^+$=m/z 239; $[M-C_4H_9]^+$=m/z 197; $[m-C_7H_{10}N_2]^+$=m/z 132; $[M-C_{10}H_{14}N]^+$=m/z 106; $[M-C_{12}H_{18}N]^+$=m/z 78.

$^1$H-NMR (CDCl$_3$, δ ppm): 8.64 (d, 1H, HPy), 7.7 (td, 1H, PyH), 7.36 (d, 1H, HPy), 7.25 (d, 1H, ArH), 7.18 (td, 1H, PyH), 6.98 (td, 1H, PyH), 6.98 (td, 1H, PyH), 6.48 (d, 1H, PyH), 5.0 (broad s, 1H, NH), 4.7 (q, 1H, NCH(CH$_3$)), 1.57 (d, 3H, —NCH(CH$_3$)), 1.5 (s, 9H, —C(CH$_3$)$_3$).

Example 8

Synthesis of Ligand Having Formula (L5)

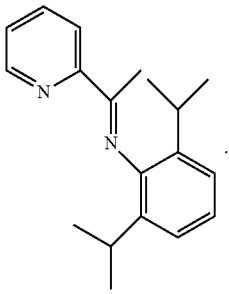
(L5)

In a 250 ml flask, 2-acetylpyridine (9.1 g, 75 mmoles) and some drops of formic acid were added to a solution of 2,6-di-iso-propylaniline (13.3 g, 75 mmoles) in methanol (100 ml): the mixture obtained was maintained, under stirring, at room temperature, for 48 hours. Subsequently, the precipitate obtained was filtered and vacuum dried, obtaining 14 g of a yellow crystalline powder (yield=67%) corresponding to the ligand having formula (L5).

Molecular weight (MW): 280.41.

Elementary analysis [found (calculated for $C_{19}H_{24}N_2$)]: C: 81.37% (81.38%); H: 8.64% (8.63%); N: 10.01% (9.99%).

$^1$H-NMR (CDCl$_3$, δ ppm) 8.69 (d, 1H, PyH), 8.38 (d, 1H, PyH), 7.82 (t, 1H, PyH), 7.39 (m, 1H, PyH), 7.11-7.20 (m, 3H, ArH), 2.75 (m, 2H, CHMe$_2$), 2.21 (s, 3H, N=CH-Me), 1.15 (d, 12H, CH(CH$_3$)$_2$).

FT-IR (nujol) (cm$^{-1}$): 1649 ($v_{C=N}$).

Example 9

Synthesis of Ligand Having Formula (L5A)

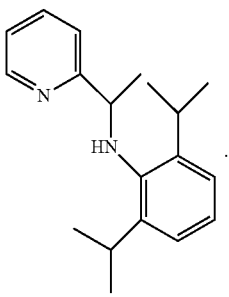
(L5A)

24 g (85.6 mmoles) of the ligand having formula (L5) obtained as described in Example 8 and 900 ml of anhydrous methanol were loaded into a 2 liter reactor, equipped with a magnetic stirrer: the whole was cooled to 0° C. with a water bath and ice and, subsequently, sodium borohydride (48.6 g, 1285 mmoles) was added, in small portions, under stirring: the mixture obtained was maintained, under stirring, at room temperature, all night, and then switched off with brine and extracted with ethyl acetate (3×100 ml). Subsequently the solvent was removed by distillation at reduced pressure and the residue obtained was purified through elution on a silica gel chromatography column [eluent: mixture of heptane/ ethyl acetate in ratio of 9/1 (v/v)], and treated with cold ethyl ether, obtaining 11 g of a crystalline white solid (yield=46%) corresponding to the ligand having formula (L5A).

Molecular weight (MW): 282.43.

Elementary analysis [found (calculated for $C_{19}H_{26}N_2$)]: C: 81.03% (80.80%); H: 9.42% (9.28%); N: 10.01% (9.92%).

GC-MS: M$^+$=m/z 282; [M-C$_3$H$_7$]$^+$=m/z 239; [M-C$_7$H$_8$N]$^+$=m/z 176; [M-C$_{12}$H$_{18}$N]$^+$=m/z 106.

$^1$H-NMR (CDCl$_3$, δ ppm): 8.64 (d, 1H, HPy), 7.53 (dt, 1H, HPy), 7.2 (d, 1H, HPy), 7.00-7.12 (m, 1H, HPy; m, 3H, ArH), 4.0-4.2 (m, 1H, NCH(CH$_3$); m, 1H, NH), 3.30 (sept, 2H, —CH(CH$_3$)$_2$), 1.55 (d, 3H, —NCH(CH$_3$)), 1.10 (s, 12H, —CH(CH$_3$)$_2$).

Example 10

Synthesis of Ligand Having Formula (L6)

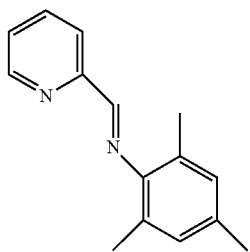
(L6)

In a 250 ml flask, 2-pyridinecarboxaldehyde (20 g, 187 mmoles) and some drops of formic acid were added to a solution of 2,4,6-tri-methylaniline (25 g, 187 mmoles) in methanol (60 ml): the mixture obtained was maintained, under stirring, at room temperature, for 48 hours. Subsequently, the precipitate obtained was filtered and the solvent was removed through distillation at reduced pressure. The yellow oily product obtained was purified through elution on a silica gel chromatography column [eluent: mixture of heptane/ethyl acetate in ratio of 99/1 (v/v)], and treated with cold ethyl ether, obtaining 30 g of a pale yellow crystalline product (yield=72%) corresponding to the ligand having formula (L6).

Molecular weight (MW): 224.31.

Elementary analysis [found (calculated for $C_{15}H_{16}N_2$)]: C: 80.35% (80.32%); H: 7.64% (7.19%); N: 12.51% (12.49%).

FT-IR (nujol) (cm$^{-1}$): 1640 ($v_{C=N}$).

$^1$H-NMR (CDCl$_3$, δ ppm) 8.72 (m, 1H), 8.32 (s, 1H), 8.29 (dt, 1H), 7.84 (m, 1H), 7.41 (m, 1H), 6.91 (s, 2H), 2.31 (s, 3H), 2.18 (s, 6H).

GC-MS: M$^+$=m/z 224; [M-H]$^+$=m/z 223; [M-CH$_3$]$^+$=m/z 209; [M-C$_5$H$_4$N]$^+$=m/z 146.

Example 11

Synthesis of Ligand Having Formula (L6A)

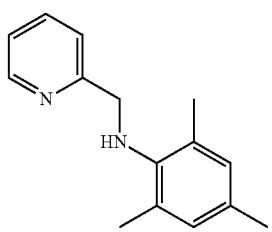
(L6A)

13 g (58 mmoles) of the ligand having formula (L6) obtained as described in Example 10, 80 ml of anhydrous methanol and 80 ml of chloroform were loaded into a 250 ml reactor, equipped with a magnetic stirrer: the whole was cooled to 0° C. with a water bath and ice and, subsequently, sodium borohydride (2.2 g, 58 mmoles) was added, in small portions, under stirring. The mixture obtained was maintained, under stirring, at room temperature, for 24 hours. Subsequently, the solvent was removed through distillation at reduced pressure and the residue obtained was extracted with ethyl acetate (80 ml) and water (80 ml). The combined organic extracts were washed to neutrality with water, anhydrified on anhydrous sodium sulfate and filtered. Subsequently, the solvent was removed through vacuum evaporation, obtaining a pale yellow oil to which 30 ml of heptane were added: the whole was placed in the refrigerator, all night, obtaining 5.2 g of a white crystalline solid (yield=40%) corresponding to the ligand having formula (L6A).

Molecular weight (MW): 226.

$^1$H-NMR (CD$_2$Cl$_2$, δ ppm) 8.6 (d, 1H, PyH), 7.61-7.56 (m, 1H, PyH), 7.21 (m, 1H, PyH), 7.19 (m, 1H, PyH), 6.8 (s, 2H, (CH3)3C6H2), 4.2 (s, 2H, PyCH2), 4.11 (s, 1H, NH), 2.31 (s, 6H), 2.2 (s, 3H).

GC-MS: M$^+$=m/z 226; [M-CH$_3$]$^+$=m/z 211; [M-C$_5$H$_4$N]$^+$=m/z 148, [M-C$_5$H$_4$NCH$_2$]$^+$=m/z 134, [M-C$_6$H$_2$(CH3)N]$^+$=m/z 93.

Example 12

Synthesis of Ligand Having Formula (L7)

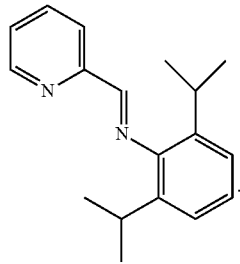

(L7)

In a 500 ml flask, 2-pyridinecarboxaldehyde (16.86 g; 157.5 mmoles) were added to a solution of 2-iso-propylaniline (27.93 g; 157.5 mmoles) in anhydrous ethanol (250 ml): the mixture obtained was heated under reflux, for 3 hours. Subsequently, the mixture was vacuum dried obtaining a yellow oil to which 30 ml of pentane were added: the whole was placed in the refrigerator, for 48 hours, obtaining the formation of yellow crystals that were recovered through filtration and drying under vacuum, obtaining 41.7 g of a yellow crystalline powder (yield 99%) corresponding to the ligand having formula (L7).

Molecular weight (MW): 266.38.

Elementary analysis [found (calculated for C$_{18}$H$_{22}$N$_2$)]: C: 81.31% (81.16%); H: 8.21% (8.32%); N: 9.96% (10.52%).

$^1$H-NMR (CD$_2$Cl$_2$, δ ppm): 8.72 (d, 1H, PyH), 8.32 (s, 1H CH=N), 8.27 (d, 1H PyH), 7.86 (t, 1H PyH), 7.39 (m, 1H PyH), 7.11-7.20 (m, 3H ArH), 3.00 (sept, 2H CHMe$_2$), 1.18 (d, 12H C(CH$_3$)$_2$).

FT-IR (nujol) (cm$^{-1}$): 1651 (ν$_{C=N}$).

Example 13

Synthesis of Ligand Having Formula (L7A)

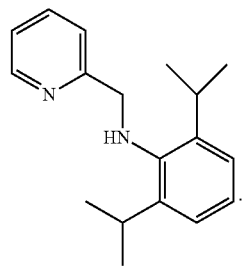

(L7A)

28 g (105.1 mmoles) of the ligand having formula (L7) obtained as described in Example 12 and 1800 ml of anhydrous methanol were loaded into a 2 liter reactor, equipped with a magnetic stirrer: the whole was cooled to 0° C. with a water bath and ice and, subsequently, sodium borohydride (70 g, 1850 mmoles) was added, in small portions, under stirring. The mixture obtained was maintained, under stirring, at room temperature, all night, and then quenched with brine and extracted with ethyl acetate (3×100 ml). Subsequently, the solvent was removed by distillation at reduced pressure and the residue obtained was purified through elution on a silica gel chromatography column [eluent: mixture of heptane/ethyl acetate in ratio of 9/1 (v/v)], and treated with cold ethyl ether, obtaining 16.9 g of a crystalline white solid (yield=60%) corresponding to the ligand having formula (L7A).

Molecular weight (MW): 268.403.

Elementary analysis [found (calculated for C$_{18}$H$_{24}$N$_2$)]: C: 80.49% (80.55%); H: 8.99% (9.01%); N: 10.37% (10.44%).

FT-IR (solid state, UATR) (cm$^{-1}$): 3309, 1588, 1570, 1493, 1463, 1435.

$^1$H-NMR (CDCl$_3$, δ ppm): 8.61 (d, 1H, o-PyH), 7.66 (td, 1H, PyH), 7.30 (d, 1H, PyH), 7.21 (m, 1H, PyH), 7.04-7.12 (m, 3H, ArH), 4.20 (s, 2H, CH$_2$), 4.10 (s, 1H, NH), 3.47 (m, 2H, —CH(CH$_3$)$_2$), 1.42 (d, 12H, —CH(CH$_3$)$_2$).

GC-MS: M$^+$=m/z 268; [M-C$_3$H$_7$]$^+$=m/z 225; [M-C$_6$H$_6$N]$^+$=m/z 176; m/z 93 C$_6$H$_7$N.

Example 14

Synthesis of Ligand Having Formula (L8)

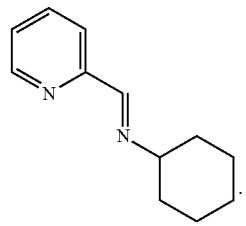

(L8)

14.07 g (131.3 mmoles) of 2-pyridinecarboxaldehyde and 50 ml of ethanol were loaded into a 250 ml reactor, equipped with a magnetic stirrer: the whole was cooled to 0° C. with a water bath and ice and, subsequently, cyclohexylamine (13 g, 131.1 mmoles) was added, by dripping, under stirring.

The mixture obtained was maintained, under stirring, at room temperature, for 1 hour and, subsequently, it was anhydrified on magnesium sulfate and filtered. The solvent was then removed through vacuum evaporation obtaining 23.04 g of a yellow oil (yield=93%) corresponding to the ligand having formula (L8).

Molecular weight (MW): 188.27.

Elementary analysis [found (calculated for $C_{12}H_{16}N_2$)]: C: 76.56% (76.56%); H: 8.31% (8.57%); N: 14.78% (14.88%).

FT-IR (KBr) (cm$^{-1}$): 1646 ($v_{C=N}$).

$^1$H-NMR (CD$_2$Cl$_2$, δ ppm): 8.6 (dd, 1H, PyH), 8.48 (s, 1H, PyH), 7.90 (dd, 1H, PyH), 7.64 (ddd, 1H, PyH), 7.30 (m, 1H, —CHN), 3.32 (m, 1H, N—CH), 1.9-1.2 (broad m, 10H, CH$_2$).

GC-MS: M$^+$=m/z 188; [M-NCH$_3$]$^+$=159; [M-C$_5$H$_4$NCH$_3$]$^+$=145.

Example 15

Synthesis of Ligand Having Formula (L8A)

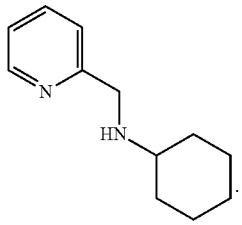

(L8A)

15 g (79 mmoles) of the ligand having formula (L8) obtained as described in Example 14 and 100 ml of anhydrous methanol were loaded into a 250 ml reactor, equipped with a magnetic stirrer: the whole was cooled to 0° C. with a water bath and ice and, subsequently, sodium borohydride (3 g, 79 mmoles) was added, in small portions, under stirring. The mixture obtained was maintained, under stirring, at room temperature, for 24 hours, and then quenched with brine and extracted with ethyl acetate (3×100 ml). The solvent was then removed through distillation at reduced pressure and the residue obtained was purified through elution on a silica gel chromatography column [eluent: mixture of heptane/ethyl acetate in ratio of 8/2 (v/v)], obtaining 6 g of a yellow oil (yield=40%) corresponding to the ligand having formula (L8A).

Molecular weight (MW): 190.29.

Elementary analysis [found (calculated for $C_{12}H_{18}N_2$)]: C: 76.57% (75.74%); H: 9.31% (9.53%); N: 14.68% (14.72%).

FT-IR (solid state, UATR) (cm$^{-1}$): 3306 ($v_{NH}$).

$^1$H-NMR (CD$_2$Cl$_2$, δ ppm): 8.54-8.49 (m, 1H, PyCH), 7.70-7.60 (m, 1H, PyH), 7.35-7.30 (dd, 1H, PyH), 7.18-7.12 (ddd, 1H, PyH), 3.9 (s, 2H, Py-CH$_2$), 2.5 (m, 1H), 1.9 (s, 2H), 1.75 (m, 3H), 1.6 (m, 1H), 1.3-1.0 (m, 5H).

GC-MS: M$^+$=m/z 190; [M-C$_6$H$_6$N]$^+$=m/z 98; [M-C$_6$H$_{12}$N]$^+$=m/z 93; [M-C$_6$H$_{13}$N]$^+$=m/z 92.

Example 16

Synthesis of FeCl$_3$(L1) [Sample MG87]

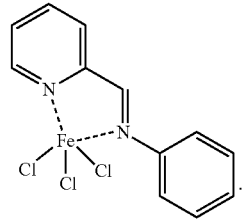

(MG87)

In a 100 ml flask, iron (III) chloride (FeCl$_3$) (225 mg; 1.39 mmoles) was added to a solution of the ligand having formula (L1) (253 mg; 1.39 mmoles; molar ratio L1/Fe=1), obtained as described in Example 1, in toluene (20 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 203 mg of a brown solid product corresponding to the complex FeCl$_3$(L1), equal to a 42% conversion with respect to the iron (II) chloride (FeCl$_3$) loaded.

Molecular weight (MW): 344.43.

Elementary analysis [found (calculated for $C_{12}H_{10}Cl_3FeN_2$)]: C 41.20 (41.84), H 2.35 (2.92), N 7.88 (8.13), Cl 31.25 (30.88), Fe 15.84 (16.21).

FIG. 1 shows the FT-IR spectrum (solid state—UATR) of the complex FeCl$_3$(L1) obtained.

Example 17

Synthesis of FeCl$_3$(L2) [Sample MG213]

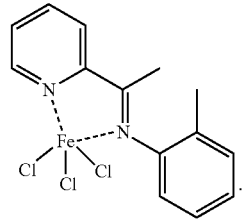

(MG213)

In a 100 ml flask, iron (III) chloride (FeCl$_3$) (225 mg; 1.39 mmoles) was added to a solution of the ligand having formula (L2) (293 mg; 1.39 mmoles; molar ratio L2/Fe=1), obtained as described in Example 3, in toluene (20 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 396 mg of a brown solid product corresponding to the complex FeCl$_3$(L2), equal to a 76% conversion with respect to the iron (III) chloride (FeCl$_3$) loaded.

Molecular weight (MW): 372.48.

Elementary analysis [found (calculated for $C_{14}H_{14}Cl_3FeN_2$)]: C 45.00 (45.14), H 3.69 (3.79), N 7.69 (7.52), Cl 28.96 (28.55), Fe 15.09 (14.99).

FIG. 2 shows the FT-IR spectrum (solid state—UATR) of the complex FeCl$_3$(L2) obtained.

Example 18

Synthesis of FeCl$_3$(L3) [Sample MG208]

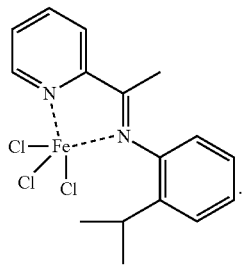
(MG208)

In a 100 ml flask, iron (III) chloride (FeCl$_3$) (350 mg; 2.16 mmoles) was added to a solution of the ligand having formula (L3) (514 mg; 2.16 mmoles; molar ratio L3/Fe=1), obtained as described in Example 5, in toluene (20 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 821 mg of a red solid product corresponding to the complex FeCl$_3$(L3), equal to a 95% conversion with respect to the iron (III) chloride (FeCl$_3$) loaded.

Molecular weight (MW): 400.35.

Elementary analysis [found (calculated for C$_{16}$H$_{18}$Cl$_3$FeN$_2$)]: C 48.09 (47.97), H 4.71 (4.53), N 6.65 (6.99), Cl 25.96 (26.55), Fe 14.08 (13.94).

FIG. 3 shows the FT-IR spectrum (solid state—UATR) of the complex FeCl$_3$(L3) obtained.

Example 19

Synthesis of FeCl$_3$(L4) [Sample MG205]

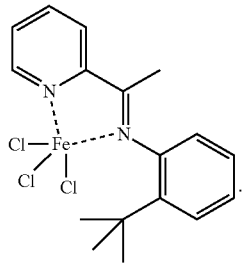
(MG205)

In a 100 ml flask, iron (III) chloride (FeCl$_3$) (450 mg; 2.77 mmoles) was added to a solution of the ligand having formula (L4) (699 mg; 2.77 mmoles; molar ratio L4/Fe=1), obtained as described in Example 6, in toluene (20 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 942 mg of an orange solid product corresponding to the complex FeCl$_3$(L4), equal to an 82% conversion with respect to the iron (III) chloride (FeCl$_3$) loaded.

Molecular weight (MW): 414.56.

Elementary analysis [found (calculated for C$_{17}$H$_{20}$Cl$_3$FeN$_2$)]: C 49.00 (49.25), H 4.69 (4.86), N 6.67 (6.76), Cl 24.96 (25.65), Fe 13.04 (13.47).

FIG. 4 shows the FT-IR spectrum (solid state—UATR) of the complex FeCl$_3$(L4) obtained.

Example 20

Synthesis of FeCl$_3$(L5) [Sample MG73]

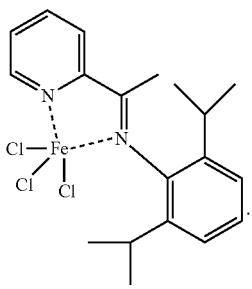
(MG73)

In a 100 ml flask, iron (III) chloride (FeCl$_3$) (94 mg; 0.58 mmoles) was added to a solution of the ligand having formula (L5) (163 mg; 0.58 mmoles; molar ratio L5/Fe=1), obtained as described in Example 8, in toluene (15 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 187 mg of an orange solid product corresponding to the complex FeCl$_3$(L5), equal to a 71% conversion with respect to the iron (III) chloride (FeCl$_3$) loaded.

Molecular weight (MW): 442.61.

Elementary analysis [found (calculated for C$_{19}$H$_{24}$Cl$_3$FeN$_2$)]: C 51.91 (51.56), H 5.36 (5.46), N 6.68 (6.33), Cl 24.26 (24.03), Fe 12.94 (12.62).

FIG. 5 shows the FT-IR spectrum (solid state—UATR) of the complex FeCl$_3$(L5) obtained.

Example 21

Synthesis of FeCl$_3$(L6) [Sample MG76]

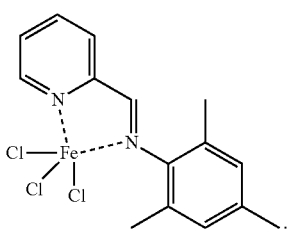
(MG76)

In a 100 ml flask, iron (III) chloride (FeCl$_3$) (182 mg; 1.12 mmoles) was added to a solution of the ligand having formula (L6) (251 mg; 1.12 mmoles; molar ratio L6/Fe=1), obtained as described in Example 10, in toluene (15 ml): the mixture obtained was maintained, under stirring, at room temperature, for 3 hours. The supernatant was then removed through evaporation at reduced pressure and the residue obtained was washed with heptane (2×15 ml) and vacuum dried, at room temperature, obtaining 340 mg of an orange-brown solid product corresponding to the complex FeCl$_3$(L6), equal to a 79% conversion with respect to the iron (III) chloride (FeCl$_3$) loaded.

Molecular weight (MW): 386.50.

Elementary analysis [found (calculated for C$_{15}$H$_{16}$Cl$_3$FeN$_2$)]: C 46.20 (46.61), H 4.35 (4.17), N 7.68 (7.25), Cl 28.05 (27.52), Fe 15.24 (14.44).

FIG. 6 shows the FT-IR spectrum (solid state—UATR) of the complex FeCl$_3$(L6) obtained.

Example 22

Synthesis of FeCl$_3$(L8) [Sample MG250]

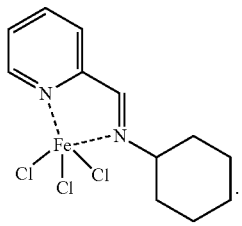

(MG250)

In a 100 ml flask, iron (III) chloride (FeCl$_3$) (258 mg; 1.59 mmoles) was added to a solution of the ligand having formula (L8) (299 mg; 1.59 mmoles; molar ratio L8/Fe=1), obtained as described in Example 14, in toluene (20 ml): the mixture obtained was maintained, under stirring, at 100° C., for 3 hours. The supernatant was then removed through evaporation at reduced pressure and the residue obtained was washed with heptane (2×15 ml) and vacuum dried, at room temperature, obtaining 474 mg of a red-brown solid product corresponding to the complex FeCl$_3$(L8), equal to an 84% conversion with respect to the iron (III) chloride (FeCl$_3$) loaded.

Molecular weight (MW): 350.47.

Elementary analysis [found (calculated for C$_{12}$H$_{16}$Cl$_3$FeN$_2$)]: C 41.95 (41.12), H 4.66 (4.60), N 7.26 (7.99), Cl 29.87 (30.35), Fe 15.55 (15.93).

FIG. 7 shows the FT-IR spectrum (solid state—UATR) of the complex FeCl$_3$(L8) obtained.

Example 23

Synthesis of FeCl$_3$(L8A) [Sample MG251]

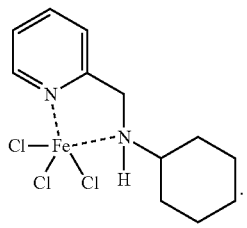

(MG251)

In a 100 ml flask, iron (III) chloride (FeCl$_3$) (213 mg; 1.31 mmoles; molar ratio L8A/Fe=1) was added to a solution of the ligand having formula (L8A) (249 mg; 1.31 mmoles), obtained as described in Example 15, in toluene (20 ml). The mixture obtained was maintained, under stirring, at 100° C., for 3 hours. The supernatant was then removed through evaporation at reduced pressure and the residue obtained was washed with heptane (2×15 ml) and vacuum dried, at room temperature, obtaining 347 mg of a light brown solid product corresponding to the complex FeCl$_3$(L8A), equal to a 75% conversion with respect to the iron (III) chloride (FeCl$_3$) loaded.

Molecular weight (MW): 352.49.

Elementary analysis [found (calculated for C$_{12}$H$_{18}$Cl$_3$FeN$_2$)]: C 40.52 (40.88), H 5.21 (5.15), N 7.87 (7.95), Cl 29.98 (30.17), Fe 15.70 (15.84).

FIG. 8 shows the FT-IR spectrum (solid state—UATR) of the complex FeCl$_3$(L8A) obtained.

Example 24 (IP176)

2 ml of 1,3-butadiene equal to about 1.4 g were condensed, cold (−20° C.), in a 25 ml test tube. Subsequently, 13.7 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L1) complex [sample MG87] (1.7 ml of toluene solution at a concentration of 2 mg/ml; 1×10$^{-5}$, equal to about 3.4 mg) obtained as described in Example 16. The whole was maintained, under magnetic stirring, at room temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

FIG. 9 shows the FT-IR spectrum of the polybutadiene obtained.

Example 25 (IP176/1)

2 ml of 1,3-butadiene equal to about 1.4 g were condensed, cold (−20° C.), in a 25 ml test tube. Subsequently, 8 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the FeCl$_3$(L1) complex [sample MG87] (1.7 ml of toluene solution at a concentration of 2 mg/ml; 1×10$^{-5}$, equal to about 3.4 mg) obtained as described in Example 16. The whole was maintained, under magnetic stirring, at room temperature, for 2 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.2 g of polybutadiene having a mixed structure: further characteristics of the process and of the polybutadiene obtained are reported in Table 1.

FIG. 10 shows the FT-IR spectrum of the polybutadiene obtained.

Example 26 (IP203)

2 ml of 1,3-butadiene equal to about 1.4 g were condensed, cold (−20° C.), in a 25 ml test tube. Subsequently, 13.5 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L2) complex [sample MG213] (1.86 ml of toluene solution at a concentration of 2 mg/ml; 1×10$^{-5}$, equal to about 3.72 mg) obtained as described in Example 17. The whole was maintained, under magnetic stirring, at room temperature, for 2 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.3 g of polybutadiene having a mixed structure: further characteristics of the process and of the polybutadiene obtained are reported in Table 1.

FIG. 11 shows the FT-IR spectrum of the polybutadiene obtained.

Example 27 (IP203/1)

2 ml of 1,3-butadiene equal to about 1.4 g were condensed, cold (−20° C.), in a 25 ml test tube. Subsequently, 8 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the FeCl$_3$(L2) complex [sample MG213] (1.86 ml of toluene solution at a concentration of 2 mg/ml; 1×10$^{-5}$, equal to about 3.72 mg) obtained as described in Example 17. The whole was maintained, under magnetic stirring, at room temperature, for 3 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

FIG. 12 shows the FT-IR spectrum of the polybutadiene obtained.

Example 28 (IP204)

2 ml of 1,3-butadiene equal to about 1.4 g were condensed, cold (−20° C.), in a 25 ml test tube. Subsequently, 13.4 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L3) complex [sample MG208] (2 ml of toluene solution at a concentration of 2 mg/ml; 1×10$^{-5}$, equal to about 4 mg) obtained as described in Example 18. The whole was maintained, under magnetic stirring, at room temperature, for 2 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.765 g of polybutadiene having a mixed structure: further characteristics of the process and of the polybutadiene obtained are reported in Table 1.

FIG. 13 shows the FT-IR spectrum of the polybutadiene obtained.

Example 29 (IP204/1)

2 ml of 1,3-butadiene equal to about 1.4 g were condensed, cold (−20° C.), in a 25 ml test tube. Subsequently, 7.7 ml of toluene were added and the temperature of the solution thus obtained was brought to 20° C. Then, methylaluminoxane (MAO) in toluene solution (6.3 ml; 1×10$^{-3}$ moles, equal to about 0.58 g) was added and, subsequently, the FeCl$_3$(L3) complex [sample MG208] (2 ml of toluene solution at a concentration of 2 mg/ml; 1×10$^{-5}$, equal to about 4 mg) obtained as described in Example 18. The whole was maintained, under magnetic stirring, at room temperature, for 30 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.2 g of polybutadiene having a mixed structure: further characteristics of the process and of the polybutadiene obtained are reported in Table 1.

FIG. 14 shows the FT-IR spectrum of the polybutadiene obtained.

Example 30 (ZG192)

2 ml of 1,3-butadiene equal to about 1.4 g were condensed, cold (−20° C.), in a 25 ml test tube. Subsequently, 13.3 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L4) complex [sample MG205] (2.1 ml of toluene solution at a concentration of 2 mg/ml; 1×10$^{-5}$, equal to about 4.2 mg) obtained as described in Example 19. The whole was maintained, under magnetic stirring, at room temperature, for 2 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

FIG. 15 shows the FT-IR spectrum of the polybutadiene obtained.

Example 31 (ZG192/1)

2 ml of 1,3-butadiene equal to about 1.4 g were condensed, cold (−20° C.), in a 25 ml test tube. Subsequently, 7.6 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the FeCl$_3$(L4) complex [sample MG205] (2.1 ml of toluene solution at a concentration of 2 mg/ml; 1×10$^{-5}$, equal to about 4.2 mg) obtained as described in Example 19. The whole was maintained, under magnetic stirring, at room temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

FIG. 16 shows the FT-IR spectrum of the polybutadiene obtained.

Example 32 (IP105)

2 ml of 1,3-butadiene equal to about 1.4 g were condensed, cold (−20° C.), in a 25 ml test tube. Subsequently, 7.5 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the FeCl$_3$(L5) complex [sample MG73] (2.21 ml of toluene solution at a concentration of 2 mg/ml; $1 \times 10^{-5}$, equal to about 4.42 mg) obtained as described in Example 20. The whole was maintained, under magnetic stirring, at room temperature, for 16 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

Example 33 (IP105/1)

2 ml of 1,3-butadiene equal to about 1.4 g were condensed, cold (−20° C.), in a 25 ml test tube. Subsequently, 13.2 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the FeCl$_3$(L5) complex [sample MG73] (2.21 ml of toluene solution at a concentration of 2 mg/ml; $1 \times 10^{-5}$, equal to about 4.42 mg) obtained as described in Example 20. The whole was maintained, under magnetic stirring, at room temperature, for 16 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

Figure 1:
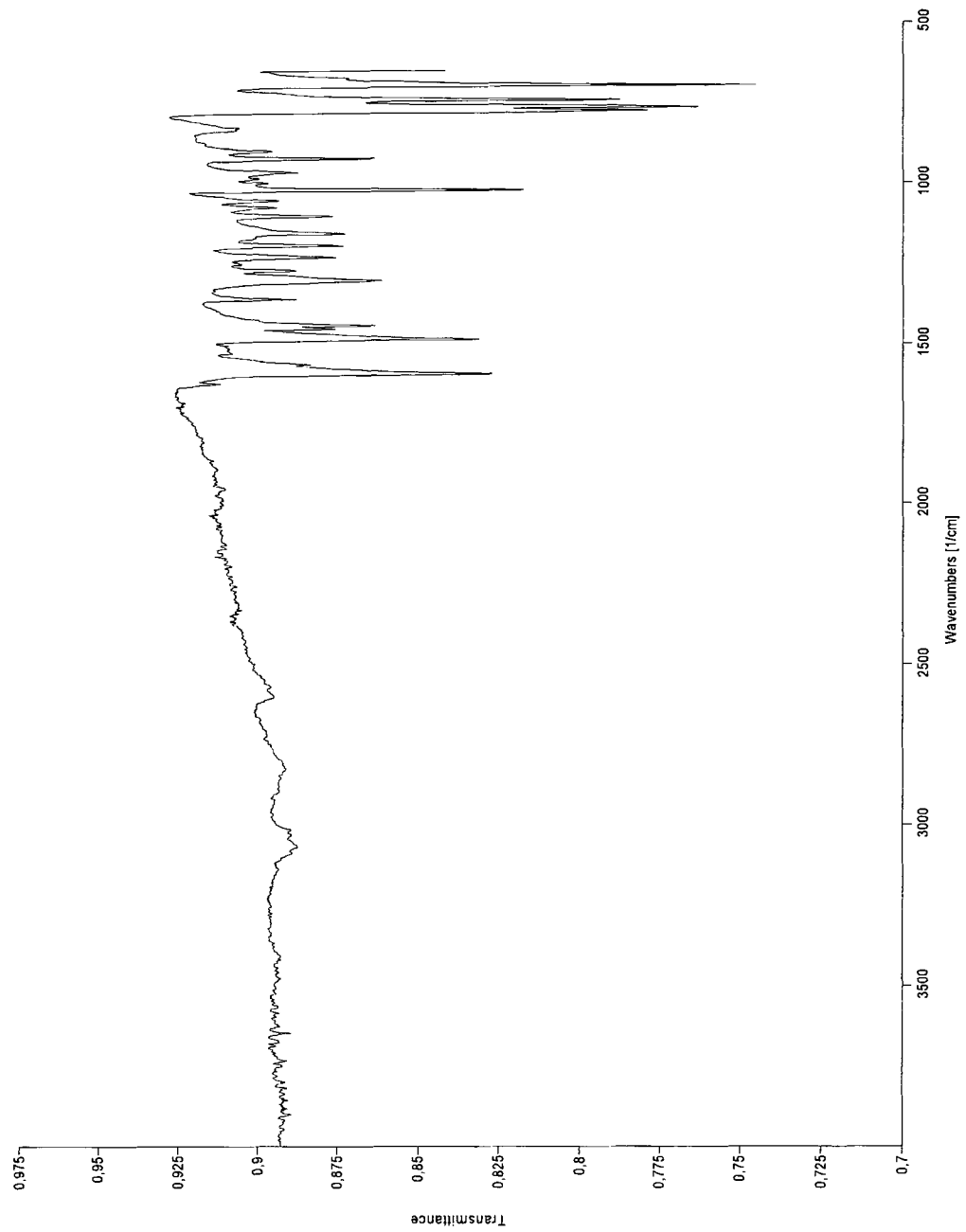
Figure 2:
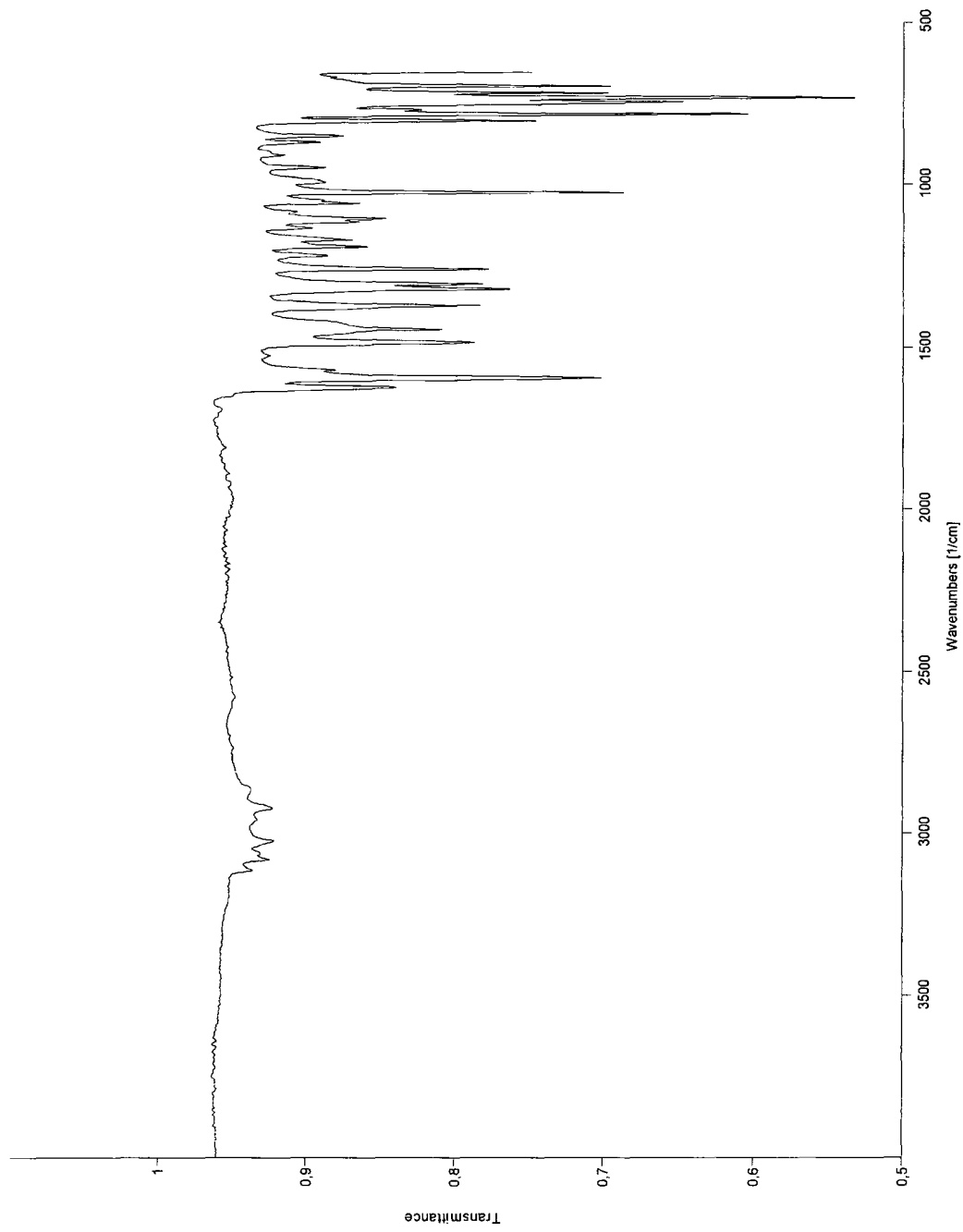
Figure 3:
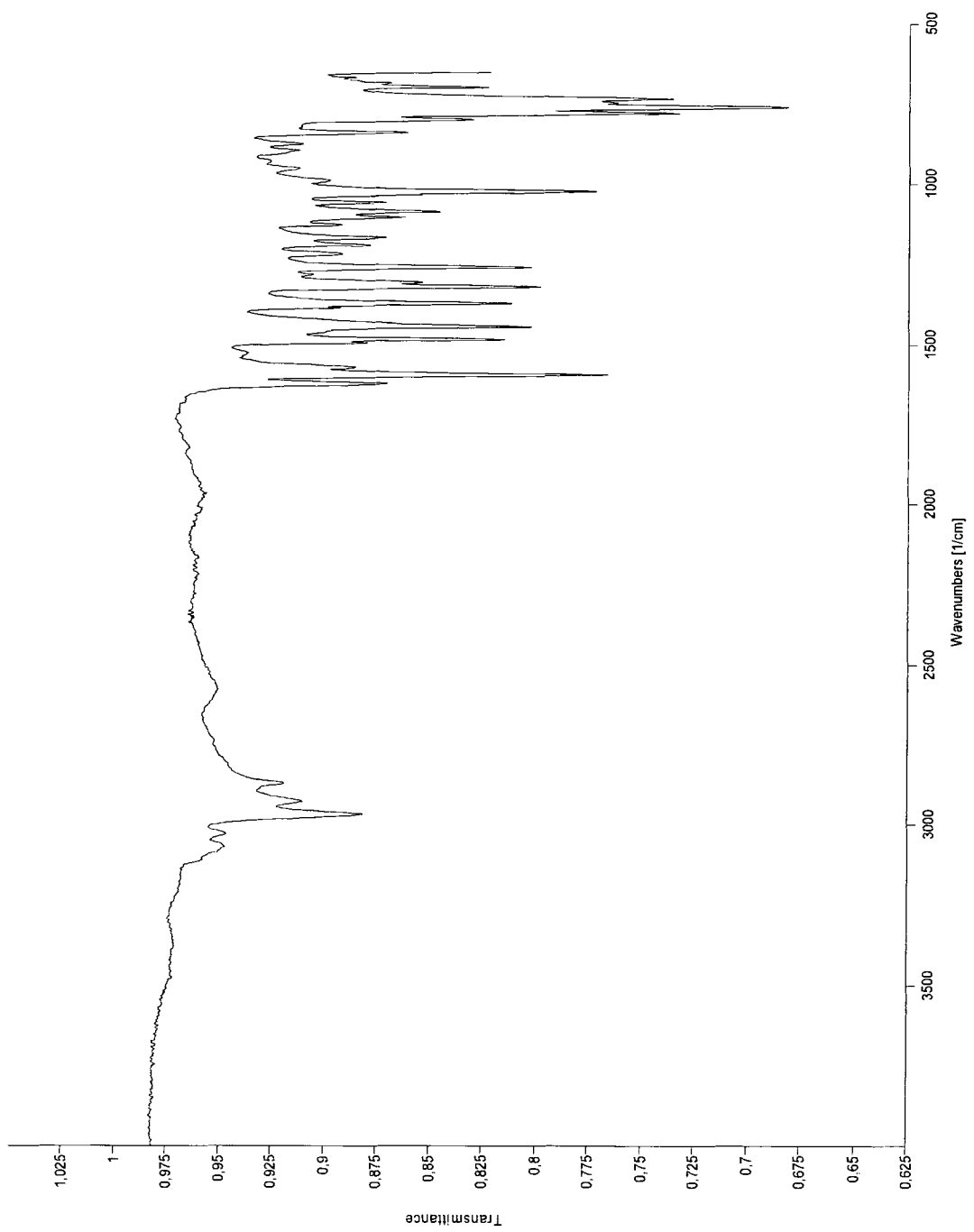
Figure 4:
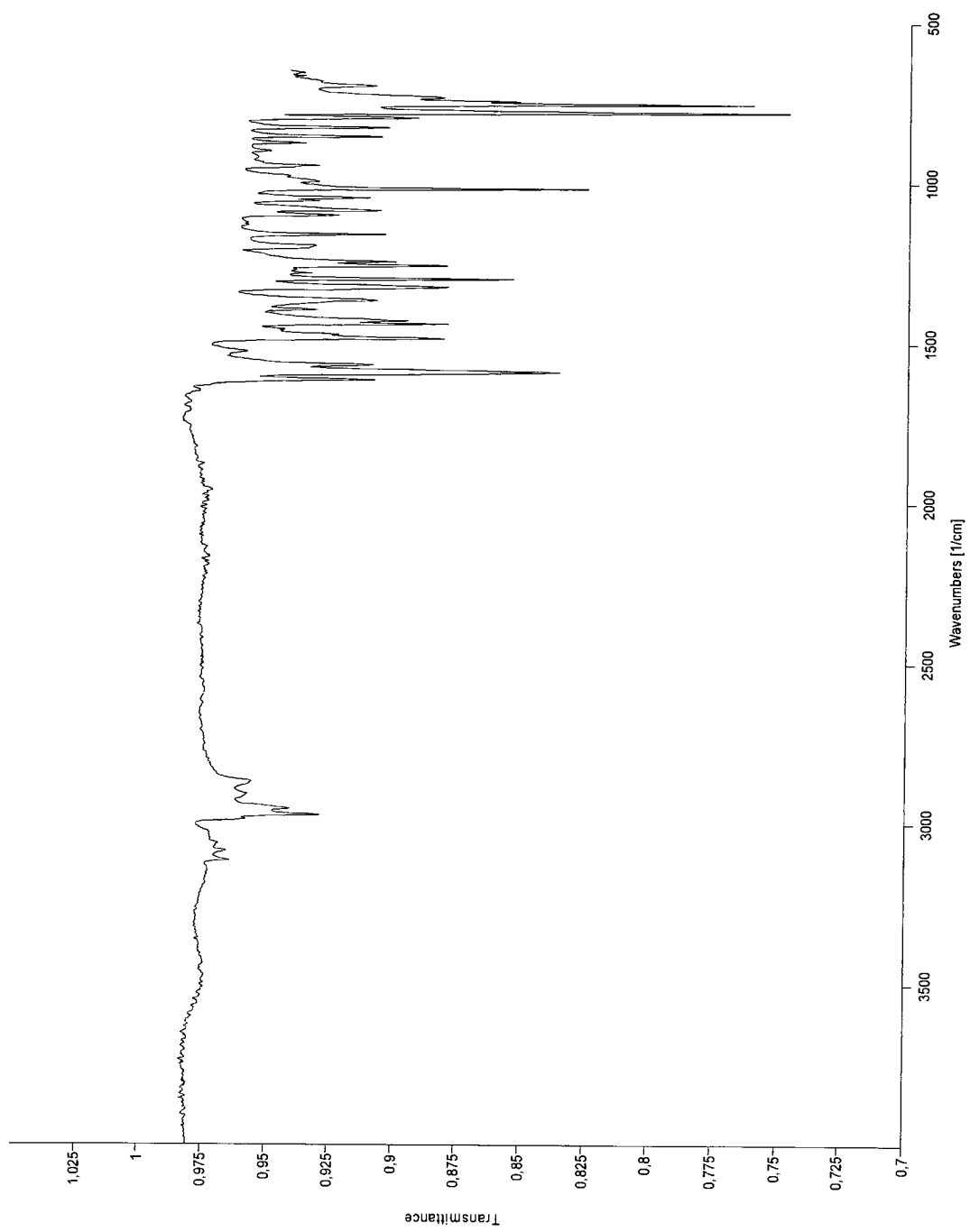
Figure 5:
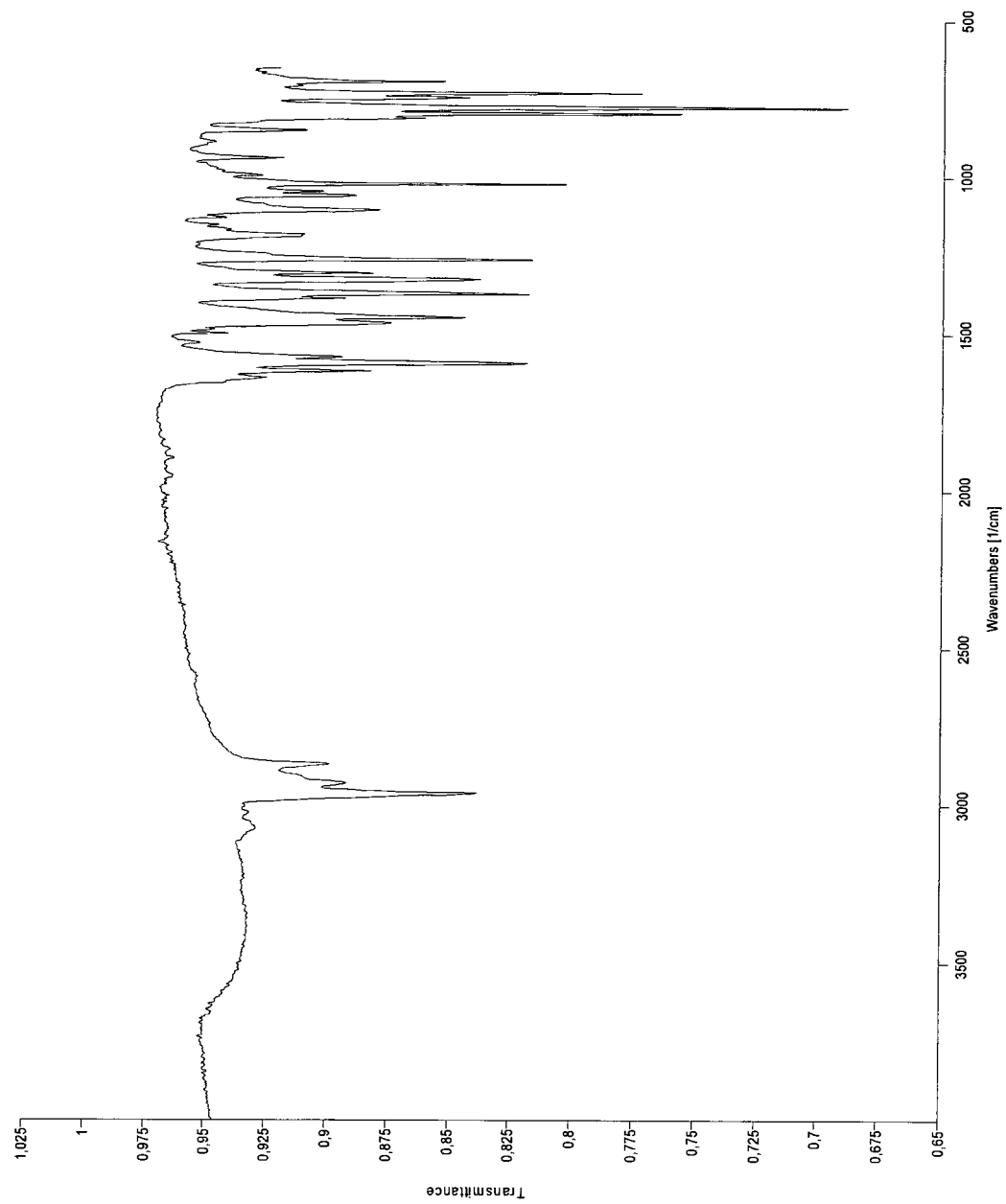
Figure 6:
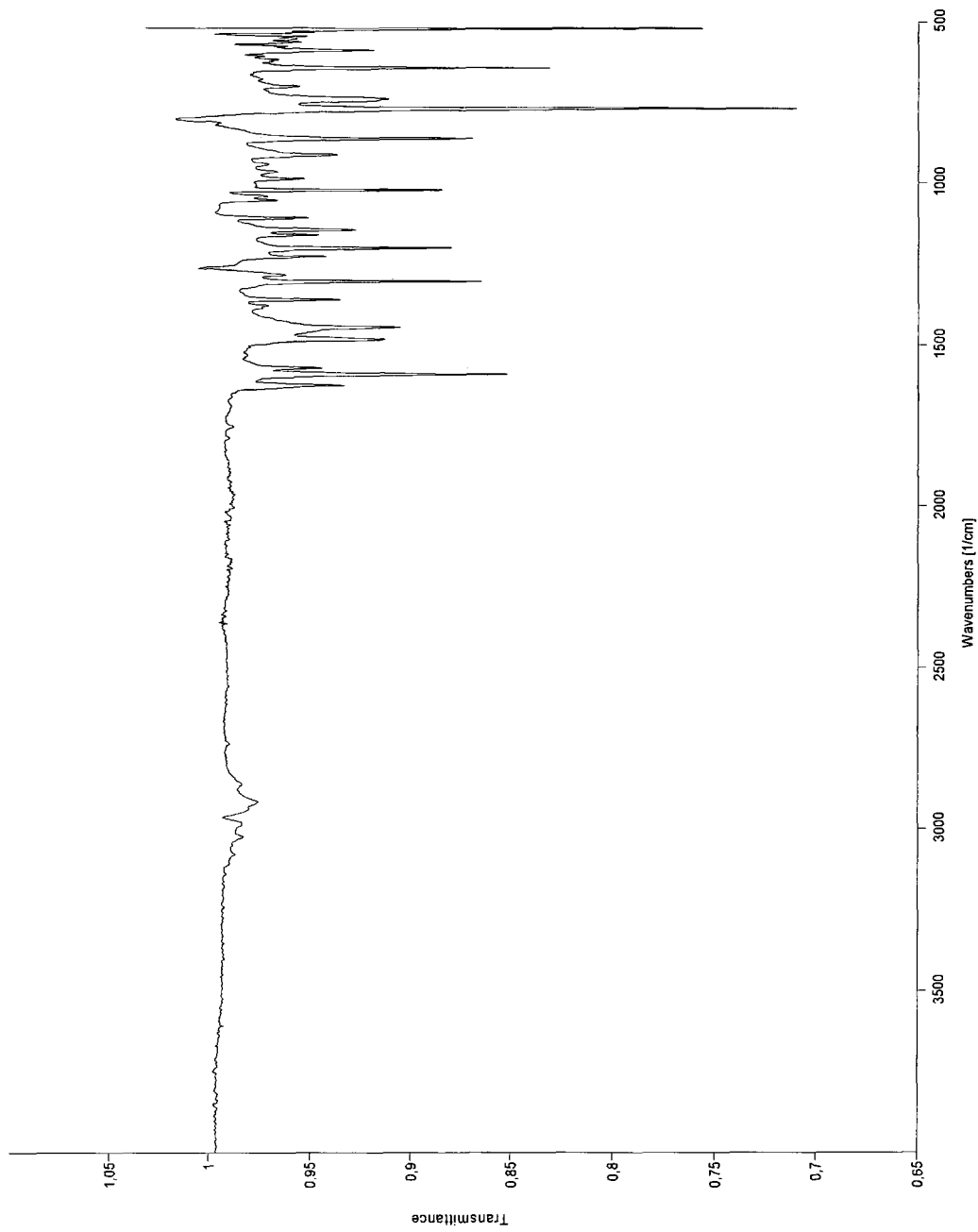
Figure 7:
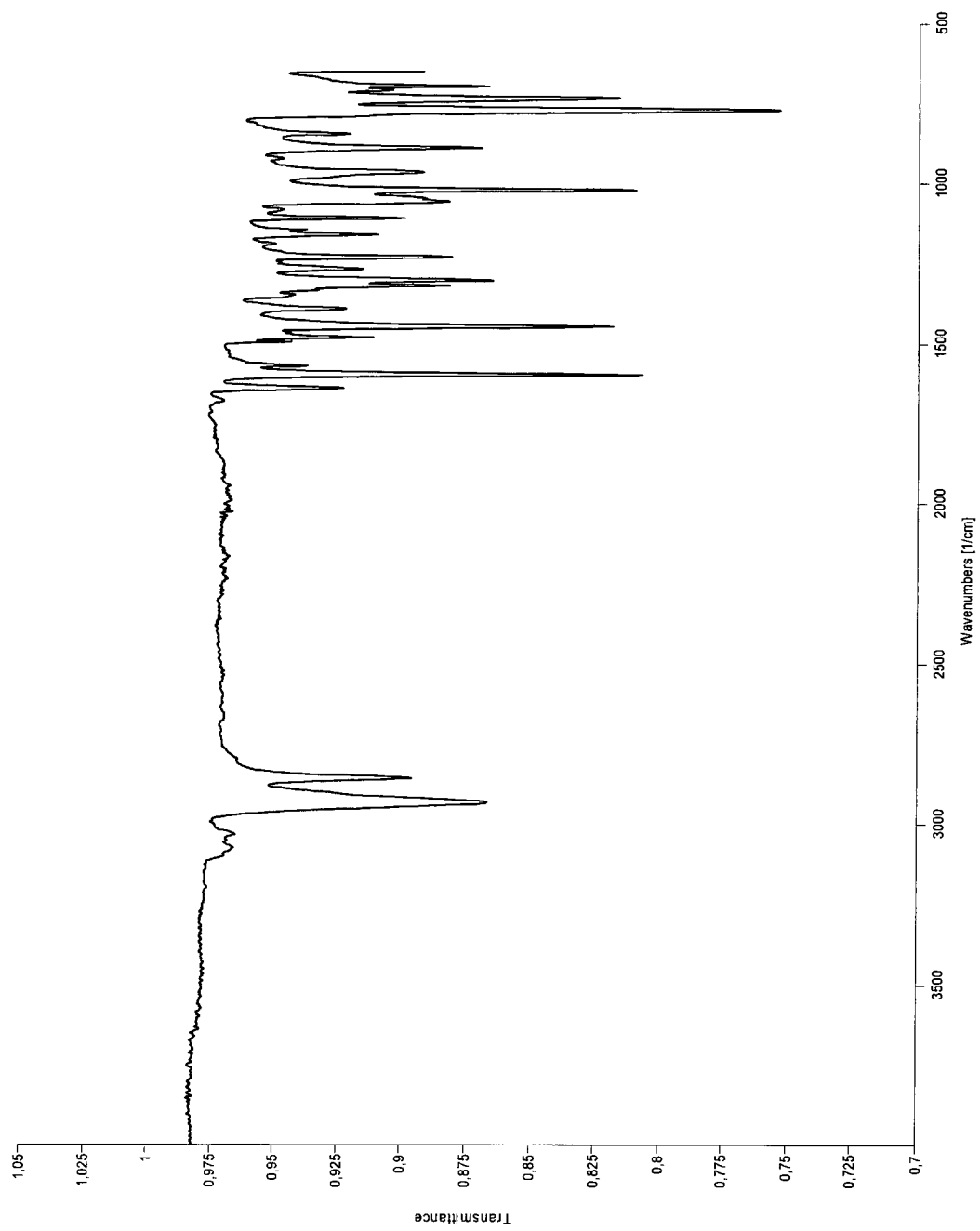
Figure 8:
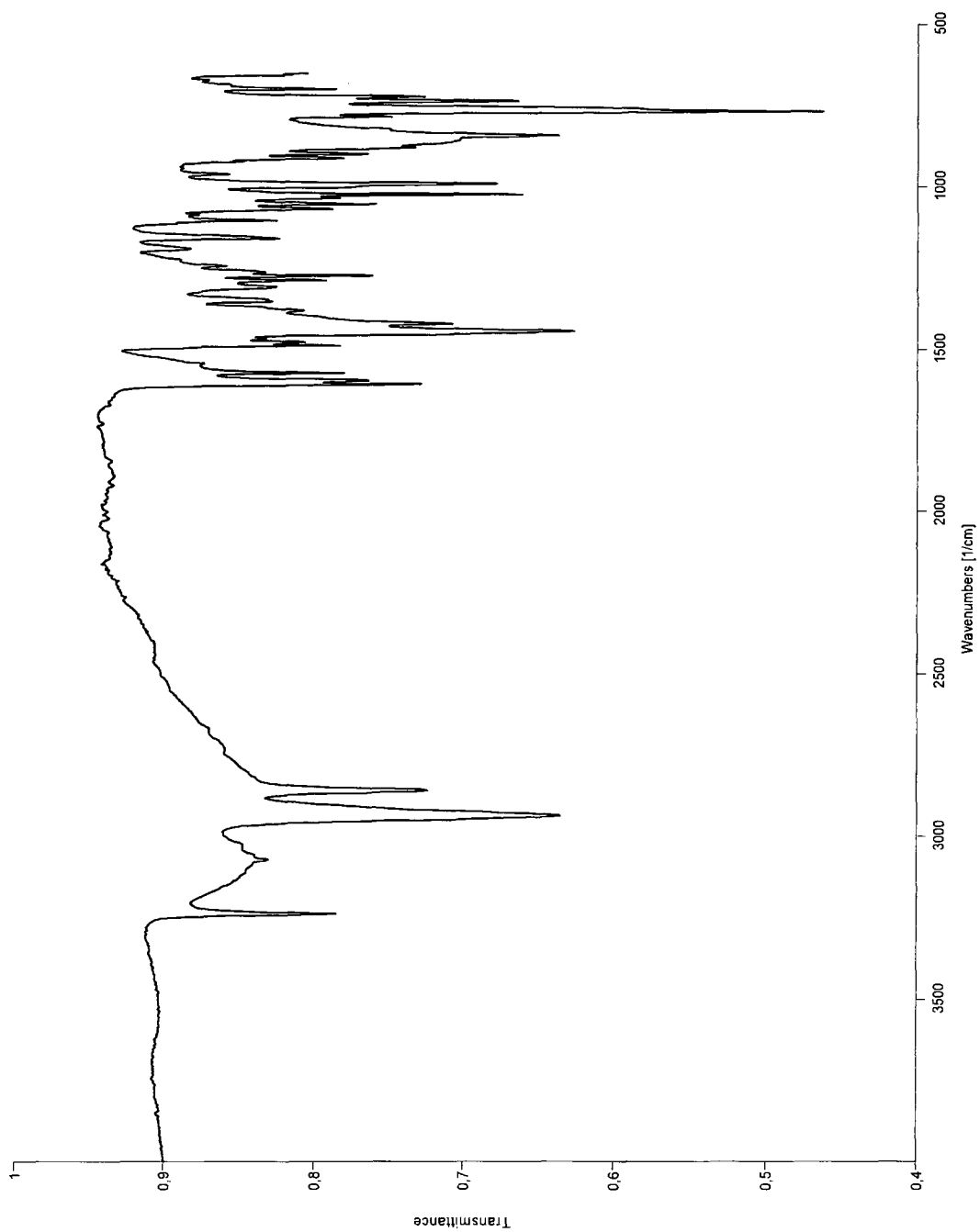
Figure 9:
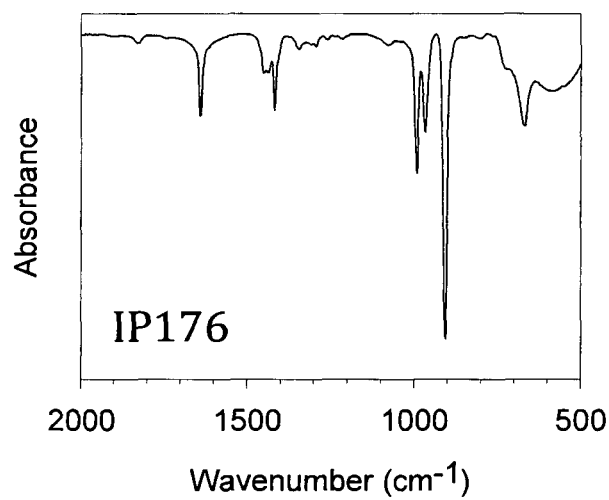
Figure 10:
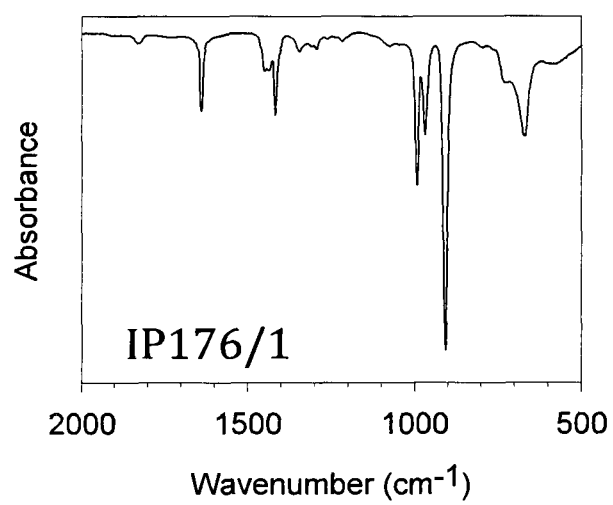
Figure 11:
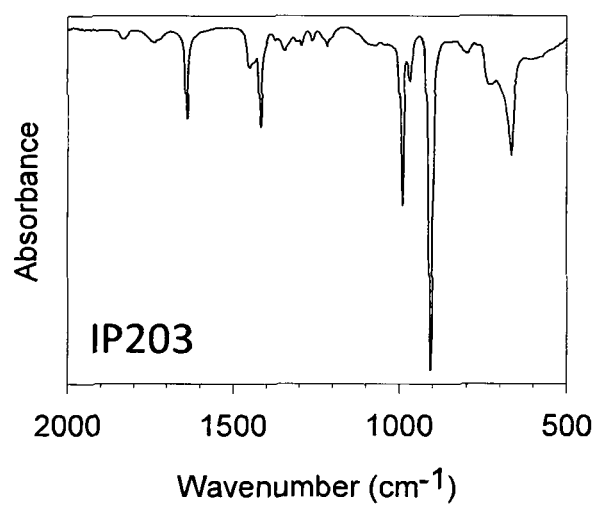
Figure 12:
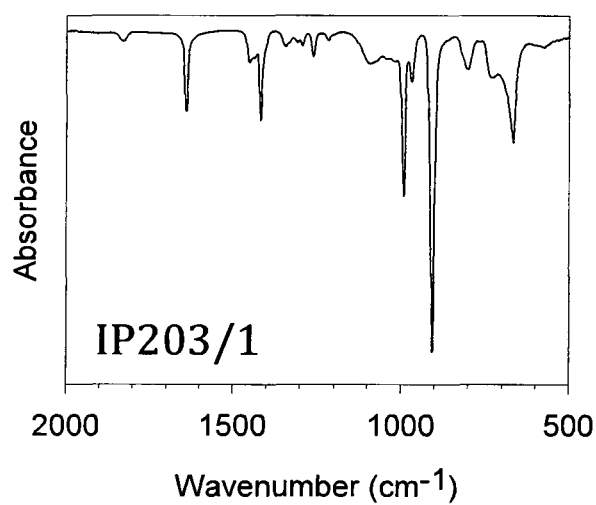
Figure 13:
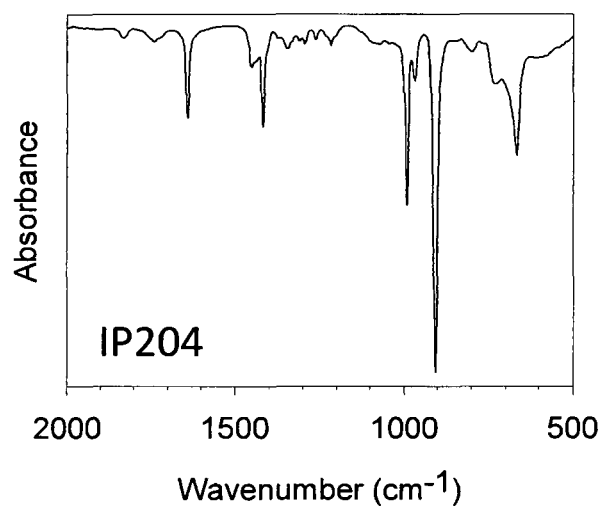
Figure 14:
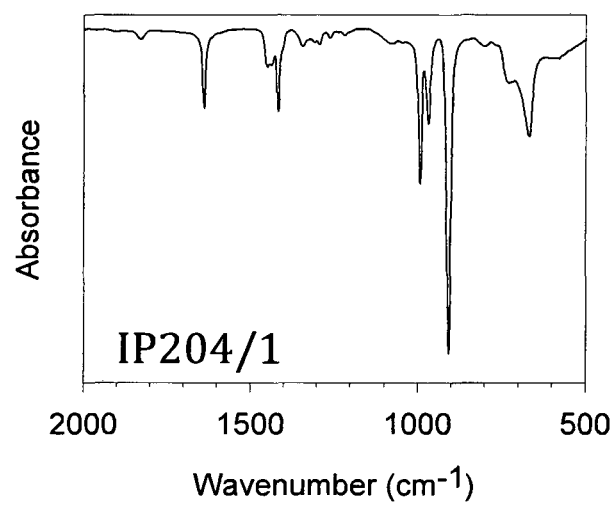
Figure 15:
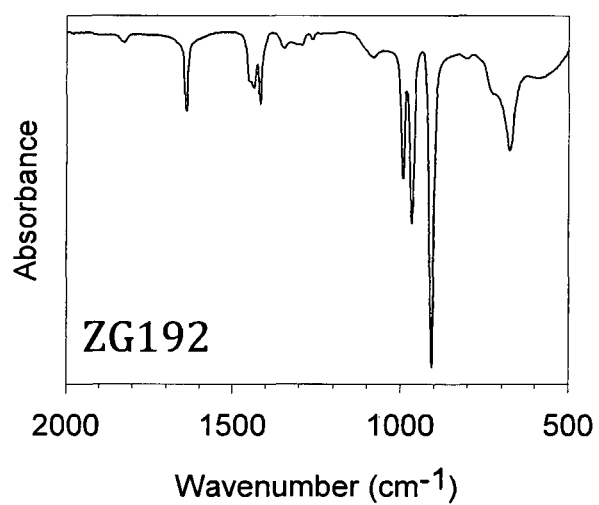
Figure 16:
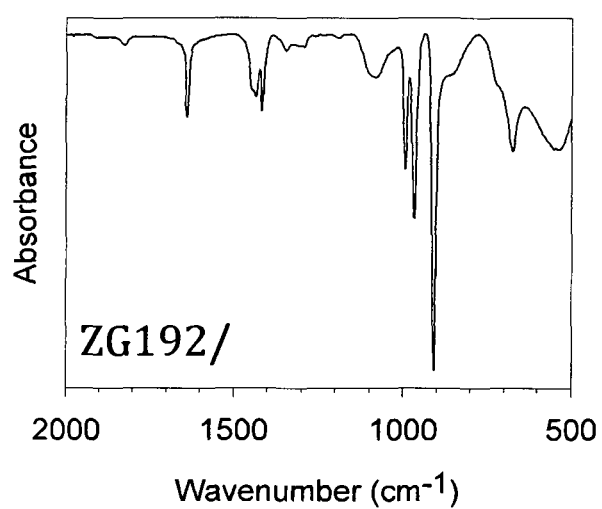
Figure 17:
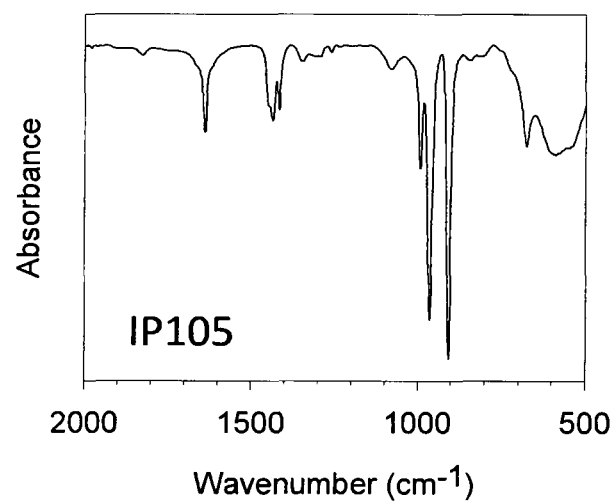
FIG. 17 shows the FT-IR spectrum of the polybutadiene obtained.
Figure 18:
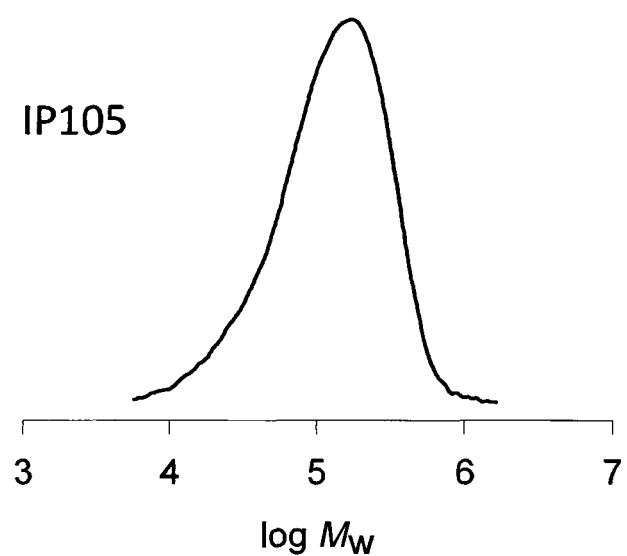
FIG. 18 shows the GPC ("Gel Permeation Chromatography") curve of the polybutadiene obtained.
Figure 19:
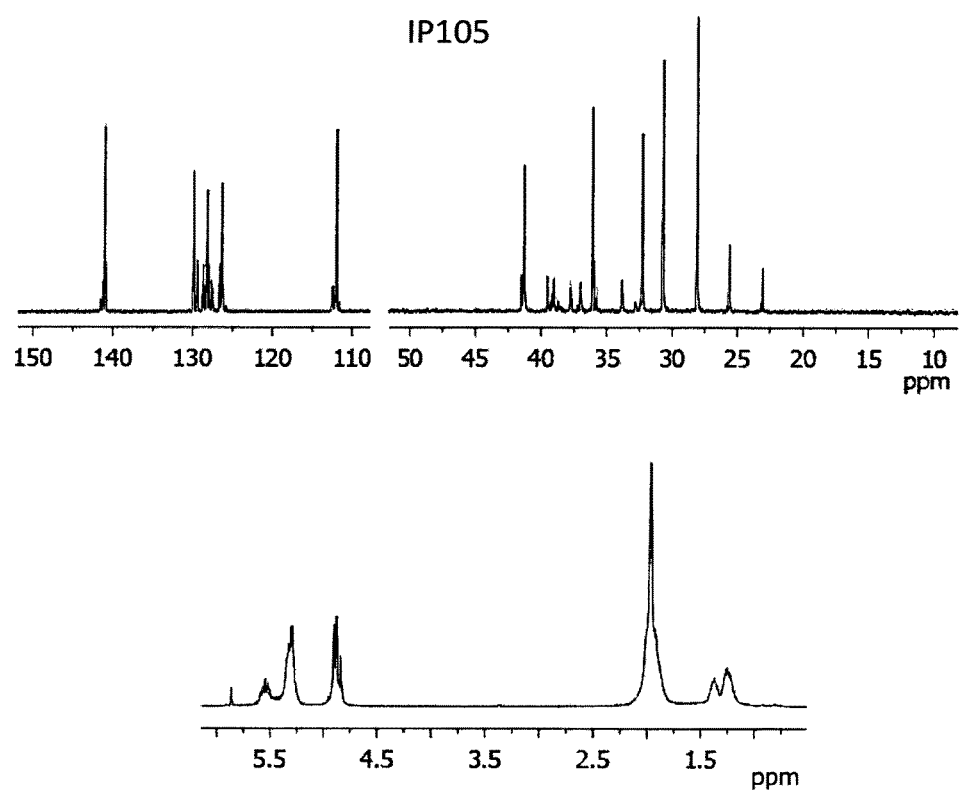
FIG. 19 shows the $^1$H-NMR (top) and $^{13}$C-NMR (bottom) spectra of the polybutadiene obtained.
Figure 20:
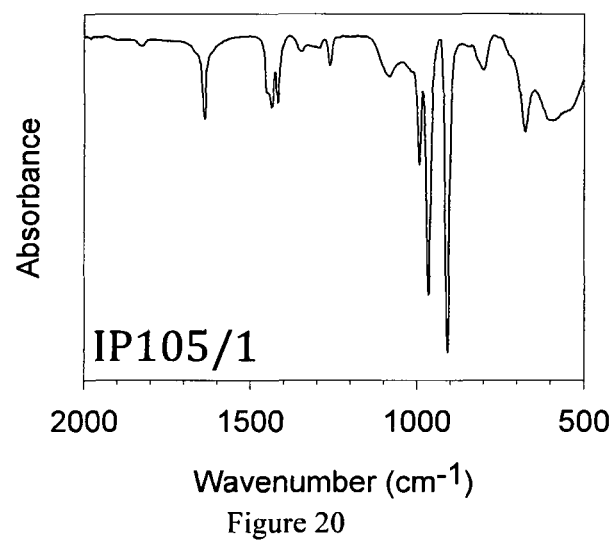

FIG. 20 shows the FT-IR spectrum of the polybutadiene obtained.

Figure 21:
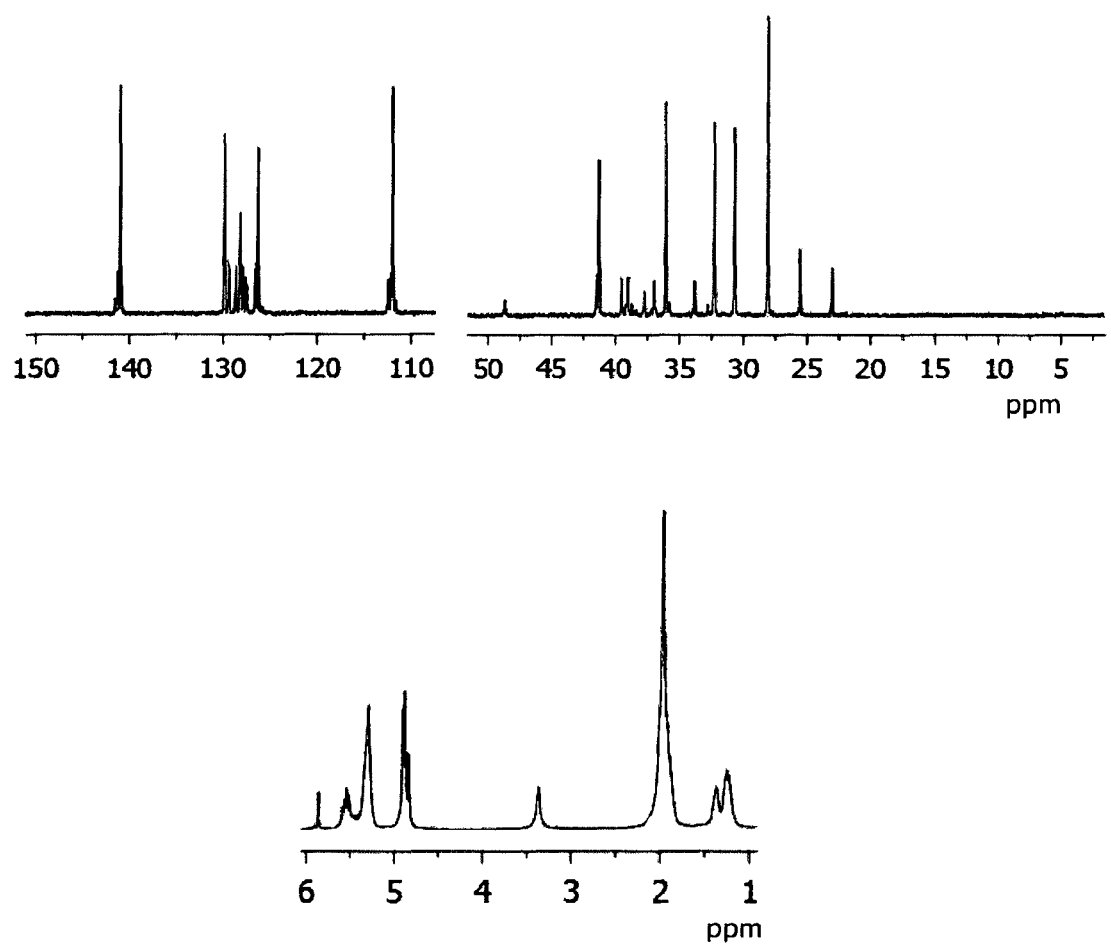

FIG. 21 shows the $^1$H-NMR (top) and $^{13}$C-NMR (bottom) spectra of the polybutadiene obtained.

Example 34 (IP109)

2 ml of 1,3-butadiene equal to about 1.4 g were condensed, cold (−20° C.), in a 25 ml test tube. Subsequently, 7.8 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the FeCl$_3$(L6) complex [sample MG76] (1.9 ml of toluene solution at a concentration of 2 mg/ml; $1 \times 10^{-5}$, equal to about 3.8 mg) obtained as described in Example 21. The whole was maintained, under magnetic stirring, at room temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

Figure 22:
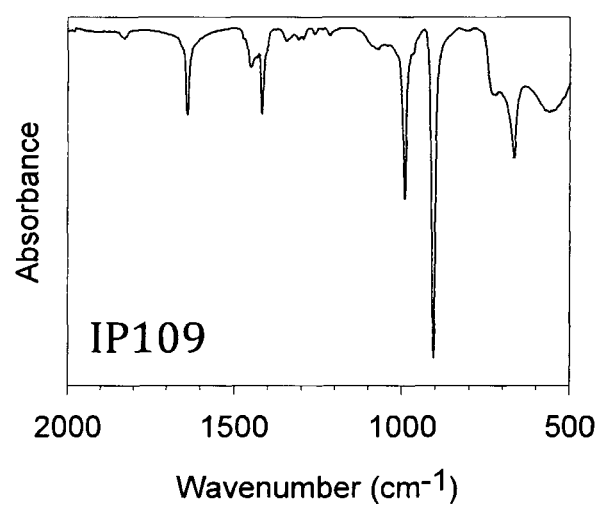

FIG. 22 shows the FT-IR spectrum of the polybutadiene obtained.

Figure 23:
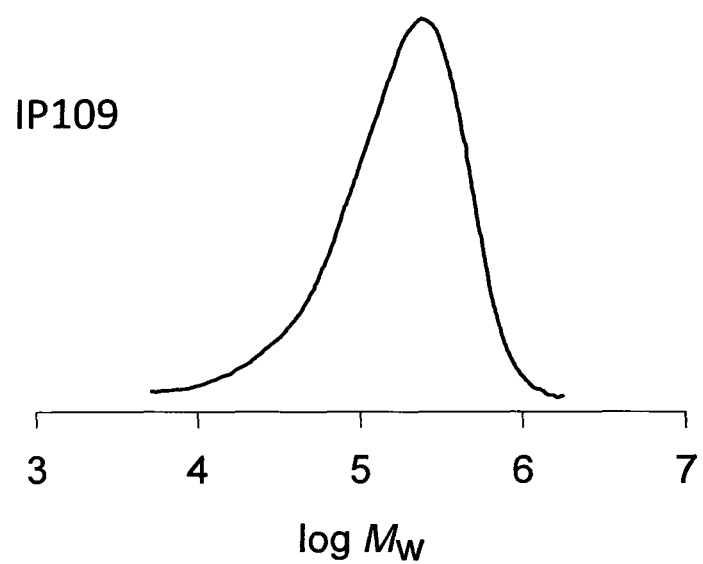

FIG. 23 shows the GPC ("Gel Permeation Chromatography") curve of the polybutadiene obtained.

Example 35 (IP109/1)

2 ml of 1,3-butadiene equal to about 1.4 g were condensed, cold (−20° C.), in a 25 ml test tube. Subsequently, 13.5 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the FeCl$_3$(L6) complex [sample MG76] (1.9 ml of toluene solution at a concentration of 2 mg/ml; $1 \times 10^{-5}$, equal to about 3.8 mg) obtained as described in Example 21. The whole was maintained, under magnetic stirring, at room temperature, for 60 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.05 g of polybutadiene having a mixed structure: further characteristics of the process and of the polybutadiene obtained are reported in Table 1.

Figure 24:
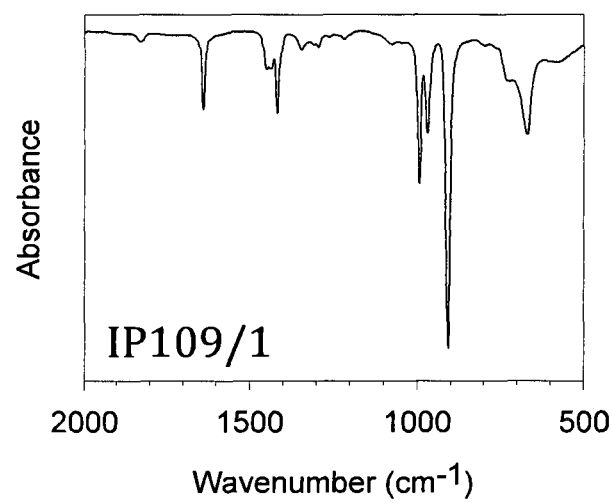

FIG. 24 shows the FT-IR spectrum of the polybutadiene obtained.

Example 36 (G1531)

2 ml of 1,3-butadiene equal to about 1.4 g were condensed, cold (−20° C.), in a 25 ml test tube. Subsequently, 7.95 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the FeCl$_3$(L8) complex [sample MG250] (1.75 ml of toluene solution at a concentration of 2 mg/ml; $1 \times 10^{-5}$, equal to about 3.5 mg) obtained as described in Example 22. The whole was maintained, under magnetic stirring, at room temperature, for 10 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

Figure 25:
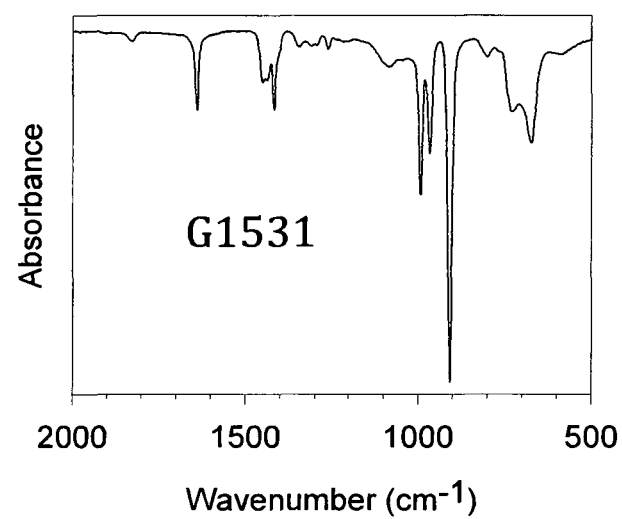

FIG. 25 shows the FT-IR spectrum of the polybutadiene obtained.

Example 37 (G1531/1)

2 ml of 1,3-butadiene equal to about 1.4 g were condensed, cold (−20° C.), in a 25 ml test tube. Subsequently, 13.6 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the FeCl$_3$(L8) complex [sample MG250] (1.75 ml of toluene solution at a concentration of 2 mg/ml; $1 \times 10^{-5}$, equal to about 3.5 mg) obtained as described in Example 22. The whole was maintained, under magnetic stirring, at room temperature, for 30 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a mixed structure: further characteristics of the process and of the polybutadiene obtained are reported in Table 1.

Figure 26:
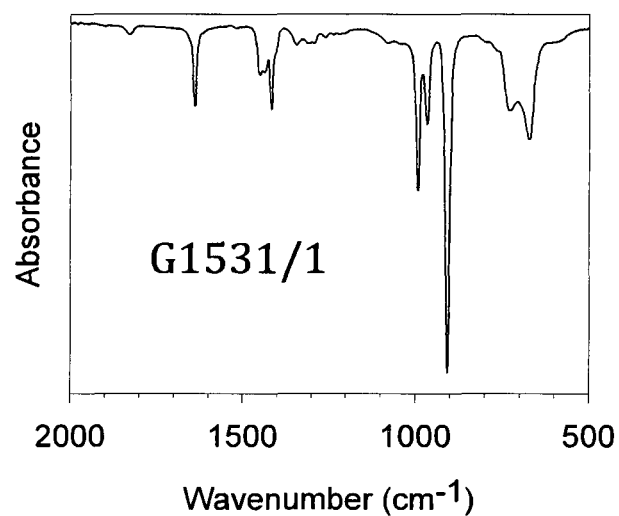

FIG. 26 shows the FT-IR spectrum of the polybutadiene obtained.

Example 38 (IP115)

2 ml of 1,3-butadiene equal to about 1.4 g were condensed, cold (−20° C.) in a 25 ml test tube. Subsequently, 7.94 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the $FeCl_3(L8A)$ complex [sample MG251] (1.76 ml of toluene solution at a concentration of 2 mg/ml; $1 \times 10^{-5}$, equal to about 3.52 mg) obtained as described in Example 23. The whole was maintained, under magnetic stirring, at room temperature, for 120 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.115 g of polybutadiene having a mixed structure: further characteristics of the process and of the polybutadiene obtained are reported in Table 1.

Figure 27:
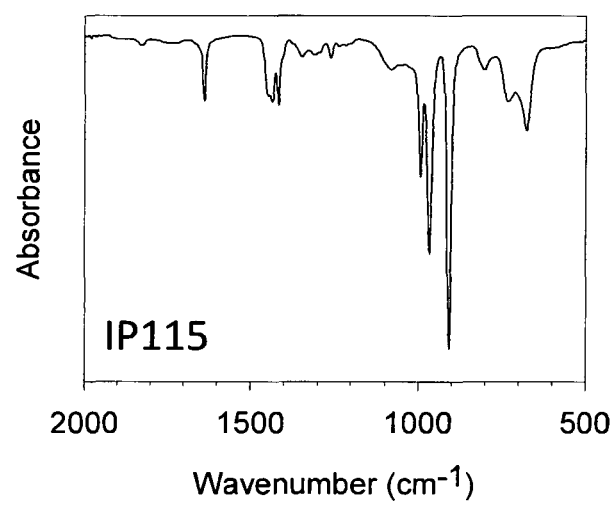

FIG. 27 shows the FT-IR spectrum of the polybutadiene obtained.

Example 39 (IP115/1)

2 ml of 1,3-butadiene equal to about 1.4 g were condensed, cold (−20° C.), in a 25 ml test tube. Subsequently, 13.6 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the $FeCl_3(L8A)$ complex [sample MG251] (1.76 ml of toluene solution at a concentration of 2 mg/ml; $1 \times 10^{-5}$, equal to about 3.52 mg) obtained as described in Example 23. The whole was maintained, under magnetic stirring, at room temperature, for 120 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.190 g of polybutadiene having a mixed structure: further characteristics of the process and of the polybutadiene obtained are reported in Table 1.

Figure 28:
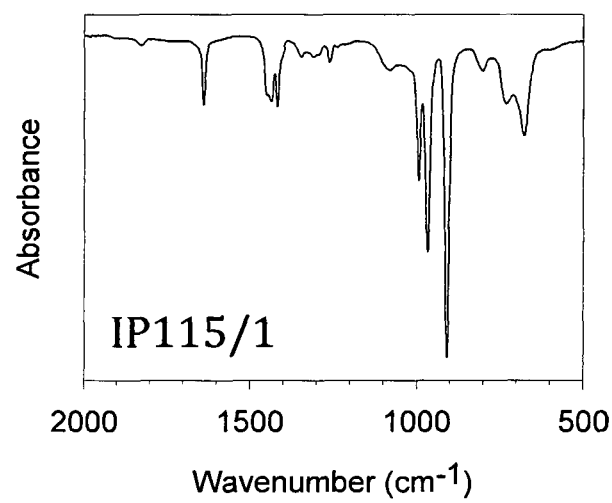

FIG. 28 shows the FT-IR spectrum of the polybutadiene obtained.

Example 40 (IP155)

2 ml of isoprene equal to about 1.36 g were placed in a 25 ml test tube. Subsequently, 13.65 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the $FeCl_3(L1)$ complex [sample MG87] (1.72 ml of toluene solution at a concentration of 2 mg/ml; $1 \times 10^{-5}$, equal to about 3.44 mg) obtained as described in Example 16. The whole was maintained, under magnetic stirring, at room temperature, for 2 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.25 g of polyisoprene having a mixed structure: further characteristics of the process and of the polyisoprene obtained are reported in Table 2.

Figure 29:
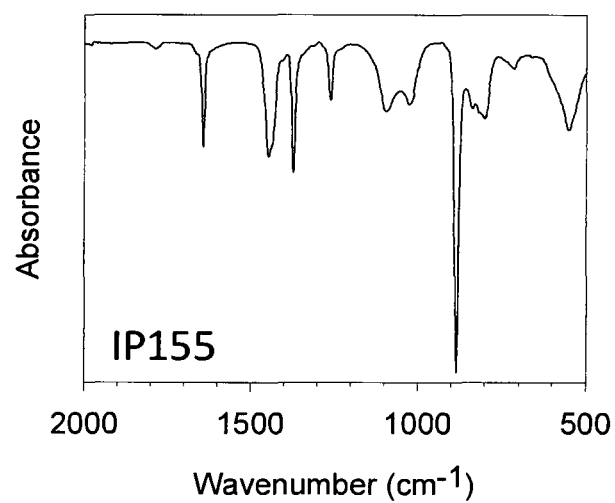

FIG. 29 shows the FT-IR spectrum of the polyisoprene obtained.

Example 41 (IP205)

2 ml of isoprene equal to about 1.36 g were placed in a 25 ml test tube. Subsequently, 13.5 ml of toluene were added and the temperature of the solution thus obtained was brought to 20° C. Then, methylaluminoxane (MAO) in toluene solution (0.63 ml; $1 \times 10^{-3}$ moles, equal to about 0.058 g) was added and, subsequently, the $FeCl_3(L2)$ complex [sample MG213] (1.87 ml of toluene solution at a concentration of 2 mg/ml; $1 \times 10^{-5}$, equal to about 3.74 mg) obtained as described in Example 17. The whole was maintained, under magnetic stirring, at room temperature, for 4 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 30:
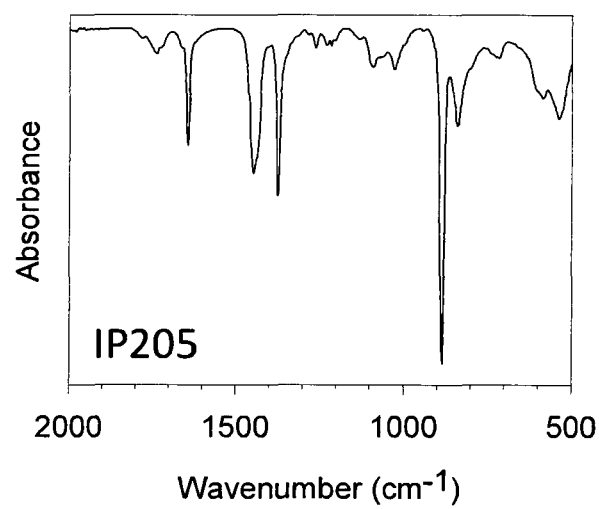

FIG. 30 shows the FT-IR spectrum of the polyisoprene obtained.

Figure 31:
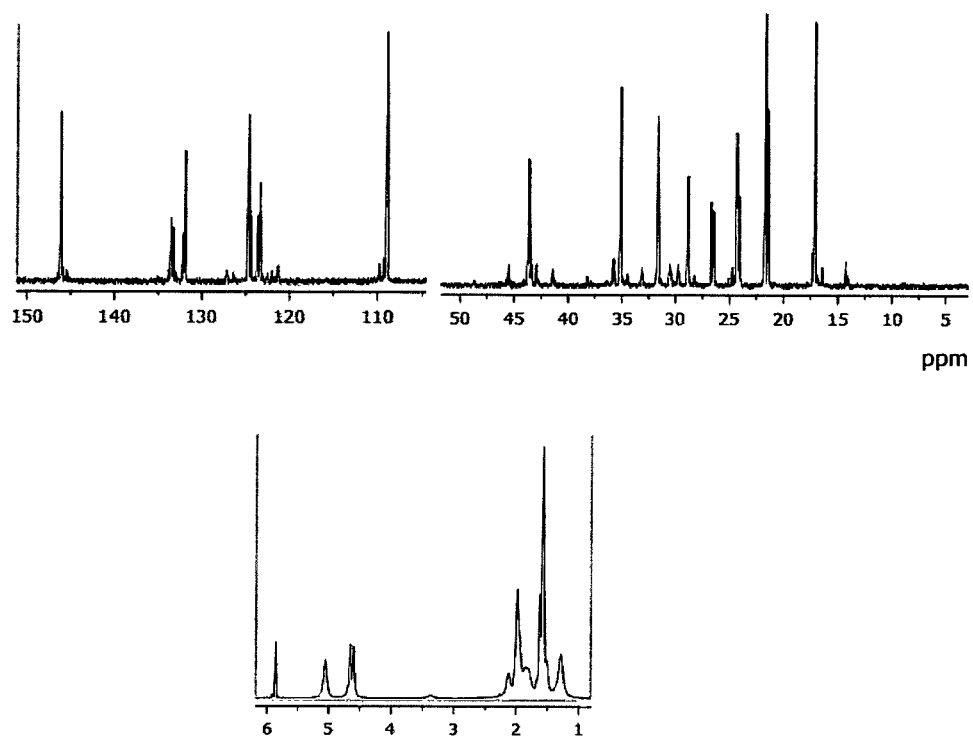

FIG. 31 shows the $^1$H-NMR (top) and $^{13}$C-NMR (bottom) spectra of the polyisoprene obtained.

Example 42 (IP205/1)

2 ml of isoprene equal to about 1.36 g were placed in a 25 ml test tube. Subsequently, 13.5 ml of toluene were added and the temperature of the solution thus obtained was brought to 20° C. Then, methylaluminoxane (MAO) in toluene solution (6.3 ml; $1 \times 10^{-2}$ moles, equal to about 0.058 g) was added and, subsequently, the $FeCl_3(L2)$ complex [sample MG213] (1.87 ml of toluene solution at a concentration of 2 mg/ml; $1 \times 10^{-5}$, equal to about 3.74 mg) obtained as described in Example 17. The whole was maintained, under magnetic stirring, at room temperature, for 4 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 32:
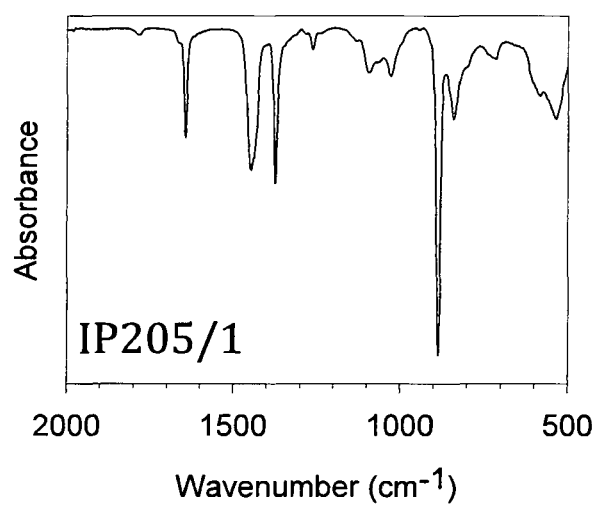

FIG. 32 shows the FT-IR spectrum of the polyisoprene obtained.

Figure 33:
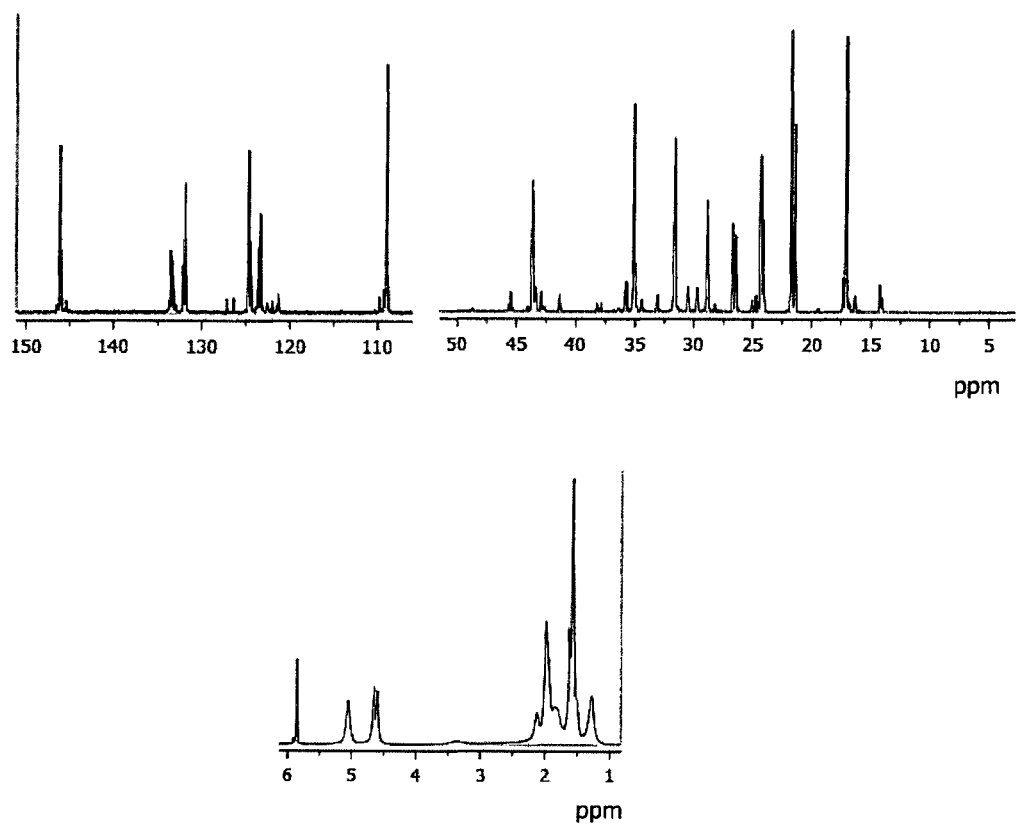

FIG. 33 shows the $^1$H-NMR (top) and $^{13}$C-NMR (bottom) spectra of the polyisoprene obtained.

Example 43 (IP206)

2 ml of isoprene equal to about 1.36 g were placed in a 25 ml test tube. Subsequently, 13.4 ml of toluene were added and the temperature of the solution thus obtained was brought to 20° C. Then, methylaluminoxane (MAO) in toluene solution (0.63 ml; 1×10⁻³ moles, equal to about 0.058 g) was added and, subsequently, the FeCl$_3$(L3) complex [sample MG208] (2 ml of toluene solution at a concentration of 2 mg/ml; 1×10⁻⁵, equal to about 4 mg) obtained as described in Example 18. The whole was maintained, under magnetic stirring, at room temperature, for 4 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 34:
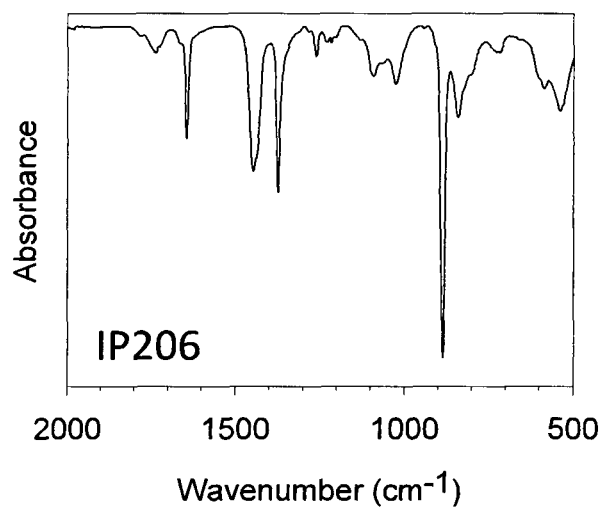

FIG. 34 shows the FT-IR spectrum of the polyisoprene obtained.

Figure 35:
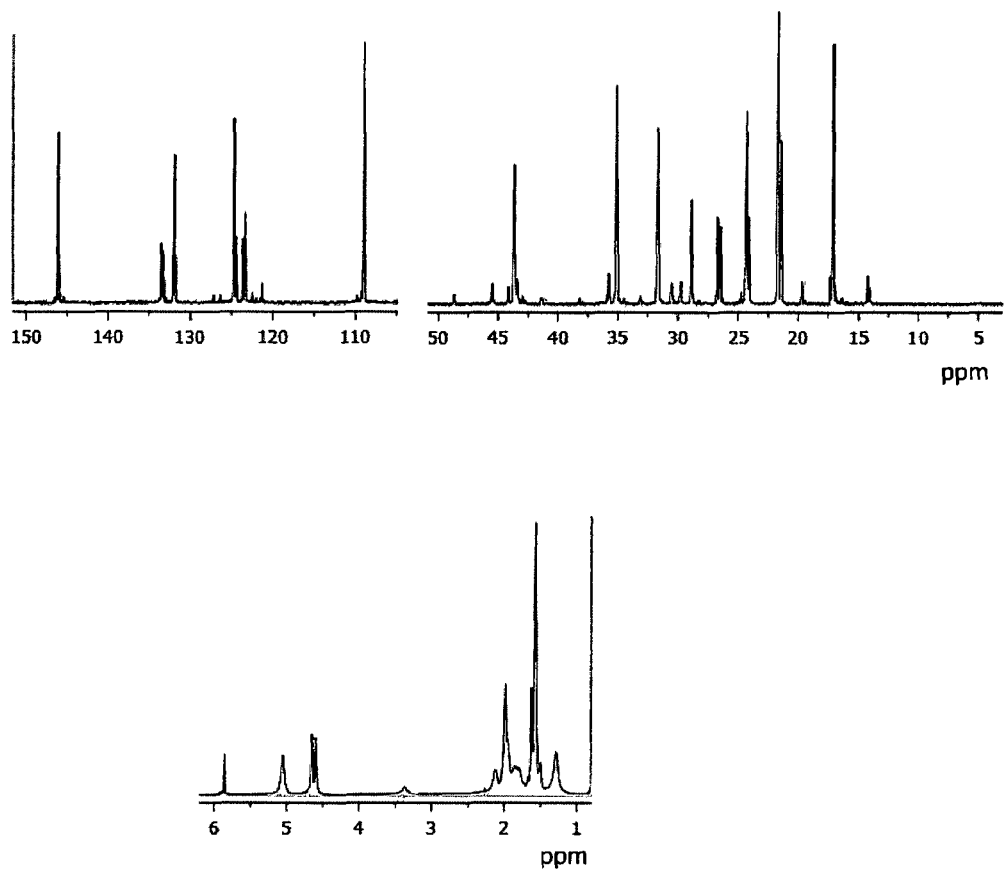

FIG. 35 shows the $^1$H-NMR (top) and $^{13}$C-NMR (bottom) spectra of the polyisoprene obtained.

Example 44 (IP206/1)

2 ml of isoprene equal to about 1.36 g were placed in a 25 ml test tube. Subsequently, 7.7 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the FeCl$_3$(L3) complex [sample MG208] (2 ml of toluene solution at a concentration of 2 mg/ml; 1×10⁻⁵, equal to about 4 mg) obtained as described in Example 18. The whole was maintained, under magnetic stirring, at room temperature, for 9 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 36:
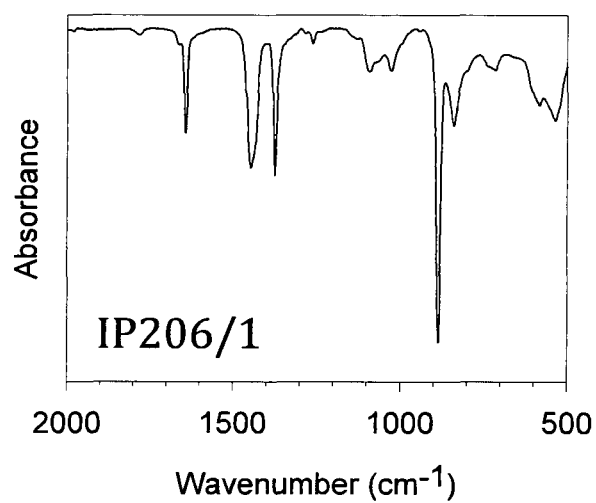

FIG. 36 shows the FT-IR spectrum of the polyisoprene obtained.

Figure 37:
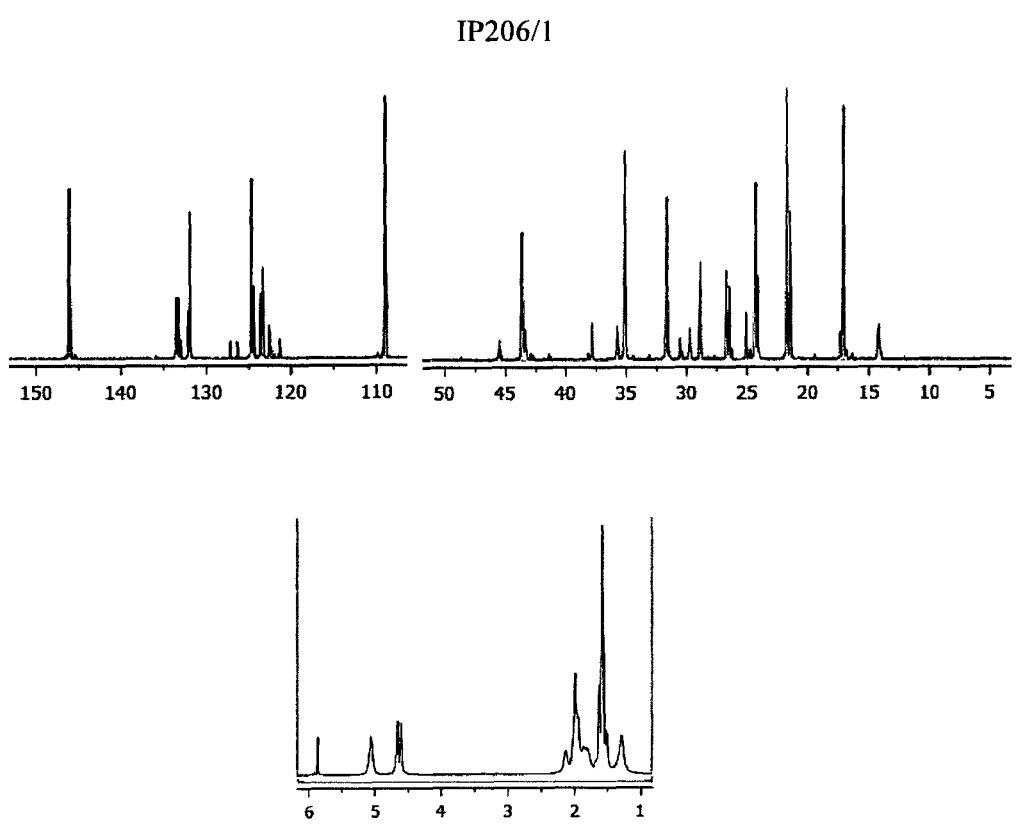

FIG. 37 shows the $^1$H-NMR (top) and $^{13}$C-NMR (bottom) spectra of the polyisoprene obtained.

Example 45 (ZG193)

2 ml of isoprene equal to about 1.36 g were placed in a 25 ml test tube. Subsequently, 13.3 ml of toluene were added and the temperature of the solution thus obtained was brought to 20° C. Then, methylaluminoxane (MAO) in toluene solution (0.63 ml; 1×10⁻³ moles, equal to about 0.058 g) was added and, subsequently, the FeCl$_3$(L4) complex [sample MG205] (2.1 ml of toluene solution at a concentration of 2 mg/ml; 1×10⁻⁵, equal to about 4.2 mg) obtained as described in Example 19. The whole was maintained, under magnetic stirring, at room temperature, for 65 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 38:
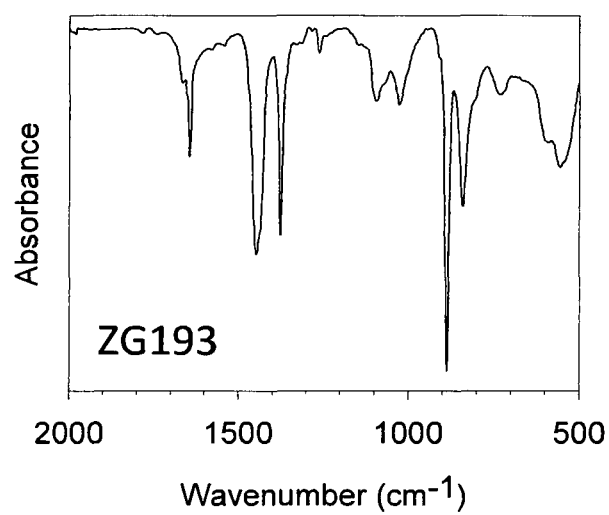

FIG. 38 shows the FT-IR spectrum of the polyisoprene obtained.

Example 46 (ZG193/1)

2 ml of isoprene equal to about 1.36 g were placed in a 25 ml test tube. Subsequently, 7.6 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the FeCl$_3$(L4) complex [sample MG205] (2.1 ml of toluene solution at a concentration of 2 mg/ml; 1×10⁻⁵, equal to about 4.2 mg) obtained as described in Example 19. The whole was maintained, under magnetic stirring, at room temperature, for 60 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 39:
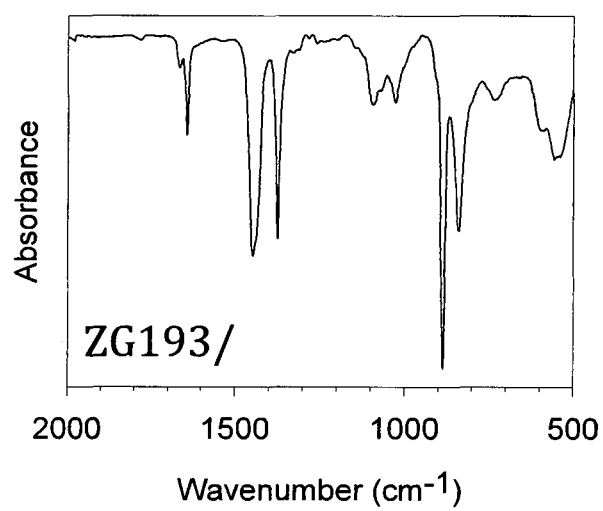

FIG. 39 shows the FT-IR spectrum of the polyisoprene obtained.

Figure 40:
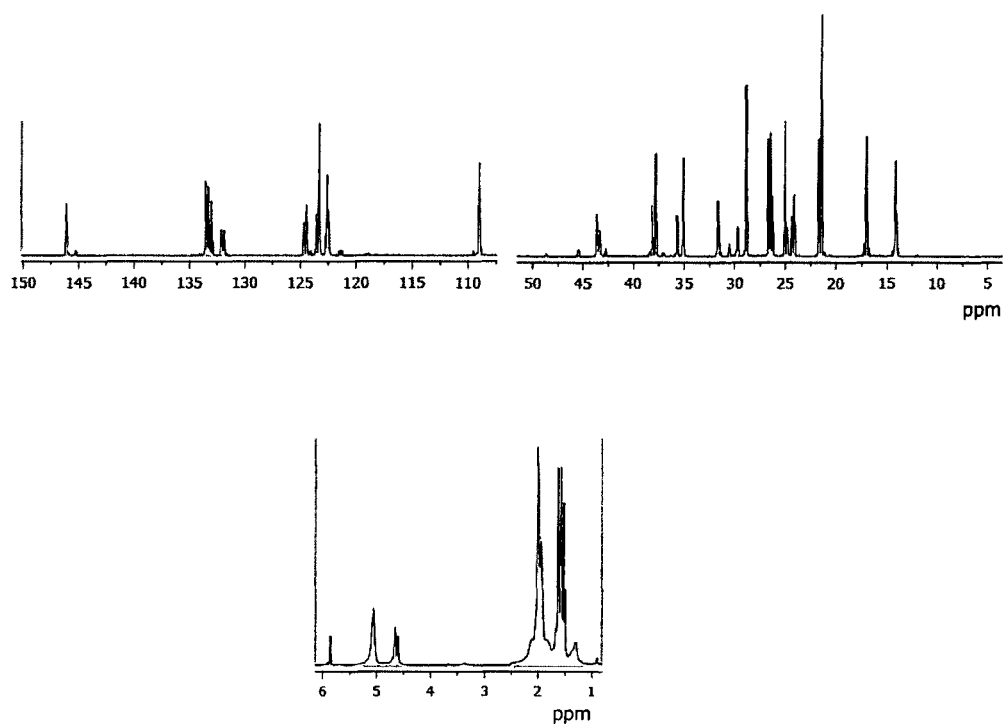

FIG. 40 shows the $^1$H-NMR (top) and $^{13}$C-NMR (bottom) spectra of the polyisoprene obtained.

Example 47 (IP108)

2 ml of isoprene equal to about 1.36 g were placed in a 25 ml test tube. Subsequently, 7.5 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the FeCl$_3$(L5) complex [sample MG73] (2.2 ml of toluene solution at a concentration of 2 mg/ml; 1×10⁻⁵, equal to about 4.4 mg) obtained as described in Example 20. The whole was maintained, under magnetic stirring, at room temperature, for 120 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 41:
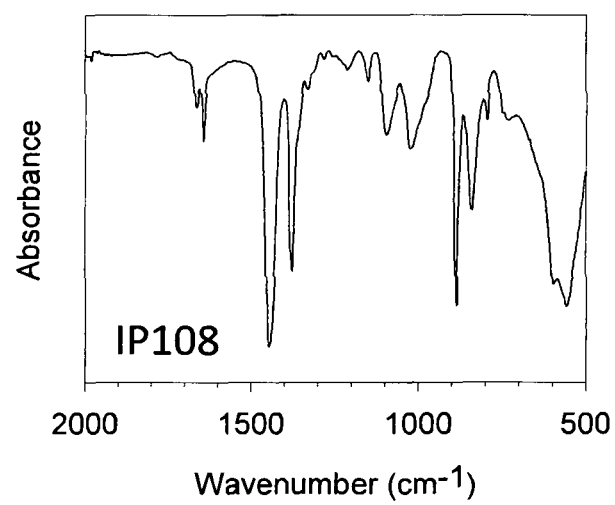

FIG. 41 shows the FT-IR spectrum of the polyisoprene obtained.

Figure 42:
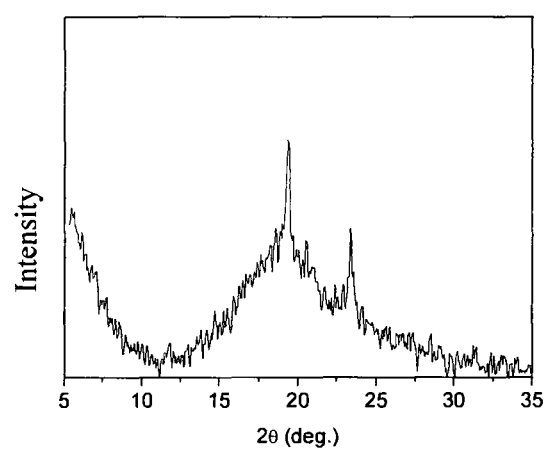

FIG. 42 shows the XRD spectrum of the polyisoprene obtained.

Example 48 (IP108/1)

2 ml of isoprene equal to about 1.36 g were placed in a 25 ml test tube. Subsequently, 10.65 ml of toluene were added and the temperature of the solution thus obtained was brought to 20° C. Then, methylaluminoxane (MAO) in toluene solution (3.15 ml; 5×10⁻³ moles, equal to about 0.29 g) was added and, subsequently, the FeCl$_3$(L5) complex [sample MG73] (2.2 ml of toluene solution at a concentration of 2 mg/ml; 1×10⁻⁵, equal to about 4.4 mg) obtained as described in Example 20. The whole was maintained, under magnetic stirring, at room temperature, for 120 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 43:
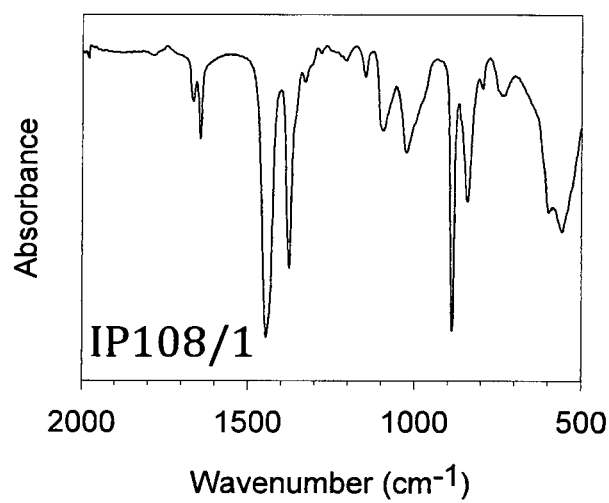

FIG. 43 shows the FT-IR spectrum of the polyisoprene obtained.

Figure 44:
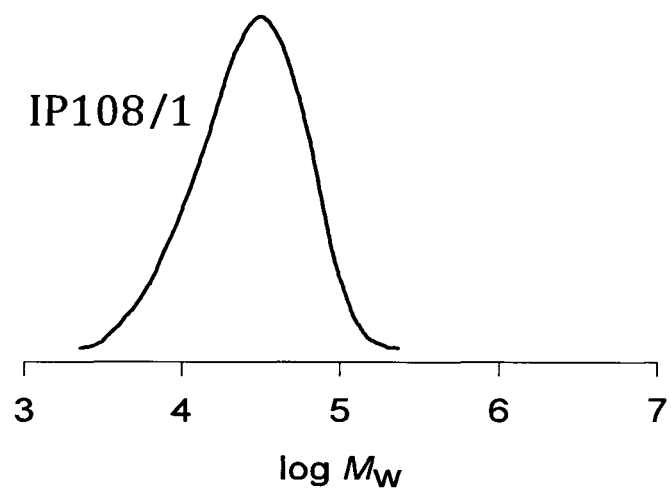

FIG. 44 shows the GPC ("Gel Permeation Chromatography") curve of the polyisoprene obtained.

Figure 45:
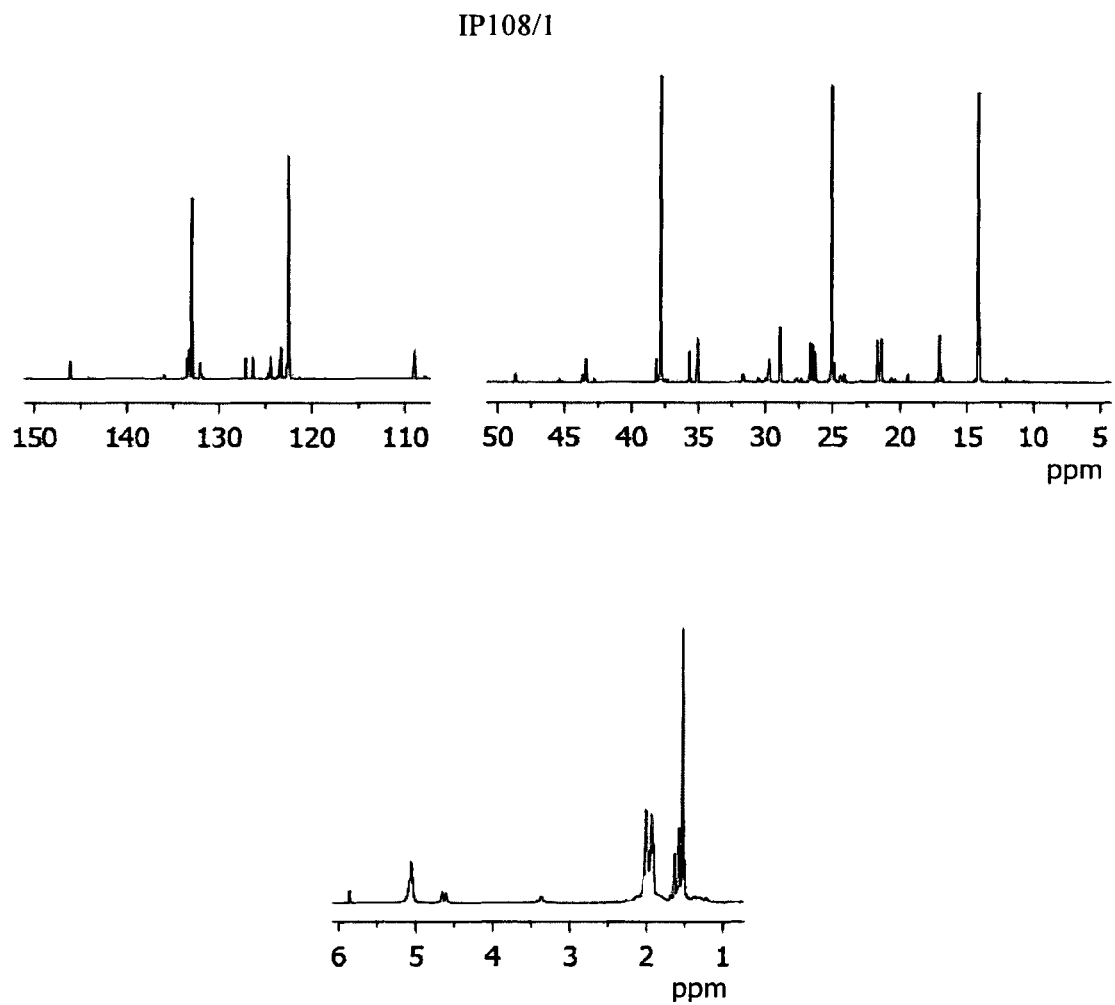

FIG. 45 shows the $^1$H-NMR (top) and $^{13}$C-NMR (bottom) spectra of the polyisoprene obtained.

Figure 46:
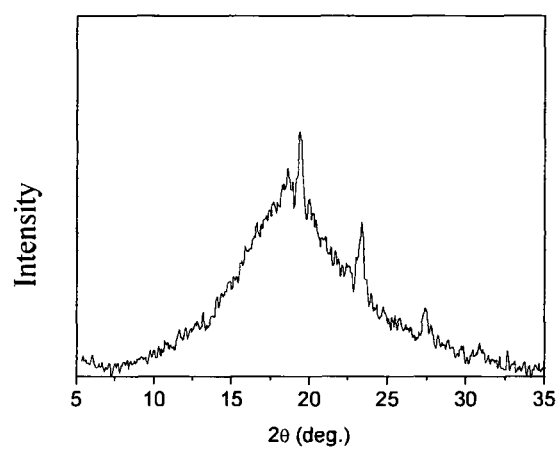

FIG. 46 shows the XRD spectrum of the polyisoprene obtained.

Example 49 (IP112)

2 ml of isoprene equal to about 1.36 g were placed in a 25 ml test tube. Subsequently, 13.2 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L5) complex [sample MG73] (2.2 ml of toluene solution at a concentration of 2 mg/ml; 1×10$^{-5}$, equal to about 4.4 mg) obtained as described in Example 20. The whole was maintained, under magnetic stirring, at room temperature, for 120 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.23 g of polyisoprene having a mixed structure: further characteristics of the process and of the polyisoprene obtained are reported in Table 2.

Figure 47:
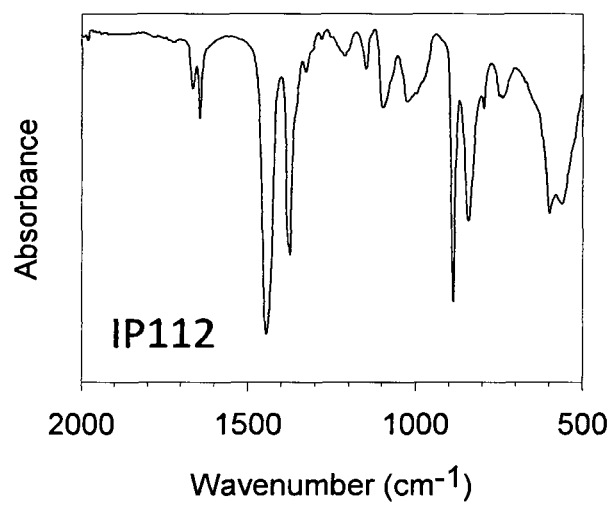

FIG. 47 shows the FT-IR spectrum of the polyisoprene obtained.

Figure 48:
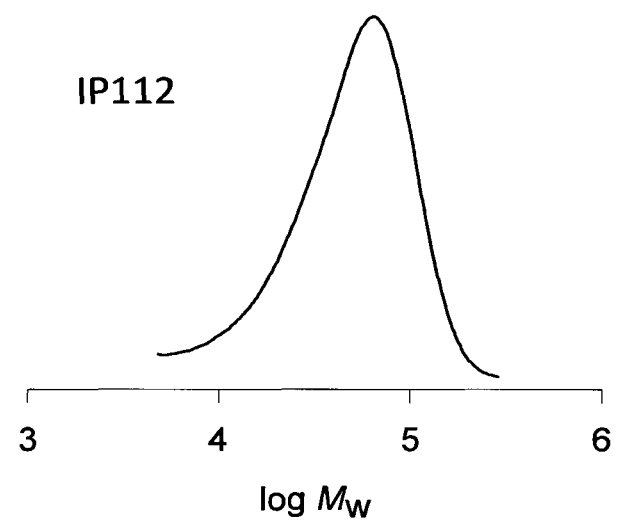

FIG. 48 shows the GPC ("Gel Permeation Chromatography") curve of the polyisoprene obtained.

Figure 49:
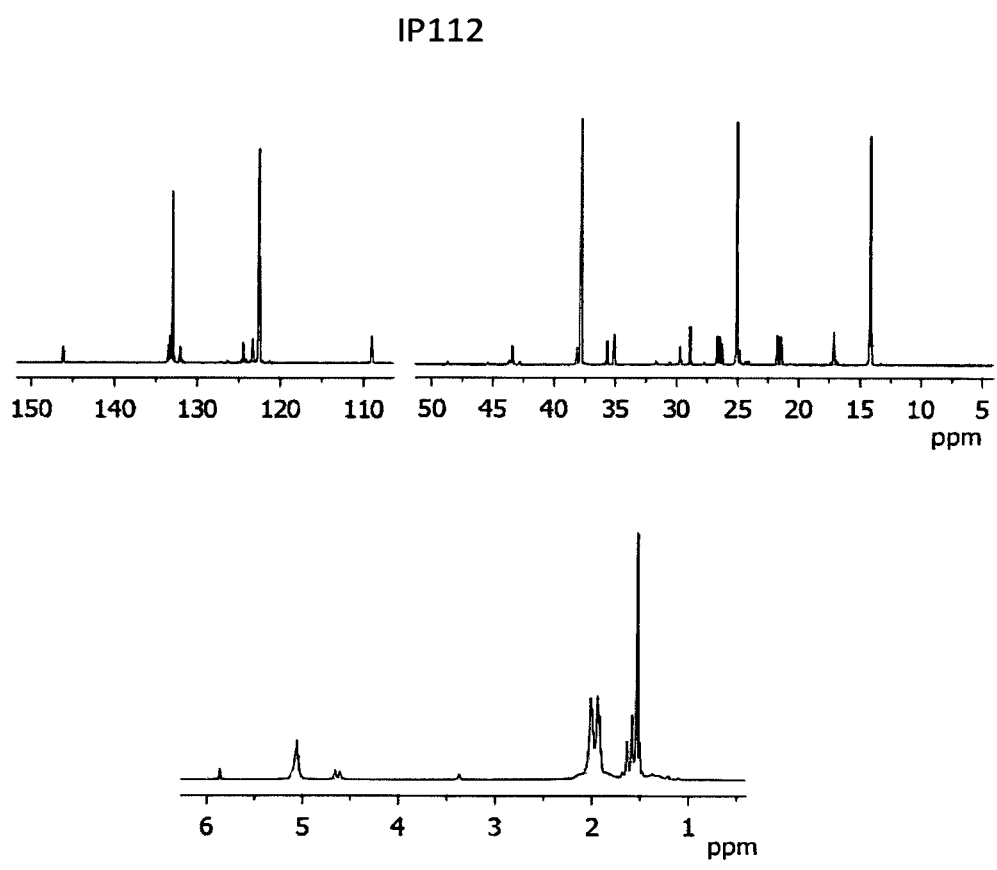

FIG. 49 shows the $^1$H-NMR (top) and $^{13}$C-NMR (bottom) spectra of the polyisoprene obtained.

Figure 50:
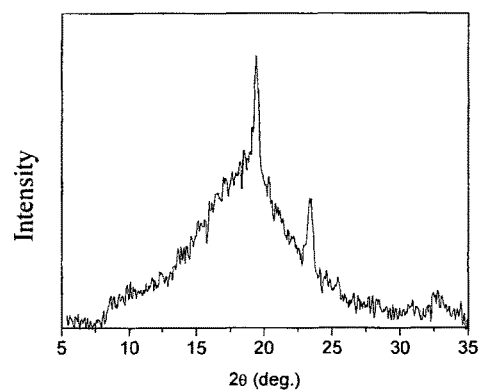

FIG. 50 shows the XRD spectrum of the polyisoprene obtained.

Example 50 (IP160)

2 ml of isoprene equal to about 1.36 g were placed in a 25 ml test tube. Subsequently, 13.2 ml of toluene were added and the temperature of the solution thus obtained was brought to 0° C. Then, methylaluminoxane (MAO) in toluene solution (0.63 ml; 1×10$^{-3}$ moles, equal to about 0.058 g) was added and, subsequently, the FeCl$_3$(L5) complex [sample MG73] (2.2 ml of toluene solution at a concentration of 2 mg/ml; 1×10$^{-5}$, equal to about 4.4 mg) obtained as described in Example 20. The whole was maintained, under magnetic stirring, at 0° C., for 240 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.887 g of polyisoprene having a mixed structure: further characteristics of the process and of the polyisoprene obtained are reported in Table 2.

Figure 51:
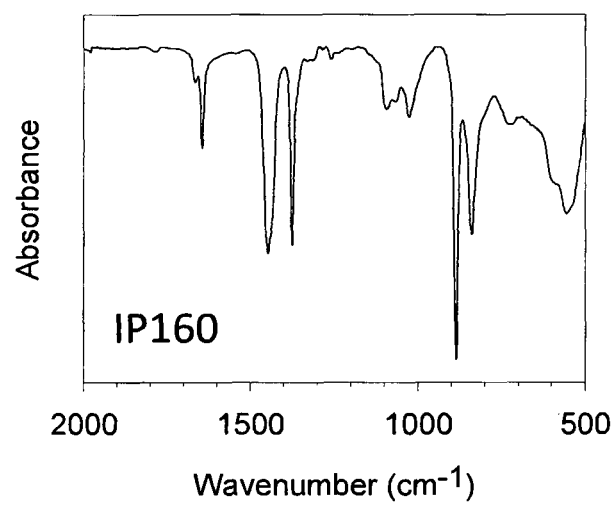

FIG. 51 shows the FT-IR spectrum of the polyisoprene obtained.

Figure 52:
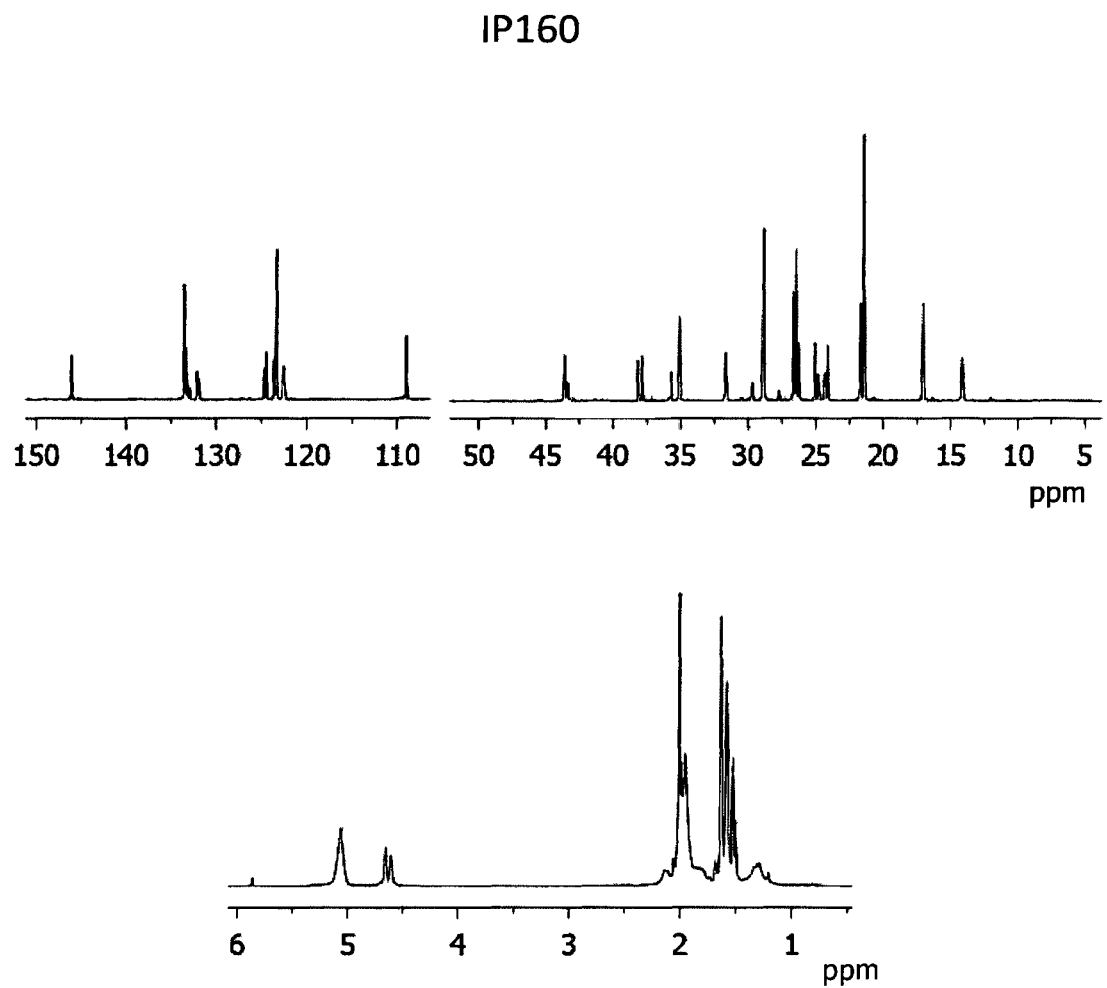

FIG. 52 shows the $^1$H-NMR (top) and $^{13}$C-NMR (bottom) spectra of the polyisoprene obtained.

Figure 53:
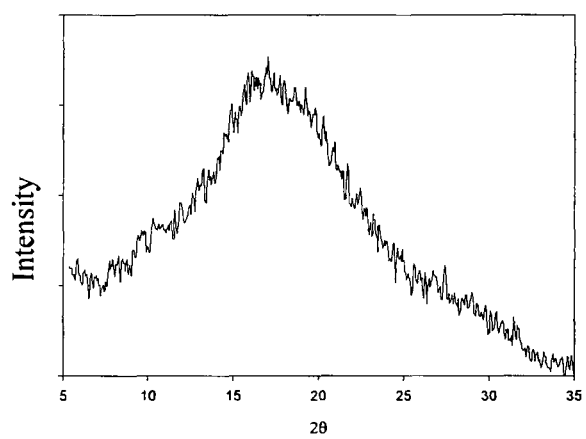

FIG. 53 shows the XRD spectrum of the polyisoprene obtained.

Example 51 (IP159)

2 ml of isoprene equal to about 1.36 g were placed in a 25 ml test tube. Subsequently, 13.2 ml of toluene were added and the temperature of the solution thus obtained was brought to −30° C. Then, methylaluminoxane (MAO) in toluene solution (0.63 ml; 1×10$^{-3}$ moles, equal to about 0.058 g) was added and, subsequently, the FeCl$_3$(L5) complex [sample MG73] (2.2 ml of toluene solution at a concentration of 2 mg/ml; 1×10$^{-5}$, equal to about 4.4 mg) obtained as described in Example 20. The whole was maintained, under magnetic stirring, at −30° C., for 300 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.405 g of polyisoprene having a mixed structure: further characteristics of the process and of the polyisoprene obtained are reported in Table 2.

Figure 54:
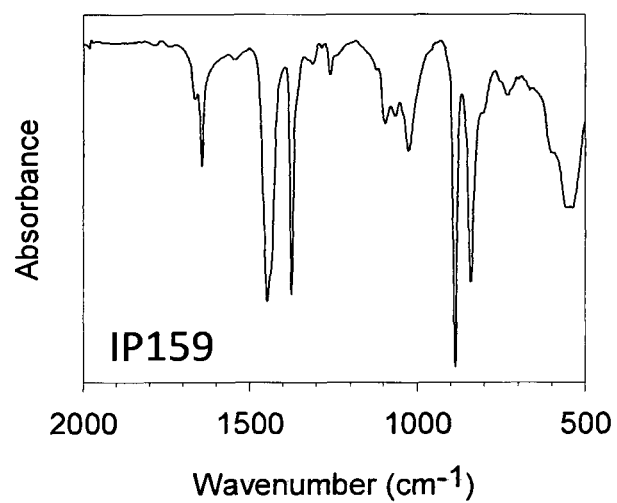

FIG. 54 shows the FT-IR spectrum of the polyisoprene obtained.

Figure 55:
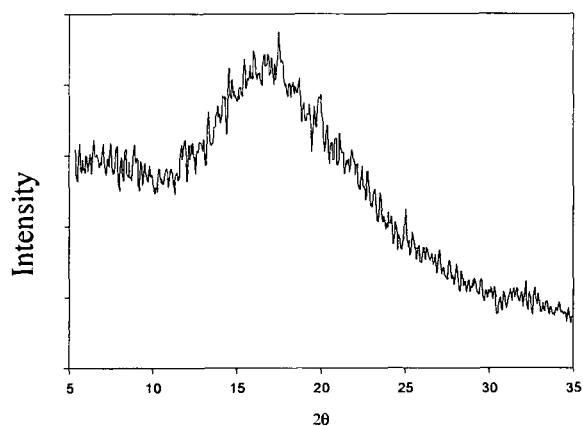

FIG. 55 shows the XRD spectrum of the polyisoprene obtained.

Example 52 (IP110)

2 ml of isoprene equal to about 1.36 g were placed in a 25 ml test tube. Subsequently, 7.8 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the FeCl$_3$(L6) complex [sample MG76] (1.9 ml of toluene solution at a concentration of 2 mg/ml; 1×10$^{-5}$, equal to about 3.8 mg) obtained as described in Example 21. The whole was maintained, under magnetic stirring, at room temperature, for 60 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 56:
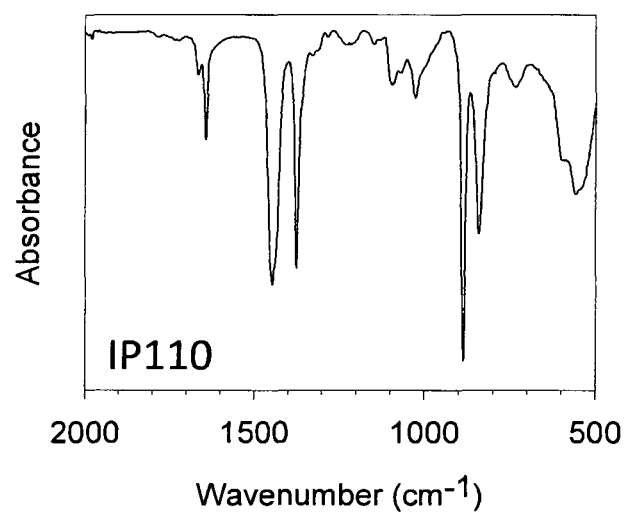

FIG. 56 shows the FT-IR spectrum of the polyisoprene obtained.

Figure 57:
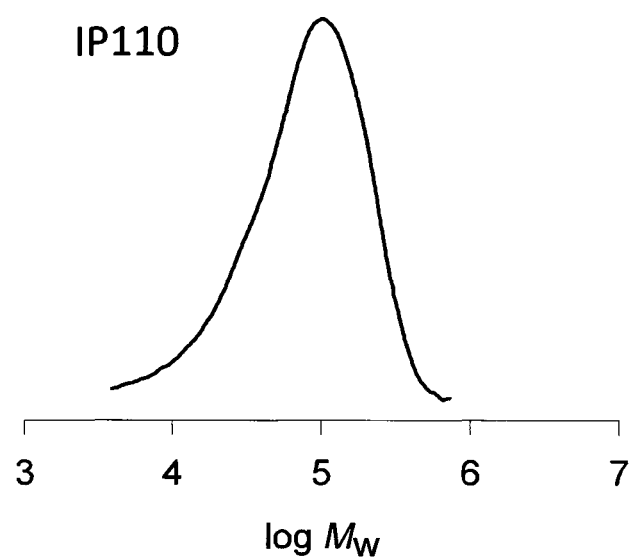

FIG. 57 shows the GPC ("Gel Permeation Chromatography") curve of the polyisoprene obtained.

Figure 58:
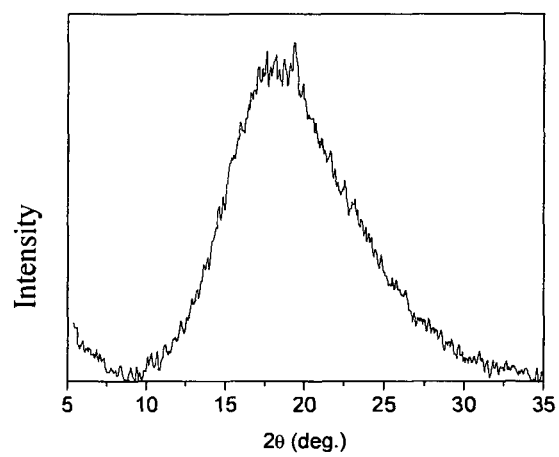

FIG. 58 shows the XRD spectrum of the polyisoprene obtained.

Figure 59:
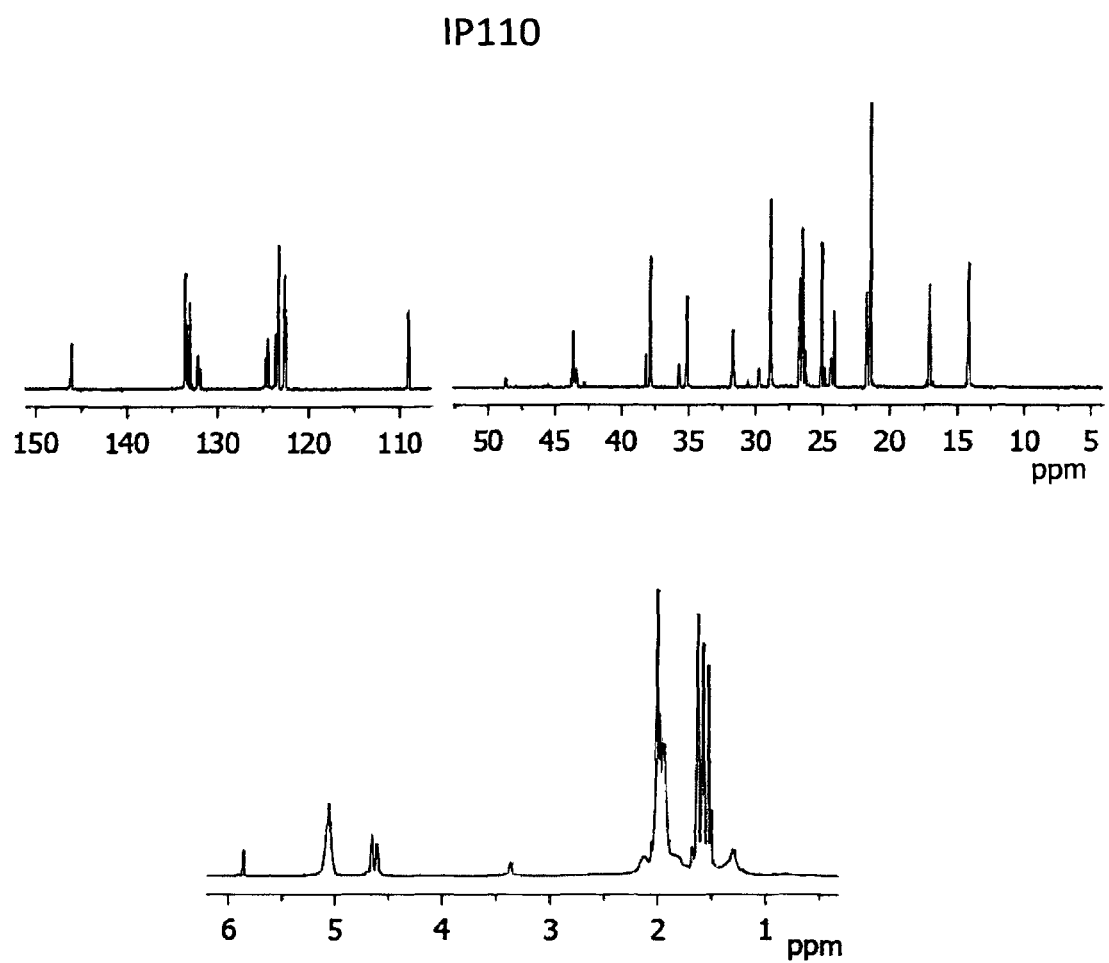

FIG. 59 shows the $^1$H-NMR (top) and $^{13}$C-NMR (bottom) spectra of the polyisoprene obtained.

Example 53 (IP111)

2 ml of isoprene equal to about 1.36 g were placed in a 25 ml test tube. Subsequently, 13.5 ml of toluene were added and the temperature of the solution thus obtained was brought to 20° C. Then, methylaluminoxane (MAO) in toluene solution (0.63 ml; 1×10$^{-3}$ moles, equal to about 0.058 g) was added and, subsequently, the FeCl$_3$(L6) complex [sample MG76] (1.9 ml of toluene solution at a concentration of 2 mg/ml; 1×10$^{-5}$, equal to about 3.8 mg) obtained as described in Example 21. The whole was maintained, under magnetic stirring, at room temperature, for 60 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a mixed structure: further characteristics of the process and of the polyisoprene obtained are reported in Table 2.

Figure 60:
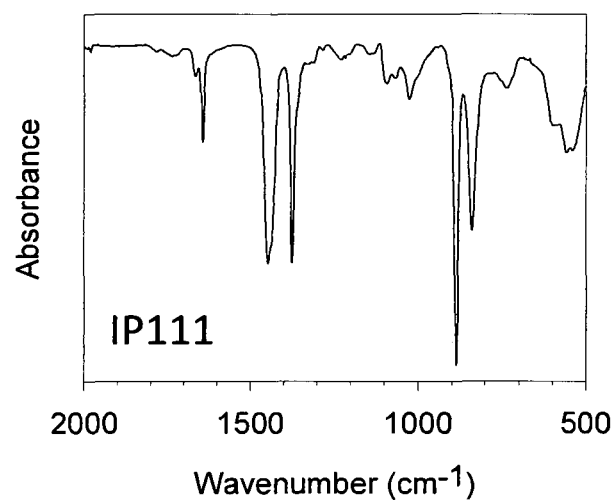

FIG. 60 shows the FT-IR spectrum of the polyisoprene obtained.

Figure 61:
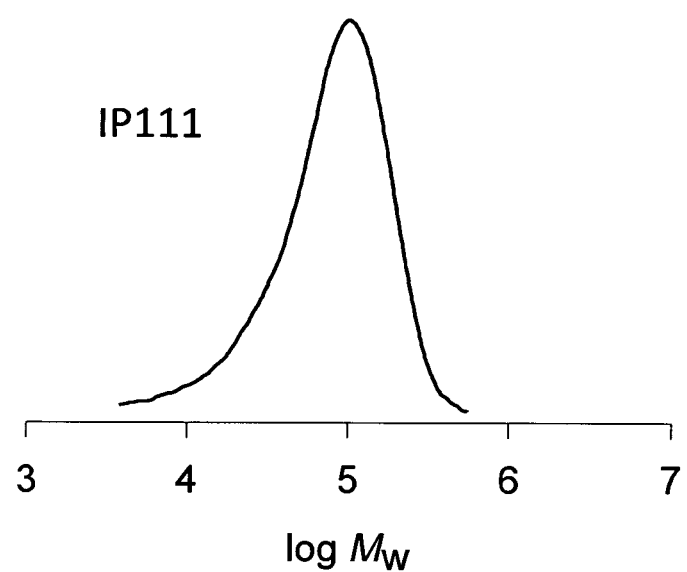

FIG. 61 shows the GPC ("Gel Permeation Chromatography") curve of the polyisoprene obtained.

Figure 62:
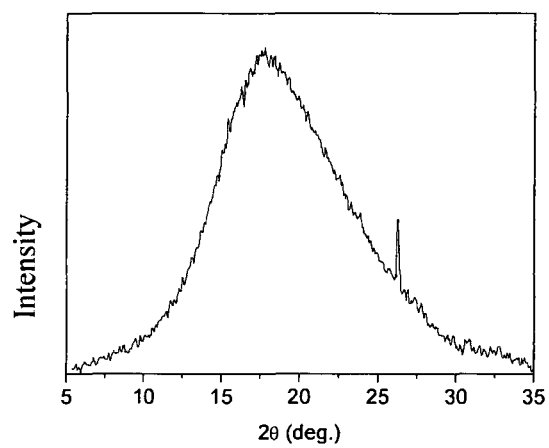

FIG. 62 shows the XRD spectrum of the polyisoprene obtained.

TABLE 1

Polymerization of 1,3-butadiene with catalytic systems comprising pyridyl iron (III) complexes

| Example | Al/Fe (molar ratio) | Time (min) | Conversion (%) | 1,4-cis (%) | 1,4-trans (%) | 1.2 (%) | $M_w$ (g × mol$^{-1}$) | $M_w/M_n$ |
|---|---|---|---|---|---|---|---|---|
| 24 | 100 | 5 | 100 | 17.1 | 17.6 | 65.3 | 457000 | 2.1 |
| 25 | 1000 | 2 | 85.7 | 14.7 | 17.2 | 68.1 | 371400 | 2.1 |
| 26 | 100 | 2 | 92.9 | 22.6 | 7.3 | 70.1 | 413700 | 2.3 |
| 27 | 1000 | 3 | 100 | 24.0 | 6.9 | 69.3 | 285700 | 2.0 |
| 28 | 100 | 2 | 54.6 | 25.8 | 3.6 | 70.6 | 768300 | 2.3 |
| 29 | 1000 | 30 | 85.7 | 18.6 | 11.9 | 69.5 | 147700 | 1.9 |
| 30 | 100 | 2 | 100 | 10.8 | 31.0 | 58.2 | 399700 | 2.1 |
| 31 | 1000 | 5 | 100 | 13.2 | 30.9 | 55.9 | 222400 | 1.9 |
| 32 | 1000 | 16 | 100 | 13.7 | 43.4 | 42.9 | 166300 | 2.1 |
| 33 | 100 | 16 | 100 | 11.7 | 41.2 | 47.1 | 138100 | 1.8 |
| 34 | 1000 | 5 | 100 | 40.9 | 2.0 | 57.1 | 232300 | 2.2 |
| 35 | 100 | 60 | 75.0 | 38.7 | 1.7 | 59.6 | 129300 | 1.9 |
| 36 | 1000 | 10 | 100 | 29.2 | 16.5 | 54.4 | 379000 | 1.7 |
| 37 | 100 | 30 | 100 | 31.1 | 12.3 | 56.6 | 427500 | 1.8 |
| 38 | 1000 | 120 | 8.2 | 20.3 | 34.1 | 45.6 | 20200 | 2.6 |
| 39 | 100 | 120 | 14.0 | 19.5 | 30.8 | 49.7 | 25360 | 1.1 |

TABLE 2

Polymerization of isoprene with catalytic systems comprising pyridyl iron complexes

| Example | Al/Fe (molar ratio) | Time (min) | Conversion (%) | 1,4-cis (%) | 1,4-trans (%) | 3.4 (%) | $M_w$ (g × mol$^{-1}$) | $M_w/M_n$ |
|---|---|---|---|---|---|---|---|---|
| 40 | 100 | 2 | 91.9 | 34.1 | 0 | 65.9 | 297300 | 1.8 |
| 41 | 100 | 4 | 100 | 54.1 | 5.0 | 40.9 | 369900 | 1.9 |
| 42 | 1000 | 1.5 | 100 | 53.0 | 5.5 | 41.5 | 260800 | 1.8 |
| 43 | 100 | 4 | 100 | | 4.6 | 42.3 | 355600 | 2.0 |
| 44 | 1000 | 9 | 100 | 49.8 | 9.5 | 40.7 | 244700 | 2.0 |
| 45 | 100 | 65 | 100 | 67.8 | 8.7 | 23.5 | 106800 | 1.7 |
| 46 | 1000 | 60 | 100 | 69.2 | 10.0 | 20.8 | 70000 | 1.6 |
| 47 | 1000 | 120 | 100 | 18.7 | 59.6 | 1.7 | 29900 | 1.9 |
| 48 | 500 | 120 | 100 | 17.7 | 60.0 | 22.3 | 34300 | 1.7 |
| 49 | 100 | 120 | 90.4 | 23.7 | 66.4 | 9.9 | 59500 | 1.7 |
| 50 | 100 | 240 | 65.2 | 63.7 | 17.5 | 18.8 | 42300 | 1.6 |
| 51 | 100 | 300 | 29.8 | 66.3 | 14.5 | 19.2 | 57200 | 1.5 |
| 52 | 1000 | 60 | 100 | 62.0 | 19.0 | 19.0 | 107900 | 2.3 |
| 53 | 100 | 60 | 100 | 61.4 | 18.7 | 19.9 | 101000 | 1.8 |

The invention claimed is:

1. Process for preparing conjugated diene (co)polymers comprising polybutadiene comprising (co)polymerizing at least one conjugated diene in the presence of a catalytic system comprising:

(a) at least one pyridyl iron (III) complex having general formula (I) or (II):

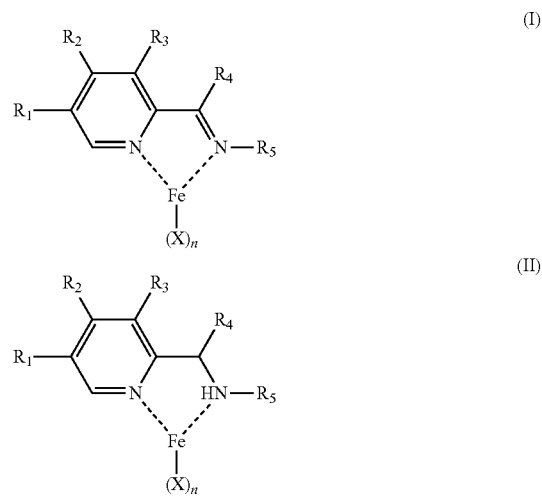

wherein:
$R_1$, $R_2$, $R_3$ and $R_4$, identical or different, represent a hydrogen atom; or are selected from a linear or branched, optionally halogenated $C_1$-$C_{20}$ alkyl group, an optionally substituted cycloalkyl group, or an optionally substituted aryl group;

$R_5$ represents a hydrogen atom, or is selected from a linear or branched, optionally halogenated $C_1$-$C_{20}$ alkyl group, an optionally substituted cycloalkyl group or an optionally substituted aryl group;

X, identical or different, represent a halogen atom; or are selected from a linear or branched $C_1$-$C_{20}$ alkyl group, an —OCOR$_6$ group or an —OR$_6$ group wherein R$_6$ is selected from a linear or branched $C_1$-$C_{20}$ alkyl group;

n is 3;

(b) at least one co-catalyst selected from the following organo-aluminum derivatives:

(b$_1$) aluminum compounds having general formula (III):

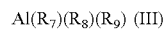

wherein $R_7$ represents a hydrogen atom, or is selected from a linear or branched $C_1$-$C_{20}$ alkyl group, a cycloalkyl group, an aryl group, an alkylaryl group, an arylalkyl group or an alkoxy group; Rs and R9, identical or different, are selected from a linear or branched $C_1$-$C_{20}$ alkyl group, a cycloalkyl group, an aryl group, an alkylaryl group or an arylalkyl group;

(b$_2$) aluminoxanes having general formula (IV):

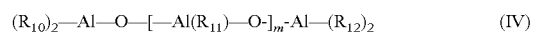

wherein $R_{10}$, $R_{11}$ and $R_{12}$, identical or different, represent a hydrogen atom, or a halogen atom, or are selected from a linear or branched $C_1$-$C_{20}$ alkyl group, a cycloalkyl group or an aryl group, said groups being optionally substituted with one or more silicon or germanium atoms; and m is an integer ranging from 0 to 1000;

(b$_3$) partially hydrolyzed organo-aluminum derivatives;

(b$_4$) haloaluminum alkyls having general formula (V) or (VI):

wherein p is 1 or 2; q is an integer ranging from 1 to 5; $R_{13}$, identical or different, are selected from a linear or branched $C_1$-$C_{20}$ alkyl group; X' represents a chlorine or bromine atom;

wherein polybutadiene obtained has a higher content of 1,2 unit than 1,4 cis unit.

2. Process for preparing conjugated diene (co)polymers including polybutadiene according to claim 1, wherein in said pyridyl iron (III) complex having general formula (I) or (II):

$R_1$, $R_2$, $R_3$ and $R_4$, identical or different, represent a hydrogen atom; or are selected from a linear or branched $C_1$-$C_{20}$ alkyl group;

$R_5$ is selected from an aryl group optionally substituted with one or more of a methyl, ethyl, Cert-butyl or iso-propyl group; is selected from a phenyl group, a 2-methylphenyl group, a 2-ethylphenyl group, a 2-tert-butylphenyl group, a 2-iso-propylphenyl group, a 2,6-diethylphenyl group, a 2,6-di-iso-propylphenyl group, or a 2,4,6-trimethylphenyl group; or is an optionally substituted cyclohexyl group;

X, mutually identical, represent a halogen atom;

n is 3.

3. Process for preparing conjugated diene (co)polymers comprising polybutadiene according to claim 1, wherein said aluminum compounds having general formula (III) ($b_1$) are selected from: diethylaluminum hydride, di-n-propylaluminum hydride, di-n-butylaluminum hydride, di-iso-butylaluminum hydride (DIBAH), diphenylaluminum hydride, di-p-tolylaluminum hydride, dibenzylaluminum hydride, phenyl-n-propylaluminum hydride, p-tolylethylaluminum hydride, p-tolyl-n-propylaluminum hydride, p-tolyl-iso-propylaluminum hydride, benzylethylaluminum hydride, benzyl-n-propylaluminum hydride, benzyl-iso-propylaluminum hydride, diethylaluminum ethoxide, di-iso-butylaluminum ethoxide, dipropylaluminum ethoxide, trimethylaluminum, triethylaluminum (TEA), tri-n-propylaluminum, tri-iso-butylaluminum (TIBA), tri-n-butylaluminum, tripentylaluminum, trihexylaluminum, triciclohexylaluminum, trioctylalurninurn, trip henylaluminum, tri-p-tolylaluminum, tribenzylalurninurn, ethyldiphenylaluminum, ethyl-di-p-tolylaluminum, ethyldibenzylaluminum, diethylphenylaluminum, diethyl-p-tolylaluminum or diethylbenzylaluminum, or mixtures thereof.

4. Process for preparing conjugated diene (co)polymers comprising polybutadiene according to claim 1, wherein said aluminoxanes having general formula (IV), ($b_2$) are selected from: methylaluminoxane (MAO), ethylaluminoxane, n-butylaluminoxane, tetra-iso-butylaluminoxane (TTMPAO), Cert-butylaluminoxane, tetra-(2,4,4-trimethylpentyl)aluminooxane (TIOAO), tetra-(2,3-dimethylbutyl) aluminoxane (TDMBAO) or tetra-(2,3,3-trimethylbutyl) aluminoxane (TTMBAO), or mixtures thereof.

5. Process for preparing conjugated diene (co)polymers comprising polybutadiene according to claim 1, wherein said partially hydrolyzed organo-aluminum-derivatives ($b_3$) are selected from aluminum compounds having general formula (III) added with at least one protonating compound, the aluminum compound having general formula (III) and the protonating compound being used in a molar ratio ranging from 0.001:1 to 0.2:1; said protonating compound is selected from: water; alcohols; alcohols with higher molecular weight; carboxylic acids; or mixtures thereof.

6. Process for preparing conjugated diene (co)polymers comprising polybutadiene according to claim 1, wherein said haloaluminum alkyls having general formula (V) or (VI) are selected from: diethylchloroaluminum ($AlEt_2Cl$), dimethylaluminumchloride ($AlMe_2Cl$), ethylaluminumdichloride ($AlEtCl_2$), di-iso-butylaluminumchloride [$Al(i-Bu)_2Cl$], ethylaluminumsesquichloride ($Al_2Et_3Cl_3$) or methylaluminumsesquichloride ($Al_2Me_3Cl_3$).

7. Process for preparing conjugated diene (co)polymers comprising polybutadiene according to claim 1 wherein said conjugated diener are selected from at least one of: 1,3-butadiene, 2-methyl-1,3-butadiene (isoprene), or 2,3-dimethyl-1,3-butadiene.

8. Process for preparing conjugated diene (co)polymers including polybutadiene according to claim 1 wherein:

said (co)polymerization is carried out in the presence of at least one inert organic solvent selected from: saturated aliphatic hydrocarbons selected from butane, pentane, hexane or heptane, or mixtures thereof; saturated cycloaliphatic hydrocarbons selected from cyclopentane or cyclohexane, or mixtures thereof; mono-olefins selected from 1-butene or 2-butene, or mixtures thereof; aromatic hydrocarbons selected from benzene, toluene or xylene, or mixtures thereof; halogenated hydrocarbons selected from methylene chloride, chloroform, carbon tetrachloride, trichloroethylene, perchloroethylene, 1,2-dichloroethane, chlorobenzene, bromobenzene or chlorotoluene, or mixtures thereof; or selected from said at least one conjugated diene to be (co)polymerized; and/or the concentration of said at least one conjugated diene to be (co)polymerized in said at least one inert organic solvent ranges from 5% by weight to 50% by weight with respect to the total weight of the mixture of said at least one conjugated diene to be (co)polymerized and said at least one inert organic solvent; and / or said process is carried out at a temperature ranging from −70° C. to +100° C.

9. The process for preparing conjugated diene (co)polymers comprising polybutadiene of claim 1 wherein $R_5$ is substituted with at least one linear or branched $C_2$-$C_{12}$ alkyl group or linear or branched $C_2$-$C_{12}$ alkoxyl group at one or both of the 2 and 6 positions.

10. The process for preparing conjugated diene (co) polymers comprising polybutadiene of claim 9 wherein $R_5$ is substituted with said alkyl group which is one or more of an ethyl, Cert-butyl or iso-propyl group.

11. The process for preparing conjugated diene (co) polymers comprising polybutadiene of claim 1 wherein $R_4$ is selected from a linear or branched, optionally halogenated $C_1$-$C_{20}$ alkyl group, an optionally substituted cycloalkyl group, or an optionally substituted aryl group.

12. The process for preparing conjugated diene (co) polymers comprising polybutadiene of claim 9 wherein $R_4$ is selected from a linear or branched, optionally halogenated $C_1$-$C_{20}$ alkyl group, an optionally substituted cycloalkyl group, or an optionally substituted aryl group.

* * * * *